US012341933B2

(12) United States Patent
Nakazato et al.

(10) Patent No.: US 12,341,933 B2
(45) Date of Patent: *Jun. 24, 2025

(54) TRANSMITTING APPARATUS, RECEIVING APPARATUS, AND TRANSMISSION SYSTEM

(71) Applicant: Sony Semiconductor Solutions Corporation, Kanagawa (JP)

(72) Inventors: Tomoki Nakazato, Kanagawa (JP); Yoshiaki Matsubara, Kanagawa (JP); Hideyuki Someya, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 216 days.

This patent is subject to a terminal disclaimer.

(21) Appl. No.: 18/204,713

(22) Filed: Jun. 1, 2023

(65) Prior Publication Data

US 2023/0362307 A1   Nov. 9, 2023

Related U.S. Application Data

(63) Continuation of application No. 17/621,534, filed as application No. PCT/JP2020/019708 on May 19, 2020, now Pat. No. 11,695,883.

(30) Foreign Application Priority Data

Jun. 28, 2019   (JP) .................. 2019-121341

(51) Int. Cl.
*H04N 1/00*   (2006.01)
*G06V 10/25*   (2022.01)
(Continued)

(52) U.S. Cl.
CPC ......... *H04N 1/00114* (2013.01); *G06V 10/25* (2022.01); *H04N 21/440245* (2013.01);
(Continued)

(58) Field of Classification Search
CPC ......... H04N 1/00114; H04N 21/43632; H04N 21/440245; H04N 23/80; H04N 23/665;
(Continued)

(56) References Cited

U.S. PATENT DOCUMENTS

2007/0033627 A1   2/2007   Sato
2013/0229550 A1   9/2013   Nakao
(Continued)

FOREIGN PATENT DOCUMENTS

JP   H10-51693 A   2/1998
JP   2003-163842 A   6/2003
(Continued)

OTHER PUBLICATIONS

International Search Report (PCT/ISA/210), International Application No. PCT/JP2020/019708, dated May 19, 2020.

*Primary Examiner* — Lin Ye
*Assistant Examiner* — Chriss S Yoder, III
(74) *Attorney, Agent, or Firm* — Michael Best & Friedrich LLP

(57) ABSTRACT

It is an object to realize a correcting process for correcting a defective image in a region of interest (ROI) that is a partial region segmented from a captured image. A transmitting apparatus includes a controlling section that controls the holding of defect correcting information for use in correcting a defect in an image included in a ROI and a transmitting section that sends out image data of the image included in the ROI as payload data and sends out ROI information as embedded data.

20 Claims, 21 Drawing Sheets

(51) Int. Cl.
*H04N 21/4402* (2011.01)
*H04N 23/80* (2023.01)
*H04N 25/68* (2023.01)
*H04N 25/683* (2023.01)
*G09G 5/14* (2006.01)

(52) U.S. Cl.
CPC .............. *H04N 23/80* (2023.01); *H04N 25/68* (2023.01); *H04N 25/683* (2023.01); *G09G 5/14* (2013.01)

(58) Field of Classification Search
CPC ...... H04N 25/68; H04N 25/683; G06V 10/25; G09G 5/006; G09G 5/14; G09G 2320/0233; G09G 2340/12; G09G 2370/04; G09G 2370/10; G09G 2370/14
See application file for complete search history.

(56) References Cited

U.S. PATENT DOCUMENTS

| | | |
|---|---|---|
| 2015/0256840 A1 | 9/2015 | Sato |
| 2015/0341575 A1 | 11/2015 | Kim |
| 2017/0180659 A1 | 6/2017 | Levoy |
| 2018/0295400 A1 | 10/2018 | Thomas |
| 2020/0186841 A1* | 6/2020 | Yoshimochi ......... H04N 23/665 |
| 2020/0275046 A1 | 8/2020 | Takahashi |
| 2021/0281749 A1 | 9/2021 | Matsubara |
| 2022/0217310 A1 | 7/2022 | Matsubara |
| 2022/0224917 A1 | 7/2022 | Ohashi |
| 2022/0239825 A1 | 7/2022 | Tanaka |
| 2022/0264041 A1 | 8/2022 | Murozuka |
| 2022/0272208 A1 | 8/2022 | Yoshimochi |

FOREIGN PATENT DOCUMENTS

| | | |
|---|---|---|
| JP | 2008141326 A | 6/2008 |
| JP | 2012-100166 A | 5/2012 |
| JP | 2013-164834 A | 8/2013 |
| JP | 2013183282 A | 9/2013 |
| JP | 2013239772 A | 11/2013 |
| JP | 2014-039219 A | 2/2014 |
| JP | 2016-201756 A | 12/2016 |
| KR | 20150009842 A | 1/2015 |
| TW | 201924324 A | 6/2019 |
| WO | 2018225449 A1 | 12/2018 |
| WO | 2019092952 A1 | 5/2019 |

* cited by examiner

FIG.13

Raw IMAGE BEFORE DEFECT CORRECTION

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

Id

→ DEFECT CORRECTION →

Raw IMAGE AFTER DEFECT CORRECTION

Iad

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

Ic
Iad
Iad

TRANSMITTING APPARATUS, RECEIVING APPARATUS, AND TRANSMISSION SYSTEM

CROSS REFERENCE TO RELATED APPLICATIONS

This application is a continuation application of U.S. application Ser. No. 17/621,534, filed Dec. 21, 2021 which is a 371 Nationalization of Application No. PCT/JP2020/019708 filed May 19, 2020 and claims priority to Japanese Patent Application No. 2019-121341 filed on Jun. 28, 2019 with Japan Patent Office, the entire contents of which are incorporated in this application by reference.

TECHNICAL FIELD

The present disclosure relates to a transmitting apparatus, a receiving apparatus, and a transmission system.

BACKGROUND ART

In recent years, there have been growing applications in which large amounts of data are transmitted in bulk. Such applications tend to pose large loads on the transmission system, possibly causing the transmission system to go down in worst-case scenarios and fail to perform data transmission.

To avoid transmission system shutdowns, it has been known in the art to specify an object as an imaging target and transmit only a partial image of the specified object that has been segmented, rather than transmitting an entire captured image (see, for example, PTL 1 through PTL 4). Furthermore, PTL 5 and PTL 6 disclose a process for correcting a defective pixel in image capturing elements.

CITATION LIST

Patent Literature

[PTL 1]
Japanese Patent Laid-open No. 2016-201756
[PTL 2]
Japanese Patent Laid-open No. 2014-39219
[PTL 3]
Japanese Patent Laid-open No. 2013-164834
[PTL 4]
Japanese Patent Laid-open No. 2012-209831
[PTL 5]
Japanese Patent Laid-open No. 2003-163842
[PTL 6]
Japanese Patent Laid-open No. 2012-100166

SUMMARY

Technical Problem

However, nothing has been examined about a correcting process for correcting a defective image in a case where a partial region of interest (ROI) segmented from a captured image is transmitted.

It is an object of the present disclosure to realize a correcting process for correcting a defective image in a region of interest (ROI) that is a partial region segmented from a captured image.

Solution to Problem

A transmitting apparatus according to an aspect of the present disclosure includes a controlling section that controls holding of defect correcting information for use in correcting a defect in an image included in a ROI (Region Of Interest) and a transmitting section that sends out image data of the image included in the ROI as payload data and sends out ROI information as embedded data.

A receiving apparatus according to an aspect of the present disclosure includes a receiving section that receives a transmission signal including image data of an image included in a ROI (Region Of Interest) in payload data and including ROI information in embedded data, a controlling section that controls extraction of defect correcting information for use in correcting a defect in the image data of the image included in the ROI from the transmission signal received by the receiving section, and a processing section that processes a correction of the defect in the image of the ROI on the basis of the defect correcting information extracted by the controlling section.

A transmission system according to an aspect of the present disclosure includes a transmitting apparatus having a controlling section that controls holding of defect correcting information for use in correcting a defect in an image included in a ROI (Region Of Interest) and a transmitting section that sends out image data of the image included in the ROI as payload data and sends out ROI information as embedded data, and a receiving apparatus having a receiving section that receives transmission signal including the image data of the image included in the ROI in the payload data and including the ROI information in the embedded data, a controlling section that controls extraction of defect correcting information for use in correcting the defect in the image data of the image included in the ROI from the transmission signal received by the receiving section, and a processing section that processes a correction of the defect in the image of the ROI on the basis of the defect correcting information extracted by the controlling section.

BRIEF DESCRIPTION OF DRAWINGS

FIG. 13 is a diagram schematically illustrating a correcting process for correcting a defective image according to the present disclosure.

DESCRIPTION OF EMBODIMENTS

Modes for carrying out the present disclosure will be described in detail hereinbelow with reference to the drawings. The description given below applies to specific examples of the present disclosure, and the present disclosure is not limited to the aspects illustrated below.

The modes for carrying out the technology according to the present disclosure (hereinafter referred to as "embodiments") will be described hereinbelow in the following order:
1. Technology 1 that is presupposed for the present disclosure (technology for transmitting a partial region (rectangular in shape) of interest (ROI) segmented from a captured image)
2. Technology 2 that is presupposed for the present disclosure (technology for transmitting a partial region (non-rectangular in shape) of interest (ROI) segmented from a captured image)
3. Principles of a correcting process for correcting a defective pixel in an embodiment of the present disclosure
4. A transmitting apparatus, a receiving apparatus, and a transmission system according to a first embodiment of the present disclosure
5. A transmitting apparatus, a receiving apparatus, and a transmission system according to a modification of the first embodiment
6. Principles of a correcting process for correcting a defective pixel in an second embodiment of the present disclosure
1. Technology 1 that is presupposed for the present disclosure:

Configuration

In recent years, portable devices such as smartphones and camera devices have been handling progressively larger quantities of image data, and are required to speed up and consume less electric power for data transmission within themselves or between different devices. In order to meet such requirements, standardization is under way for high-speed interface standards such as C-PHY standards and D-PHY standards established by MIPI Alliance as connection interfaces for potable deices and camera devices. The C-PHY standards and D-PHY standards are interface standards for physical layers (PHY) of communication protocols. In addition, DSI for the displays of portable devices and CSI for camera devices are present as higher protocol layers than the C-PHY standards and D-PHY standards.

Figure 1:
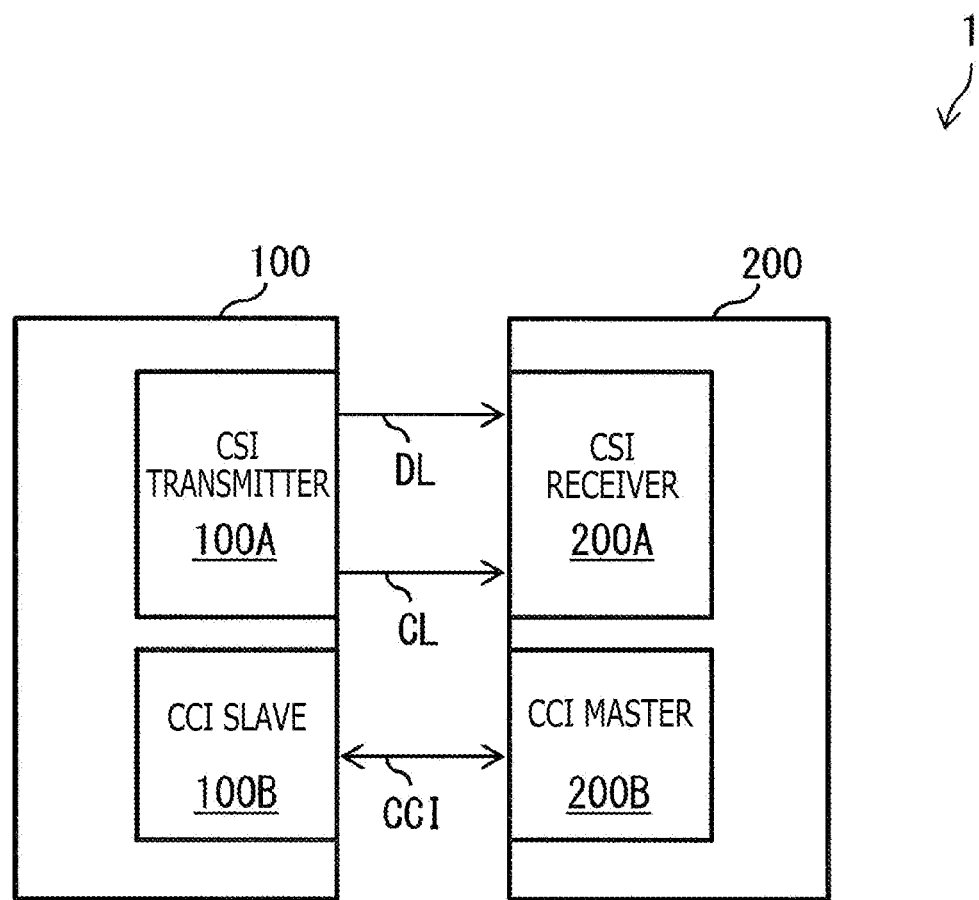
FIG. 1 is a diagram illustrating a general configurational example of a video transmission system.

A video transmission system 1 according to the technology that is presupposed for the present disclosure includes a system for transmitting and receiving signals according to various standards, and can transmit and receive signals according to the MIPI CSI-2 standards, the MIPI CSI-3 standards, or the MIPI DSI standards, for example. FIG. 1 illustrates a general configuration of the video transmission system 1 according to the technology that is presupposed for the present disclosure. The video transmission system 1 is applied to the transmission of data signals, clock signals, and control signals, and includes a video transmitting apparatus 100 and a video receiving apparatus 200. The video transmission system 1 includes a data lane DL for transmitting data signals representing image data etc., a clock lane CL for transmitting clock signals, and a camera control interface CCI for transmitting control signals, for example, between the video transmitting apparatus 100 and the video receiving apparatus 200. Though FIG. 1 illustrates an example in which one data lane DL is provided, a plurality of data lanes DL may be provided. The camera control interface CCI includes a bidirectional control interface compatible with the I²C (Inter-Integrated Circuit) standards.

The video transmitting apparatus 100 includes an apparatus for sending out signals according to the MIPI CSI-2 standards, the MIPI CSI-3 standards, or the MIPI DSI standards. The video transmitting apparatus 100 has a CSI transmitter 100A and a CCI slave 100B. The video receiving apparatus 200 has a CSI receiver 200A and a CCI master 200B. In the clock lane CL, the CSI transmitter 100A and the CSI receiver 200A are connected to each other by a clock signal line. In the data lane DL, the CSI transmitter 100A and the CSI receiver 200A are connected to each other by a clock signal line. In the camera control interface CCI, the CCI slave 100B and the CCI master 200B are connected to each other by a control signal line.

The CSI transmitter 100A includes a differential signal transmitting circuit for generating a differential clock signal as a clock signal and outputting the generated differential clock signal to the clock signal line. The CSI transmitter 100A may not necessarily transmit a differential signal, but may transmit a single-ended or three-phase signal. The CSI transmitter 100A also includes a differential signal transmitting circuit for generating a differential data signal as a data signal and outputting the generated differential data signal to the data signal line, for example. The CSI receiver 200A includes a differential signal receiving circuit for receiving a differential clock signal as a clock signal and performing a predetermined processing process on the received differential clock signal. The CSI receiver 200A also includes a differential signal receiving circuit for receiving a differential data signal as a data signal and performing a predetermined processing process on the received differential data signal.

(Video Transmitting Apparatus 100)

Figure 2:
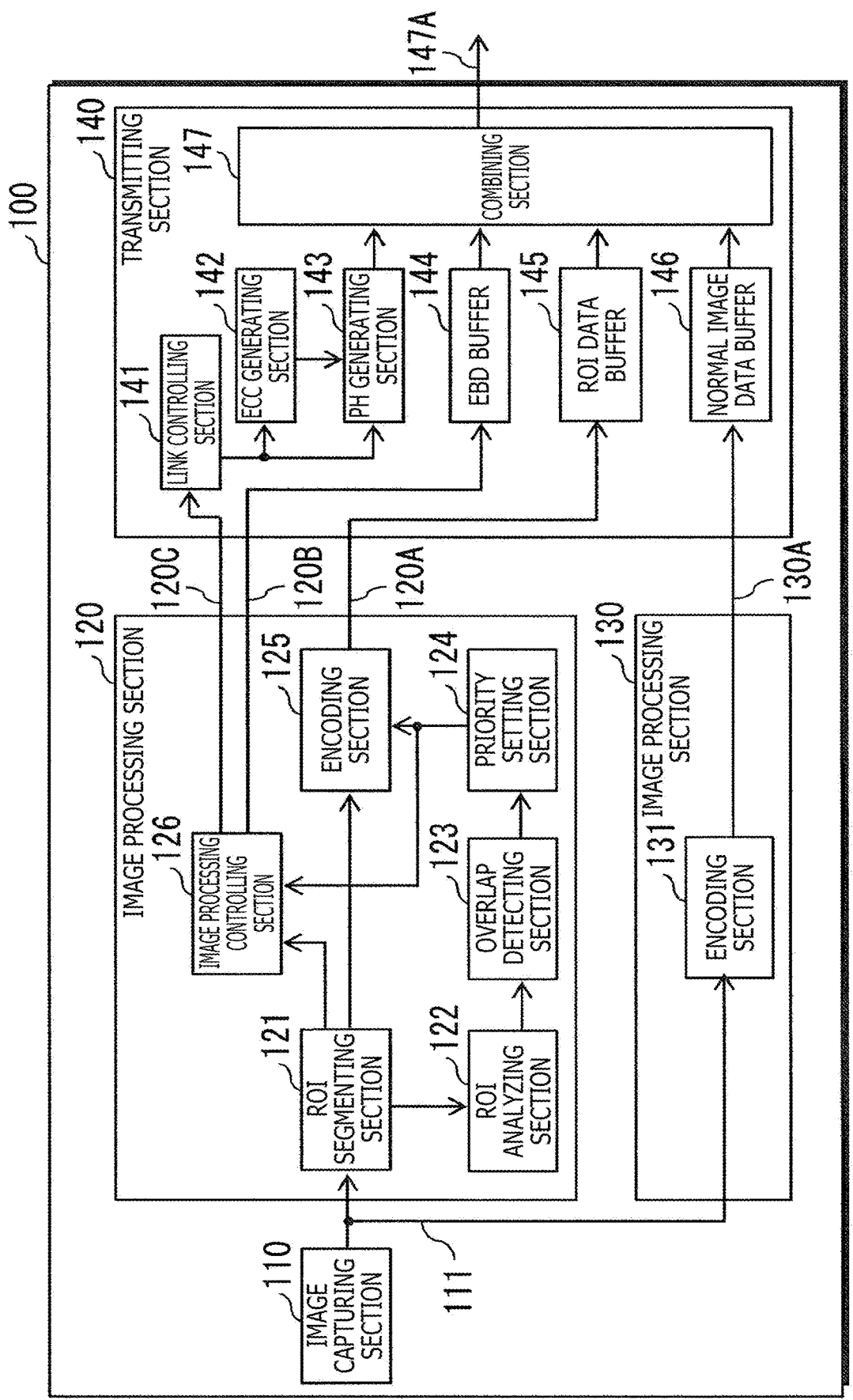
FIG. 2 is a diagram illustrating a general configurational example of a video transmitting apparatus illustrated in FIG. 1.
Figure 3:
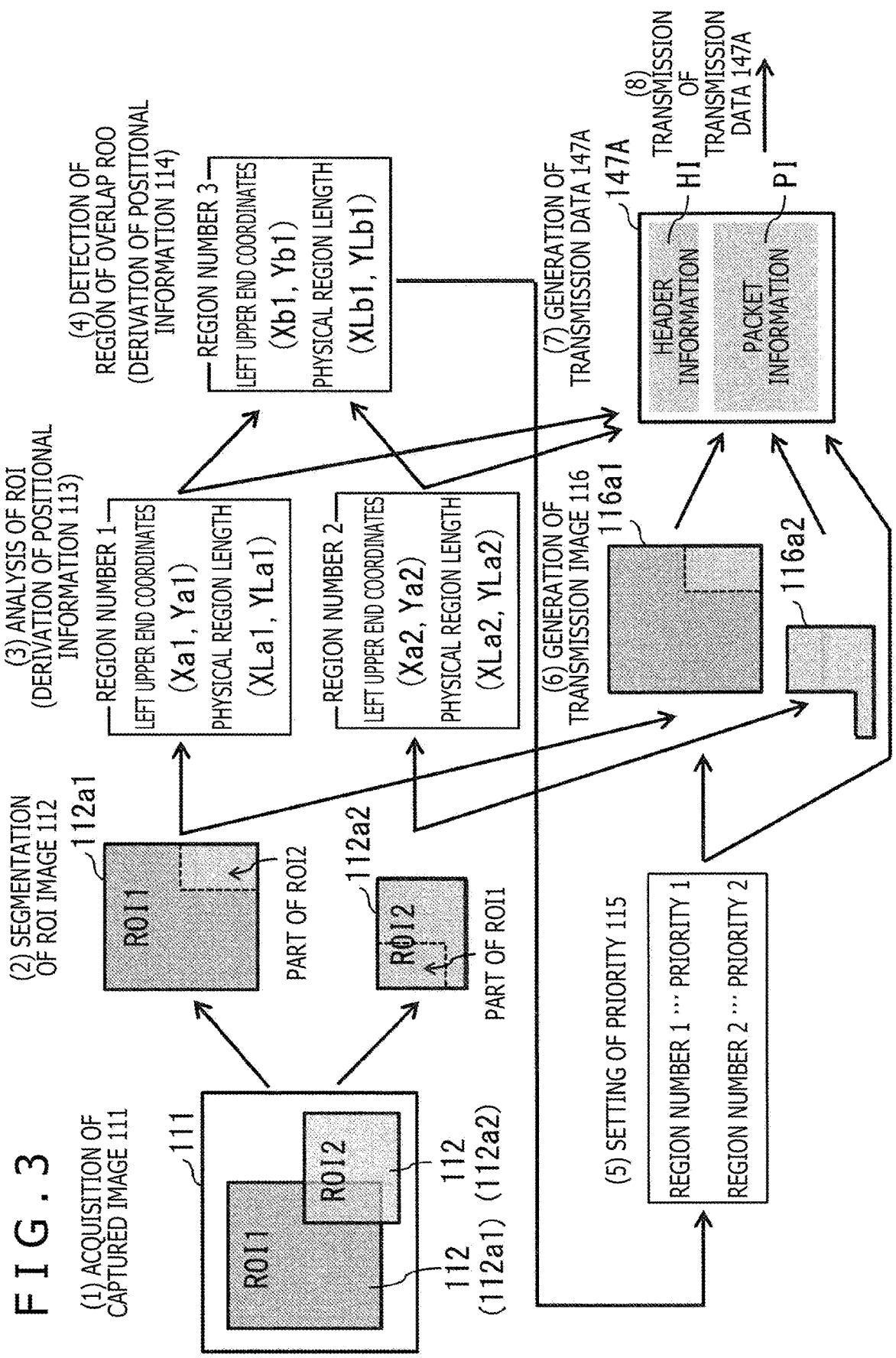
FIG. 3 is a diagram illustrating an example of a procedure for generating transmission data when two ROIs are included in a captured image.

FIG. 2 illustrates a configurational example of the video transmitting apparatus 100. The video transmitting apparatus 100 corresponds to a specific example of the CSI transmitter 100A. The video transmitting apparatus 100 includes an image capturing section 110, image processing sections 120 and 130, and a transmitting section 140, for example. The video transmitting apparatus 100 transmits transmission data 147A generated by performing a predetermined processing process on a captured image 111 obtained by the image capturing section 110 through the data line DL to the video receiving apparatus 200. FIG. 3 illustrates an example of a procedure for generating the transmission data 147A.

The image capturing section 110 converts an optical image obtained through an optical lens into image data, for example. The image capturing section 110 includes a CCD (Charge Coupled Device) image sensor or a CMOS (Complementary Metal Oxide Semiconductor) image sensor. The image capturing section 110 has an analog-to-digital converting circuit that converts analog image data into digital image data. The converted image data may be of a YCbCr data format that represents the colors of pixels with a luminance component Y and color difference components Cb and Cr, or may be of a RGB data format. The image capturing section 110 outputs the captured image 111 (digital image data) obtained by image capturing to the image processing section 120.

The image processing section 120 includes a circuit for performing a predetermined processing process on the captured image 111 input from the image capturing section 110. According to the presupposed technology 1, the image processing section 120 performs a predetermined processing process on the captured image 111 input from the image capturing section 110 in a case where a control signal instructing the image processing section 120 to segment ROIs is input from the video receiving apparatus 200 through the camera control interface CCI. However, the presupposed technology 1 is also applicable where the video transmitting apparatus 100, i.e., the transmission side, gives an instruction as to coordinates for segmenting ROIs. In this case, the transmission side receives information representing "persons" or "objects" to be acquired by ROIs sent out from the reception side, and makes a decision and gives an instruction as to segmenting coordinates, for example. The video receiving apparatus 200 thus generates various kinds of data (120A, 120B and 120C) and outputs them to the transmitting section 140. The image processing section 130 includes a circuit for performing a predetermined processing process on the captured image 111 input from the image capturing section 110. The image processing section 130 performs a predetermined processing process on the captured image 111 input from the image capturing section 110 in a case where a control signal instructing the image processing section 130 to output normal images is input from the video receiving apparatus 200 through the camera control interface CCI. The image processing section 130 thus generates image data 130A and outputs them to the transmitting section 140.

The image processing section 130 has an encoding section 131, for example. The encoding section 131 encodes the captured image 111 to generate compressed image data 130A. The image processing section 130 compresses the captured image 111 in a compression format that conforms to the JPEG (Joint Photographic Experts Group) standards, for example, as the format of the compressed image data 130A.

The image processing section 120 has a ROI segmenting section 121, a ROI analyzing section 122, an overlap detecting section 123, a priority setting section 124, an encoding section 125, and an image processing controlling section 126, for example.

The ROI segmenting section 121 specifies an image or a plurality of images as an imaging target or targets included in the captured image 111 input from the image capturing section 110, and establishes a region of interest ROI per specified object. A region of interest ROI refers to a square-shaped region including a specified object, for example. The ROI segmenting section 121 specifies an image of each region of interest ROI (for example, a ROI image 112 in FIG. 3) from the captured image 111. The ROI segmenting section 121 further assigns a region number as an identifier to each established region of interest ROI. For example, in a case where the ROI segmenting section 121 has established two regions of interest ROI in the captured image 111, the ROI segmenting section 121 assigns a region number 1 to one of the regions of interest ROI (for example, a region of interest ROI1 in FIG. 3) and assigns a region number 2 to the other region of interest ROI (for example, a region of interest ROI2 in FIG. 3). The ROI segmenting section 121 stores the assigned identifiers (region numbers) in a storage section, for example. For example, the ROI segmenting section 121 stores each ROI image 112 segmented from the captured image 111 in the storage section. Furthermore, for example, the ROI segmenting section 121 stores the identifier (region number) assigned to each region of interest ROI, in the storage section in association with the ROI image 112.

The ROI analyzing section 122 derives positional information 113 of each region of interest ROI in the captured image 111. The positional information 113 includes, for example, the left upper end coordinates (Xa, Ya) of the region of interest ROI, the length in an X-axis direction of the region of interest ROI, and the length in a Y-axis direction of the region of interest ROI. The length in the X-axis direction of the region of interest ROI refers, for example, to the physical region length XLa in the X-axis direction of the region of interest ROI. The length in the Y-axis direction of the region of interest ROI refers, for example, to the physical region length YLa in the Y-axis direction of the region of interest ROI. The physical region length represents the physical length, i.e., data length, of the region of interest ROI. The positional information 113 may include the coordinates of a position different from the left upper end of the region of interest ROI. The ROI analyzing section 122 stores the derived positional information in the storage section, for example. The ROI analyzing section 122 stores the derived positional information in the storage section in association with the identifier, i.e., region number, assigned to the region of interest ROI.

The ROI analyzing section 122 may further derive, as the positional information 113 per region of interest ROI, the output region length XLc in the X-axis direction of the region of interest ROI and the output region length YLc in the Y-axis direction of the region of interest ROI, for example. The output region length represents the physical length, i.e., data length, of the region of interest ROI after the resolution of the region of interest ROI has been changed by a decimating process or an addition of pixels, for example. The ROI analyzing section 122 may derive, for example, as the positional information 113 per region of interest ROI, sensing information, exposure information, gain information, AD (Analog-Digital) word length, image format, etc., for example, and store them in the storage section.

The sensing information refers to the contents of calculations about objects included in the region of interest ROI and additional information of a subsequent signal processing process on the ROI image 112. The exposure information refers to an exposure time of the region of interest ROI. The gain information refers to gain information of the region of interest ROI. The AD word length refers to the word length of data per pixel AD-converted in the region of interest ROI. The image format refers to the format of the image of the region of interest ROI. The ROI analyzing section 122 may, for example, derive the number of regions of interest ROI (the number of ROIs) included in the captured image 111 and store the number of ROIs in the storage section.

When a plurality of objects is specified as imaging targets in the captured image 111, the overlap detecting section 123 detects a region of overlap (ROO (Region of Overlap)) where two or more regions of interest ROI overlap each other on the basis of the positional information 113 of a plurality of regions of interest ROI in the captured image 111. Specifically, the overlap detecting section 123 derives positional information 114 of each region of overlap ROO in the captured image 111. The overlap detecting section 123 stores the derived positional information 114 in the storage section, for example. For example, the overlap detecting section 123 stores the derived positional information 114 in the storage section in corresponding relation to the region of overlap ROO. The region of overlap ROO refers to a square-shaped region identical or smaller in size to the smallest region of interest ROI among two or more regions of interest ROI that overlap each other. The positional information 114 includes, for example, the left upper end coordinates (Xb, Yb) of the region of overlap ROO, the length in the X-axis direction of the region of overlap ROO, and the length in the Y-axis direction of the region of overlap ROO. The length in the X-axis direction of the region of overlap ROO refers, for example, to the physical region length XLb. The length in the Y-axis direction of the region of overlap ROO refers, for example, to the physical region length YLb. The positional information 114 may include the coordinates of a position different from the left upper end of the region of interest ROI.

The priority setting section 124 assigns a priority 115 to each region of interest ROI in the captured image 111. The priority setting section 124 stores the assigned priority 115 in the storage section, for example. For example, the priority setting section 124 stores the assigned priority 115 in the storage section in corresponding relation to the region of interest ROI. The priority setting section 124 may assign a priority 115 to each region of interest ROI separately from the region number assigned to each region of interest ROI, or may use the region number assigned to each region of interest ROI instead of a priority 115. The priority setting section 124 may, for example, store the priority 115 in the storage section in association with the region of interest ROI or may store the region number assigned to each region of interest ROI in the storage section in association with the region of interest ROI.

The priority 115 refers to an identifier of each region of interest ROI, and represents discriminating information for discriminating which one of a plurality of regions of interest ROI in the captured image 111 a region of overlap ROO has been eliminated from. For example, the priority setting section 124 assigns "1" as a priority 115 to one of two regions of interest ROI each including a region of overlap ROO and assigns "2" as a priority 115 to the other region of interest ROI. In this case, a region of overlap ROO is eliminated with respect to a region of interest ROI where the numerical value of the priority 115 is larger in generating a transmission image 116 to be described later. Incidentally, the priority setting section 124 may assign the same number as the region number assigned to each region of interest ROI as a priority 115 to the region of interest ROI. For example, the priority setting section 124 stores the priority 115 assigned to each region of interest ROI in the storage section in association with the ROI image 112.

The encoding section 125 encodes each transmission image 116 to generate compressed image data 120A. The encoding section 125 compresses each transmission image 116 in a compression format that conforms to the JPEG standards, for example, as the format of the compressed image data 120A. Before performing the above compression process, the encoding section 125 generates each transmission image 116. In order that an image 118 of a region of overlap ROO will not overlappingly be included in a plurality of ROI images 112 obtained from the captured image 111, the encoding section 125 generates a plurality of transmission images 116 where the image 118 has been eliminated from the plurality of ROI images 112 obtained from the captured image 111.

The encoding section 125 determines which one of a plurality of ROI images 112 the image 118 is to be eliminated from, on the basis of the priority 115 assigned to each region of interest ROI, for example. The encoding section 125 may determine, for example, which one of a plurality of ROI images 112 the image 118 is to be eliminated from, by using the region number assigned to each region of interest ROI as a priority 115. The encoding section 125 uses the ROI image 112 as specified above from which the image 118 has been eliminated as a transmission image 116 (for example, a transmission image 116a2 in FIG. 3). The encoding section 125 uses the ROI image 112 that does not include a region of overlap ROO or the ROI image 112 which the image 118 has not been eliminated from as determined above, as a transmission image 116 (for example, a transmission image 116a1 in FIG. 3).

The image processing controlling section 126 generates ROI information 120B and frame information 120C and transmits them to the transmitting section 140. The ROI information 120B includes each positional information 113, for example. Furthermore, the ROI information 120B includes at least one of the data type of each region of interest ROI, the number of regions of interest ROI included in the captured image 111, the region number (or the priority 115) of each region of interest ROI, the data length of each region of interest ROI, and the image format of each region of interest ROI. The frame information 120C includes the number of a virtual channel assigned to each frame, the data type of each region of interest ROI, the payload length per line, etc., for example. The data type includes YUV data, RGB data, or RAW data, for example. Furthermore, the data type includes data of the ROI format, data of the normal format, etc., for example. The payload length represents the number of pixels included in the payload of a long packet, e.g., the number of pixels per region of interest ROI. The payload refers to major data (application data) transmitted between the video transmitting apparatus 100 and the video receiving apparatus 200. The long packet refers to a packet disposed between a packet header PH and a packet footer PF.

The transmitting section 140 includes a circuit for generating and sending out transmission data 147A on the basis of various kinds of data (data 120A, 120B, 120C and 130A) input from the image processing sections 120 and 130. The transmitting section 140 sends out the ROI information 120B regarding each region of interest ROI in the captured image 111 as embedded data. Furthermore, in a case where a control signal indicating the segmentation of ROIs is input from the video receiving apparatus 200 via the camera control interface CCI, the transmitting section 140 sends out the image data (compressed image data 120A) of each region of interest ROI as the payload data of a long packet. At this time, the transmitting section 140 sends out the image data (compressed image data 120A) of each region of interest ROI in a common virtual channel. Furthermore, the transmitting section 140 sends out the image data (compressed image data 120A) of each region of interest ROI as an image data frame, and sends out the ROI information 120B regarding each region of interest ROI as the header of an image data frame. Furthermore, in a case where a control signal indicating the outputting of a normal image is input from the video receiving apparatus 200 via the camera control interface CCI, the transmitting section 140 sends out normal image data (compressed image data 130A) as the payload data of a long packet.

The transmitting section 140 has a LINK controlling section 141, an ECC generating section 142, a PH generating section 143, an EBD buffer 144, a ROI data buffer 145, a normal image data buffer 146, and a combining section 147. In a case where a control signal indicating the segmentation of ROIs is input from the video receiving apparatus 200 via the camera control interface CCI, the LINK controlling section 141, the ECC generating section 142, the PH generating section 143, the EBD buffer 144, and the ROI data buffer 145 output data to the combining section 147. In a control signal indicating the outputting of a normal image is input from the video receiving apparatus 200 via the camera control interface CCI, the normal image data buffer 146 outputs data to the combining section 147.

It is noted that the ROI data buffer 145 may doubles as the normal image data buffer 146. In this case, the transmitting section 140 may have a selector for selecting the output from either one of the ROI data buffer 145 and the ROI data buffer 145, between the output terminals of the ROI data buffer 145 and the ROI data buffer 145 and an input terminal of the combining section 147.

Figure 4:
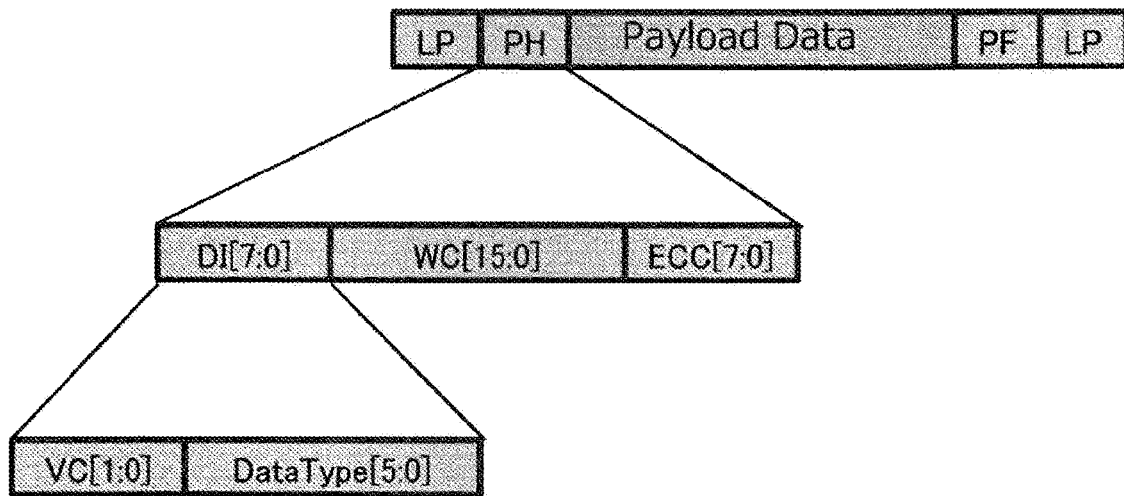
FIG. 4 is a diagram illustrating a configurational example of a packet header.

The LINK controlling section 141 outputs the frame information 120C per line to the LINK controlling section 141 and the ECC generating section 142, for example. The ECC generating section 142 generates an error correcting code for a line in the frame information 120C, for example, on the basis of the data of the line, e.g., the number of the virtual channel, the data type of each region of interest ROI, the payload length per line, etc. The ECC generating section 142 outputs the generated error correcting code to the PH generating section 143, for example. The PH generating section 143 generates a packet header PH per line using the frame information 120C and the error correcting code generated by the ECC generating section 142, for example. At this time, as illustrated in FIG. 4, for example, the packet header PH includes a packet header of the payload data of a long packet. The packet header PH includes DI, WC, and ECC, for example. WC represents an area for indicating the end of a packet with the number of words to the video receiving apparatus 200. WC includes a payload length, for example, and includes the number of pixels per region of interest ROI, for example. ECC represents an area for storing a value for correcting a bit error. ECC includes an error correcting code. DI represents an area for storing a data identifier. DI includes the number of a VC (virtual channel) and DataType (data type of each region of interest ROI). VC (virtual channel) refers to a concept introduced for flow control of packets and represents a mechanism for supporting a plurality of independent data streams that share one link. The PH generating section 143 outputs the generated packet header PH to the combining section 147.

The EBD buffer 144 primarily stores ROI information 120B and outputs the ROI information 120B as embedded data to the combining section 147. The embedded data refer to additional information that can be embedded in the header or footer of an image data frame (see FIG. 5 to be described later). The embedded data include ROI information 120B, for example.

The ROI data buffer 145 primarily stores compressed image data 120A and outputs the compressed image data 120A at predetermined timing as the payload data of a long packet to the combining section 147. In a case where a control signal indicating the segmentation of ROIs is input from the video receiving apparatus 200 via the camera control interface CCI, the ROI data buffer 145 outputs the compressed image data 120A as the payload data of a long packet to the combining section 147. The normal image data buffer 146 primarily stores compressed image data 130A and outputs the compressed image data 130A at predetermined timing as the payload data of a long packet to the combining section 147. In a case where a control signal indicating the outputting of a normal image is input from the video receiving apparatus 200 via the camera control interface CCI, the normal image data buffer 146 outputs the compressed image data 130A as the payload data of a long packet to the combining section 147.

In a case where a control signal indicating the outputting of a normal image is input from the video receiving apparatus 200 via the camera control interface CCI, the combining section 147 generates transmission data 147A on the basis of input data (compressed image data 130A). The combining section 147 outputs the generated transmission data 147A to the video receiving apparatus 200 via the data lane DL. On the other hand, in a case where a control signal indicating the segmentation of ROIs is input from the video receiving apparatus 200 via the camera control interface CCI, the combining section 147 generates transmission data 147A on the basis of various input data (a packet header PH, ROI information 120B, and compressed image data 120A). The combining section 147 outputs the generated transmission data 147A to the video receiving apparatus 200 via the data lane DL. Specifically, the combining section 147 includes DataType (data type of each region of interest ROI) in the packet header PH of the payload data of a long packet and sends out the data. Furthermore, the combining section 147 sends out image data (compressed image data 120A) of each region of interest ROI in a common virtual channel.

Figure 5:
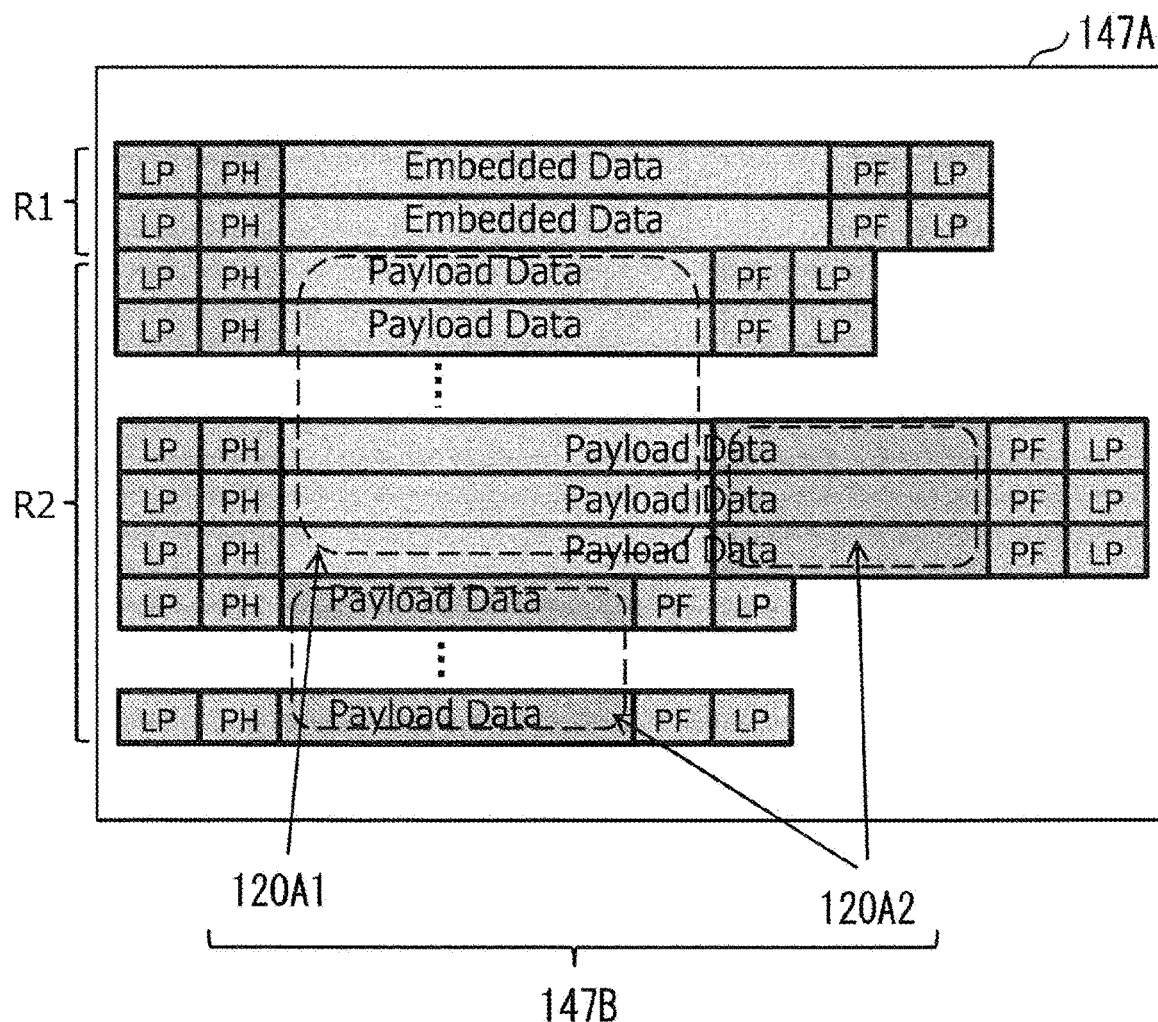
FIG. 5 is a diagram illustrating a configurational example of transmission data.

The transmission data 147A include an image data frame as illustrated in FIG. 5, for example. The image data frame normally has a header area, a packet area, and a footer area. In FIG. 5, the footer area is omitted from illustration for the sake of convenience. The frame header area R1 of the transmission data 147A includes embedded data. At this time, the embedded data include ROI information 120B. In FIG. 5, the packet area R2 of the transmission data 147A includes the payload data of a long packet per line, and also include a packet header PH and a packet footer PF at positions sandwiching the payload data of a long packet. Furthermore, the packet area R2 includes low power modes LP at positions sandwiching the packet header PH and the packet footer PF.

At this time, the packet header PH includes DI, WC, and ECC, for example. WC includes a payload length, for example, and includes the number of pixels per region of interest ROI, for example. ECC includes an error correcting code. DI includes the number of a VC (virtual channel) and DataType (data type of each region of interest ROI). According to the present embodiment, the number of a common virtual channel is assigned to a VC of each line. In FIG. 5, the packet area R2 of the transmission data 147A includes compressed image data 147B. The compressed image data 147B includes one compressed image data 120A or a plurality of compressed image data 120A. Here in FIG. 5, a packet group closer to the packet header PH includes compressed image data 120A (120A1) of the transmission image 116a1 in FIG. 3, and a packet group remoter from the packet header PH includes compressed image data 120A (120A2) of the transmission image 116a2 in FIG. 3. These two compressed image data 120A1 and 120A2 make up the compressed image data 147B. The payload data of a long packet of each line include one line of pixel data in the compressed image data 147B.

Figure 6:
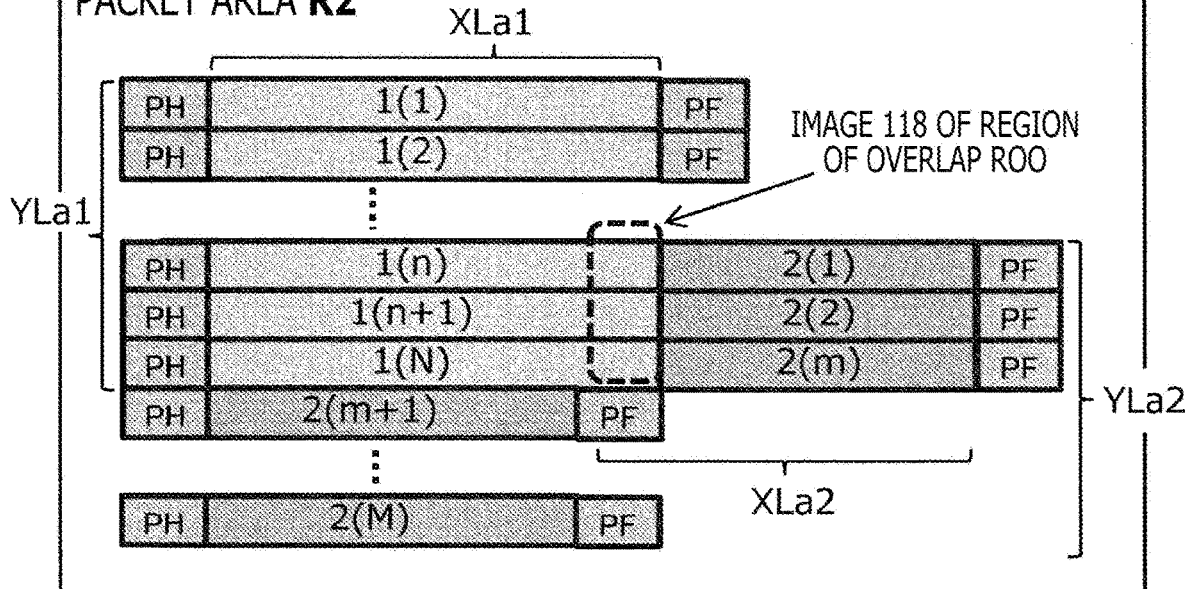
FIG. 6 is a diagram illustrating a configurational example of transmission data.

FIG. 6 illustrates a configurational example of the transmission data 147A. The transmission data 147A include a frame header area R1 and a packet area R2, for example. Incidentally, FIG. 6 illustrates details of the contents of the frame header area R1. Furthermore, low power modes LP are omitted from illustration in FIG. 6.

The frame header area R1 includes a frame number F1 as an identifier of the transmission data 147A, for example. The frame header area R1 includes information regarding compressed image data 147B included in the packet area R2. The frame header area R1 includes, for example, the number of compressed image data 120A (the number of ROIs) included in the compressed image data 147B and information regarding the ROI image 112 (ROI information 120B) corresponding to each compressed image data 120A included in the compressed image data 147B.

The combining section 147 divides and places compressed image data 147B per pixel row of compressed image data 120A in the packet area R2 of the transmission data 147A, for example. Therefore, the packet area R2 of the transmission data 147A does not include overlapping compressed image data corresponding to an image 118 of a region of overlap ROO. Furthermore, the combining section 147 has eliminated therefrom a pixel row not corresponding to each transmission image 116 of the captured image 111 in the packet area R2 of the transmission data 147A, for example. Consequently, the packet area R2 of the transmission data 147A does not include a pixel row not corresponding to each transmission image 116 of the captured image 111. Incidentally, in the packet area R2 in FIG. 6, a zone surrounded by the broken line corresponds to compressed image data of an image 118 of a region of overlap ROO.

The boundary between a packet group closer to the packet header PH (for example, 1(*n*) in FIG. 6) and a packet group remoter from the packet header PH (for example, 2(1) in FIG. 6) is specified by the physical region length XLa1 of the ROI image 112 corresponding to the compressed image data of the packet group closer to the packet header PH (for example, 1(*n*) in FIG. 6). A packet starting position in the compressed image data corresponding to an image 118 of a region of overlap ROO included in a packet group closer to the packet header PH (for example, 1(*n*) in FIG. 6) is specified by the physical region length XLa2 of the ROI image 112 corresponding to a packet group remoter from the packet header PH (for example, 2(1) in FIG. 6).

Figure 7:
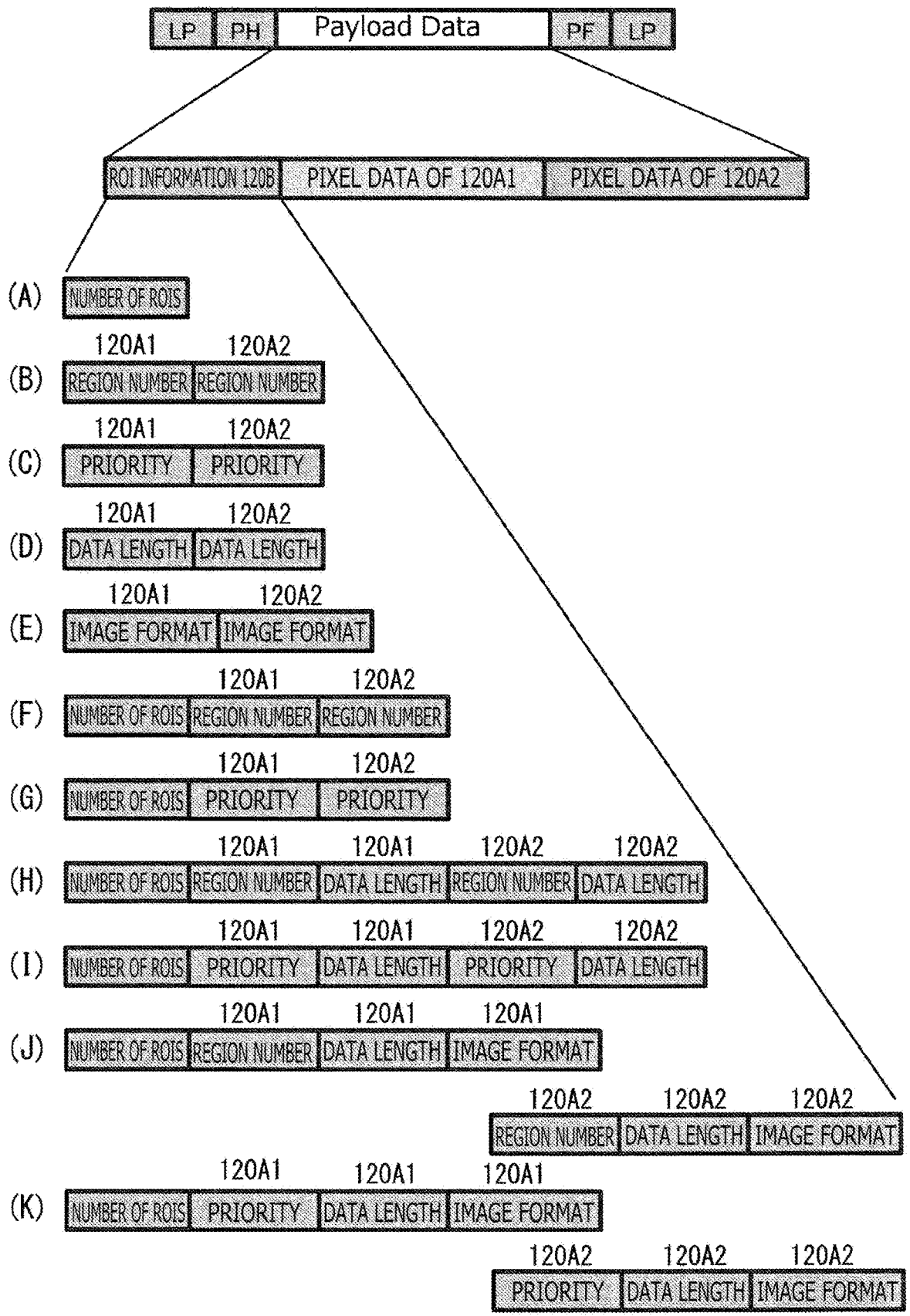
FIG. 7 is a diagram illustrating a configurational example of the payload data of a long packet.

When the payload data of a long packet is to be generated per line in the packet area R2 of the transmission data 147A, for example, the combining section 147 may include ROI information 120B, as illustrated in FIG. 7, for example, other than pixel data of one line in the compressed image data 147B, in the payload data of the long packet. In other words, the combining section 147 may include ROI information 120B in the payload data of a long packet and output the data. At this time, as illustrated in FIG. 7(A) to FIG. 7(K), the ROI information 120B includes at least one of the number of regions of interest ROI (the number of ROIs) included in the captured image 111, the region number (or the priority 115) of each region of interest ROI, the data length of each region of interest ROI, and the image format of each region of interest ROI. The ROI information 120B should preferably be placed in the payload data of a long packet at the end on the packet header PH side (i.e., the leading end of the payload data of the long packet).

(Video Receiving Apparatus 200)

Figure 8:
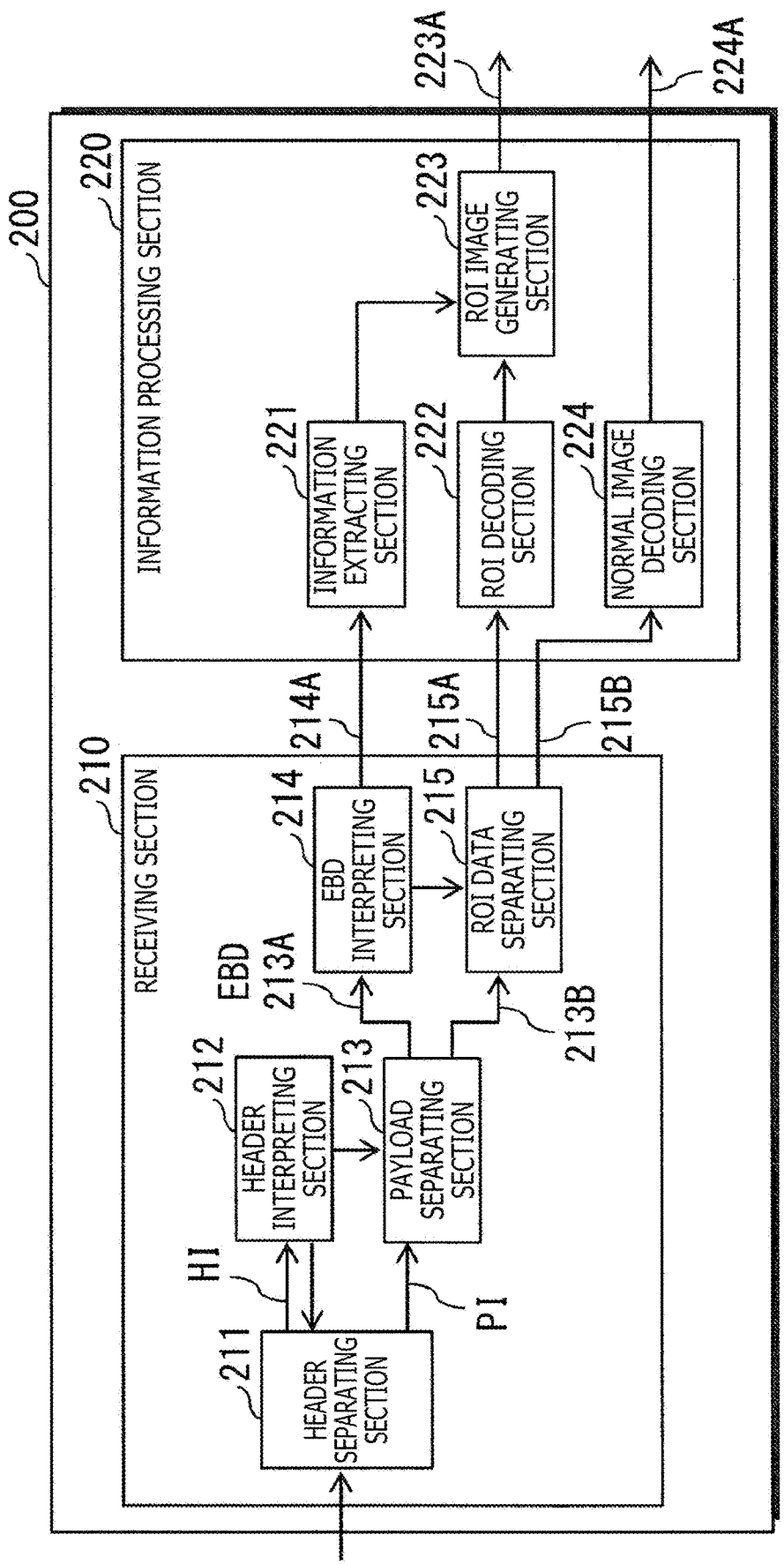
FIG. 8 is a diagram illustrating a general configurational example of a video receiving apparatus illustrated in FIG. 1.
Figure 9:
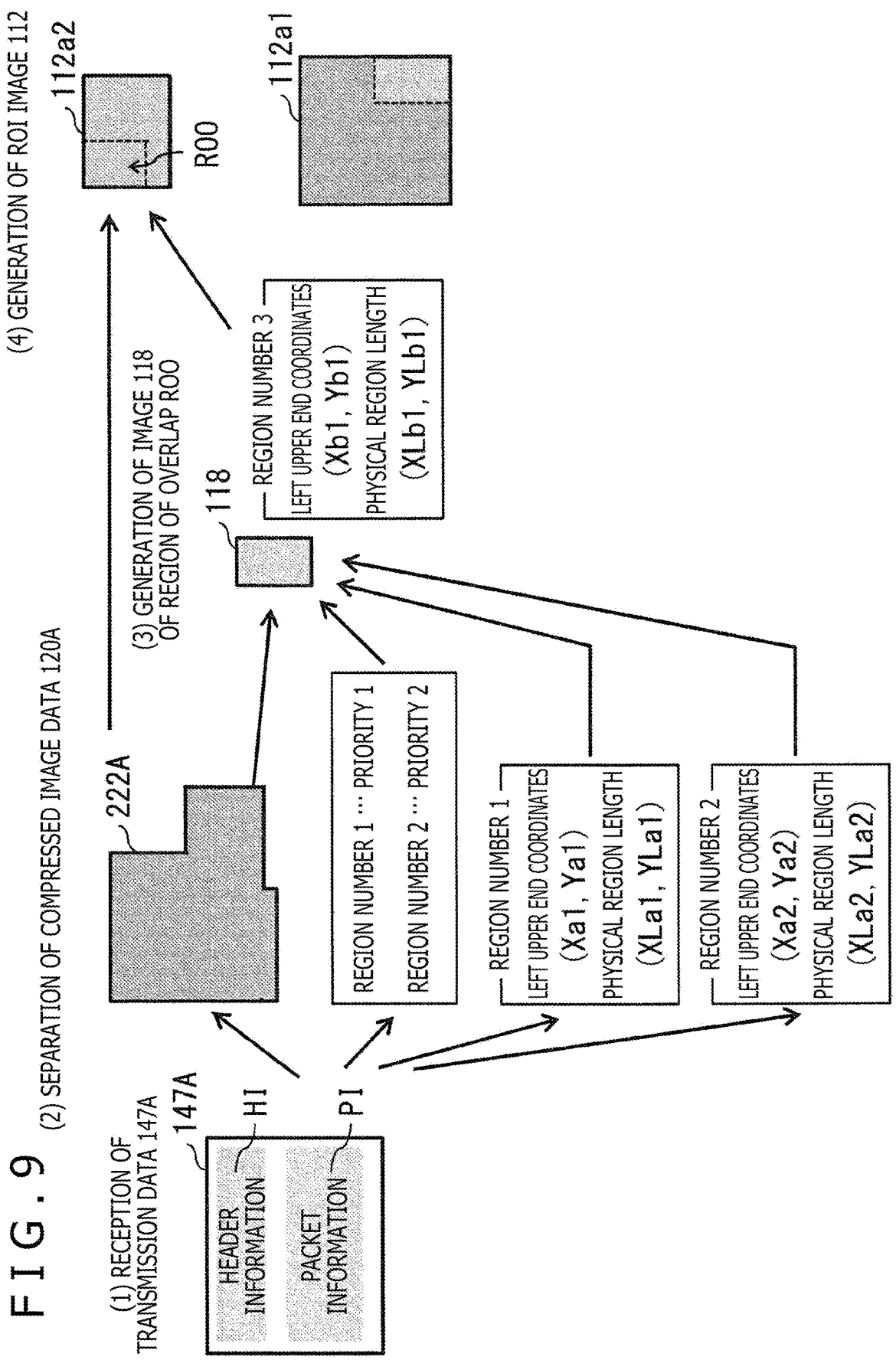
FIG. 9 is a diagram illustrating an example of a procedure for generating two ROI images included in a captured image when two images are included in transmission data.

Next, the video receiving apparatus 200 will be described below. FIG. 8 illustrates a configurational example of the video receiving apparatus 200. FIG. 9 illustrates an example of a procedure for generating a ROI image 223A in the video receiving apparatus 200. The video receiving apparatus 200 includes an apparatus for receiving signals according to standards common to the video transmitting apparatus 100 (for example, the MIPI CSI-2 standards, the MIPI CSI-3 standards, or the MIPI DSI standards). The video receiving apparatus 200 has a receiving section 210 and an information processing section 220. The receiving section 210 includes a circuit for receiving transmission data 147A output from the video transmitting apparatus 100 via the data lane DL, performing a predetermined process on the received transmission data 147A to generate various kinds of data (214A, 215A and 215B), and outputting the generated data to the information processing section 220. The information processing section 220 includes a circuit for generating a ROI image 223A based on various kinds of data (214A and 215A) received from the receiving section 210 and generating a normal image 224A based on data (215B) received from the receiving section 210.

The receiving section 210 has, for example, a header separating section 211, a header interpreting section 212, a payload separating section 213, an EBD interpreting section 214, and a ROI data separating section 215.

The header separating section 211 receives transmission data 147A from the video transmitting apparatus 100 via the data lane DL. Specifically, the header separating section 211 receives transmission data 147A including ROI information 120B regarding each region of interest ROI in the captured image 111 in embedded data and also including image data (compressed image data 120A) of each region of interest ROI in the payload data of a long packet. The header separating section 211 separates the received transmission data 147A into a frame header area R1 and a packet area R2. The header interpreting section 212 specifies the positions of the payload data of long packets included in the packet area R2 on the basis of data (specifically, embedded data) included in the frame header area R1. The payload separating section 213 separates the payload data of the long packets included in the packet area R2 from the packet area R2 on the basis of the positions of the payload data of the long packets that have been specified by the header interpreting section 212.

The EBD interpreting section 214 outputs the embedded data as EBD data 214A to the information processing section 220. Furthermore, the EBD interpreting section 214 discriminates whether the image data included in the payload data of the long packets are the compressed image data 120A of the image data 116 of a ROI or the compressed image data 130A of normal image data, from the data type included in the embedded data. The EBD interpreting section 214 outputs the discriminated result to the ROI data separating section 215.

If the image data included in the payload data of the long packets are the compressed image data 120A of the image data 116 of a ROI, then the ROI data separating section 215 outputs the payload data of the long packet as payload data 215A to the information processing section 220 (specifically, a ROI decoding section 222). If the image data included in the payload data are the compressed image data 130A, then the ROI data separating section 215 outputs the payload data of the long packet as payload data 215A to the information processing section 220 (specifically, a normal image decoding section 224). In a case where the payload data of the long packet include the ROI information 120B, the payload data 215A include the ROI information 120B and one line of pixel data of the compressed image data 147B.

The information processing section 220 extracts the ROI information 120B from the embedded data included in the EBD data 214A. The information processing section 220 extracts an image of each region of interest ROI (ROI image 112) in the captured image 111 from the payload data of the long packet included in the transmission data 147A received by the receiving section 210 on the basis of the ROI information 120B extracted by an information extracting section 221. The information processing section 220 has, for example, the information extracting section 221, the ROI decoding section 222, a ROI image generating section 223, and the normal image decoding section 224.

The normal image decoding section 224 decodes the payload data 215B to generate a normal image 224A. The ROI decoding section 222 decodes the compressed image data 147B included in the payload data 215A to generate image data 222A. The image data 222A represent one transmission image 116 or a plurality of transmission images 116.

The information extracting section 221 extracts the ROI information 120B from the embedded data included in the EBD data 214A. For example, the information extracting section 221 extracts the number of regions of interest ROI included in the captured image 111, the region number (or the priority 115) of each region of interest ROI, the data length of each region of interest ROI, and the image format of each region of interest ROI, for example, from the embedded data included in the EBD data 214A. In other words, the transmission data 147A include the region number (or the priority 115) of a region of interest ROI corresponding to each transmission image 116 as discriminating information for discriminating which one of a plurality of transmission images 116 obtained from the transmission data 147A an image 118 of a region of overlap ROO has been eliminated from.

The ROI image generating section 223 detects a region of overlap ROO where two or more regions of interest ROI overlap each other on the basis of the ROI information 120B obtained by the information extracting section 221.

The information extracting section 221 extracts, for example, coordinates (for example, left upper end coordinates (Xa1, Ya1)), lengths (for example, physical region lengths XLa1 and YLa1), and a region number 1 (or a priority 115 (=1)) of a region of interest ROI corresponding to a ROI image 112a1 from the embedded data included in the EBD data 214A. Furthermore, the information extracting section 221 extracts, for example, coordinates (for example, left upper end coordinates (Xa2, Ya2)), lengths (for example, physical region lengths XLa2, YLa2), and a region number 2 (or a priority 115 (=2)) of a region of interest ROI corresponding to a ROI image 112a2 from the embedded data included in the EBD data 214A.

At this time, the ROI image generating section 223 derives positional information 114 of the region of overlap ROO based on these extracted pieces of information (hereinafter referred to as "extracted information 221A"). The ROI image generating section 223 derives, for example, coordinates (for example, left upper end coordinates Xb1, Yb1) and lengths (for example, physical region lengths XLb1 and YLb1) of the region of overlap ROO as the positional information 114 of the region of overlap ROO.

Incidentally, the ROI image generating section 223 may acquire the ROI information 120B from the payload data 215A instead of acquiring the ROI information 120B from the embedded data included in the EBD data 214A. In this case, the ROI image generating section 223 may detect a region of overlap ROO where two or more regions of interest ROI overlap each other on the basis of the ROI information 120B included in the payload data 215A. Furthermore, the ROI image generating section 223 may extract the extracted information 221A from the ROI information 120B included in the payload data 215A, and may derive the positional information 114 of a region of overlap ROO based on the extracted information 221A thus extracted.

Moreover, the ROI image generating section 223 generates an image (ROI images 112a1 and 112a2) of each region of interest ROI in the captured image 111 on the basis of the image data 222A, the extracted information 221A, and the positional information 114 of the region of overlap ROO. The ROI image generating section 223 outputs the generated images as a ROI image 223A.

[Procedure]

Next, an example of a procedure for transmitting data in the video transmission system 1 will be described below with reference to FIGS. 3 and 9.

First, the image capturing section 110 outputs a captured image 111 (digital image data) obtained by image capturing to the image processing section 120. The ROI segmenting section 121 specifies two regions of interest ROI1 and ROI2 included in the captured image 111 input from the image capturing section 110. The ROI segmenting section 121 segments images of the respective regions of interest ROI1 and ROI2 (ROI images 112a1 and 112a2) from the captured image 111. The ROI segmenting section 121 assigns a region number 1 as an identifier to the region of interest ROI1 and assigns a region number 2 as an identifier to the region of interest ROI2.

The ROI analyzing section 122 derives positional information 113 of each region of interest ROI in the captured image 111. The ROI analyzing section 122 derives left upper coordinates (Xa1, Ya1) of the region of interest ROI1, a length (XLa1) in the X-axis direction of the region of interest ROI1, and a length (YLa1) in the Y-axis direction of the region of interest ROI on the basis of the region of interest ROI1. The ROI analyzing section 122 derives left upper coordinates (Xa2, Ya2) of the region of interest ROI2, a length (XLa2) in the X-axis direction of the region of interest ROI2, and a length (YLa2) in the Y-axis direction of the region of interest ROI2 on the basis of the region of interest ROI2.

The overlap detecting section 123 detects a region of overlap ROO where the two regions of interest ROI1 and ROI2 overlap each other on the basis of the positional information 113 of the two regions of interest ROI1 and ROI2 in the captured image 111. Specifically, the overlap detecting section 123 derives positional information 114 of the region of overlap ROO in the captured image 111. The overlap detecting section 123 derives left upper coordinates (Xb1, Yb1) of the region of overlap ROO, a length (XLb1) in the X-axis direction of the region of overlap ROO, and a length (YLb1) in the Y-axis direction of the region of overlap ROO as the positional information 114 of the region of overlap ROO in the captured image 111.

The priority setting section 124 assigns "1" as a priority 115 to the region of interest ROI1 that is one of the two regions of interest ROI1 and ROI2, and assigns "2" as a priority 115 to the other region of interest ROI2.

The encoding section 125 generates two transmission images 116a1 and 116a2 where an image 118 of the region of overlap ROO has been eliminated from the two ROI images 112a1 and 112a2 obtained from the captured image 111, in order that the image 118 will not overlappingly be included in the two regions of interest ROI1 and ROI2.

The encoding section 125 determines which one of the two ROI images 112a1 and 112a2 the image 118 is to be eliminated from on the basis of region numbers (or the priority 115) of the two regions of interest ROI1 and ROI2. The encoding section 125 eliminates the image 118 from the ROI image 112a2 corresponding to the region of interest ROI2 whose region number (or the priority 115) is larger among the two regions of interest ROI1 and ROI2, thereby generating a transmission image 116a2. The encoding section 125 uses the ROI image 112a1 itself corresponding to the region of interest ROI1 whose region number (or the priority 115) is smaller among the two regions of interest ROI1 and ROI2, as a transmission image 116a1.

The image processing controlling section 126 generates ROI information 120B and frame information 120C and transmits them to the transmitting section 140. The transmitting section 140 generates transmission data 147A based on various kinds of data (120A, 120B, 120C and 130A) input from the image processing sections 120 and 130. The transmitting section 140 sends out the generated transmission data 147A to the video receiving apparatus 200 via the data lane DL.

The receiving section 210 receives the transmission data 147A output from the video transmitting apparatus 100 via the data lane DL. The receiving section 210 performs a predetermined process on the received transmission data 147A to generate EBD data 214A and payload data 215A and outputs them to the information processing section 220.

The information extracting section 221 extracts ROI information 120B from the embedded data included in the EBD data 214A. The information extracting section 221 extracts coordinates (for example, left upper end coordinates (Xa1, Ya1)), lengths (for example, physical region lengths XLa1 and YLa1), and a region number 1 (or a priority 115 (=1)) of the region of interest ROI corresponding to the ROI image 112a1 from the embedded data included in the EBD data 214A. Furthermore, the information extracting section 221 extracts coordinates (for example, left upper end coordinates (Xa2, Ya2)), lengths (for example, physical region lengths XLa2, YLa2), and a region number 2 (or a priority 115 (=2)) of the region of interest ROI corresponding to the ROI image 112a2 from the embedded data included in the EBD data 214A. The ROI decoding section 222 decodes the compressed image data 147B included in the payload data 215A to generate image data 222A.

The ROI image generating section 223 derives the positional information 114 of the region of overlap ROO based on the extracted pieces of information (extracted information 221A). The ROI image generating section 223 extracts, for example, coordinates (for example, left upper end coordinates Xb1, Yb1) and lengths (for example, physical region lengths XLb1 and YLb1) of the region of overlap ROO as the positional information 114 of the region of overlap ROO. Furthermore, the ROI image generating section 223 generates an image (ROI images 112a1 and 112a2) of each region of interest ROI in the captured image 111 on the basis of the image data 222A, the extracted information 221A, and the positional information 114 of the region of overlap ROO.

Advantages

Next, advantages of the video transmission system 1 according to the present embodiment will be described below.

In recent years, there have been growing applications in which large amounts of data are transmitted in bulk. Such applications tend to pose large loads on the transmission system, possibly causing the transmission system to go down in worst-case scenarios and fail to perform data transmission.

To avoid transmission system shutdowns, it has customary in the art to specify an object as an imaging target and transmit only a partial image of the specified object that has been segmented, rather than transmitting an entire captured image.

Incidentally, MIPI CS1-2 may be used as a process of transmitting data from an image sensor to an application sensor. It may not be easy to transmit ROIs according to this process due to various limitations.

On the other hand, according to the present embodiment, ROI information 120B regarding each region of interest ROI in the captured image 111 is sent out as embedded data, and image data of each region of interest ROI are sent out as the payload data of a long packet. Therefore, an apparatus (video receiving apparatus 200) that has received transmission data 147A sent out from the video transmitting apparatus 100 can easily extract the image data (ROI image 112) of each region of interest ROI from the transmission data 147A. As a result, it is possible to transmit regions of interest ROIs regardless of various limitations.

According to the present embodiment, furthermore, the image data (compressed image data 120A) of each region of interest ROI are sent out in a common virtual channel. Since a plurality of ROI images 112 can thus be sent in one packet, it is not necessary to enter an LP mode while the plurality of ROI images 112 is being sent, resulting in a high transmission efficiency.

According to the present embodiment, moreover, a data type of each region of interest ROI is included in the packet header PH of the payload data of the long packet and sent. Therefore, the data type of each region of interest ROI can be obtained simply by accessing the packet header PH of the payload data of the long packet, rather than accessing the embedded data. Inasmuch as this increases the processing rate of the video receiving apparatus 200, a high transmission efficiency can be achieved.

According to the present embodiment, furthermore, in a case where the ROI information 120B is included in the payload data of a long packet and sent, the ROI information 120B can be obtained simply by accessing the payload data of the long packet, rather than accessing the embedded data. Inasmuch as this increases the processing rate of the video receiving apparatus 200, a high transmission efficiency can be achieved.

According to the present embodiment, moreover, the ROI information 120B regarding each region of interest ROI is extracted from the embedded data included in the transmission data 147A and an image of each region of interest ROI (ROI image 112) is extracted from the payload data of the long packet include in the transmission data 147A on the basis of the extracted ROI information 120B. This allows the image of each region of interest ROI (ROI image 112) to be easily extracted from the transmission data 147A. As a result, it is possible to transmit regions of interest ROIs regardless of various limitations.

Figure 10:
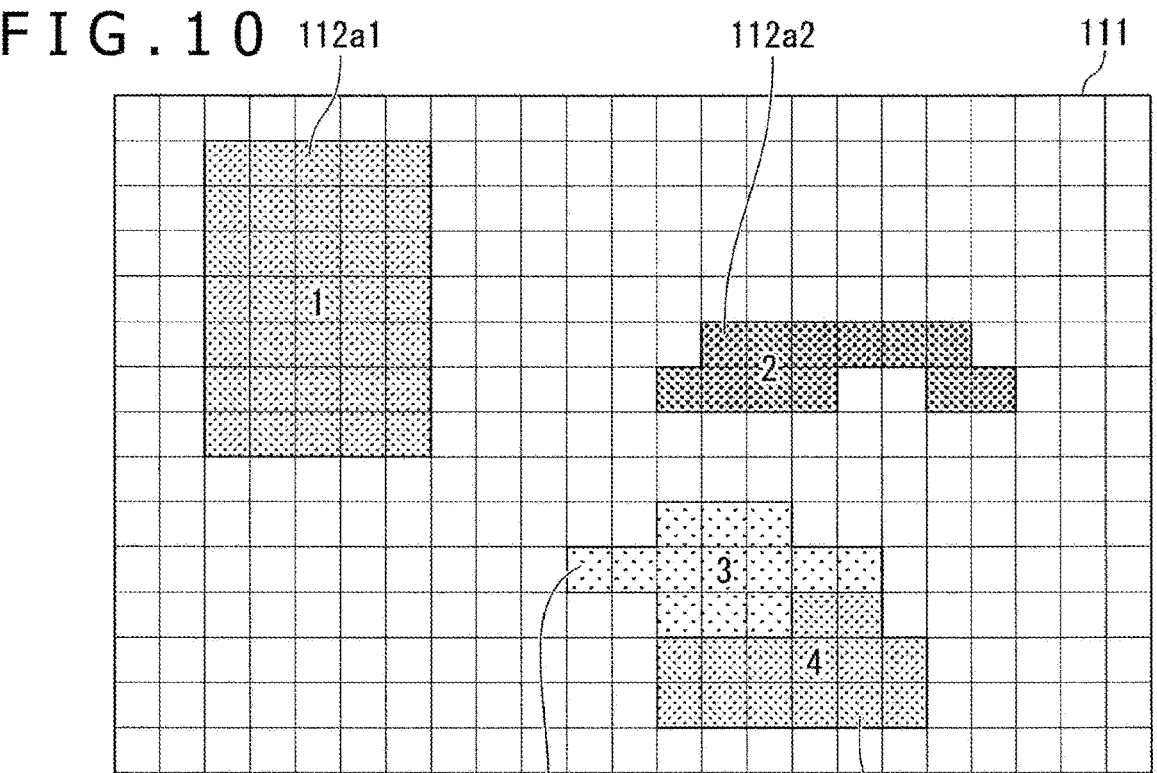
FIG. 10 is a diagram schematically illustrating regions where objects specified in a captured image are placed.
Figure 11:
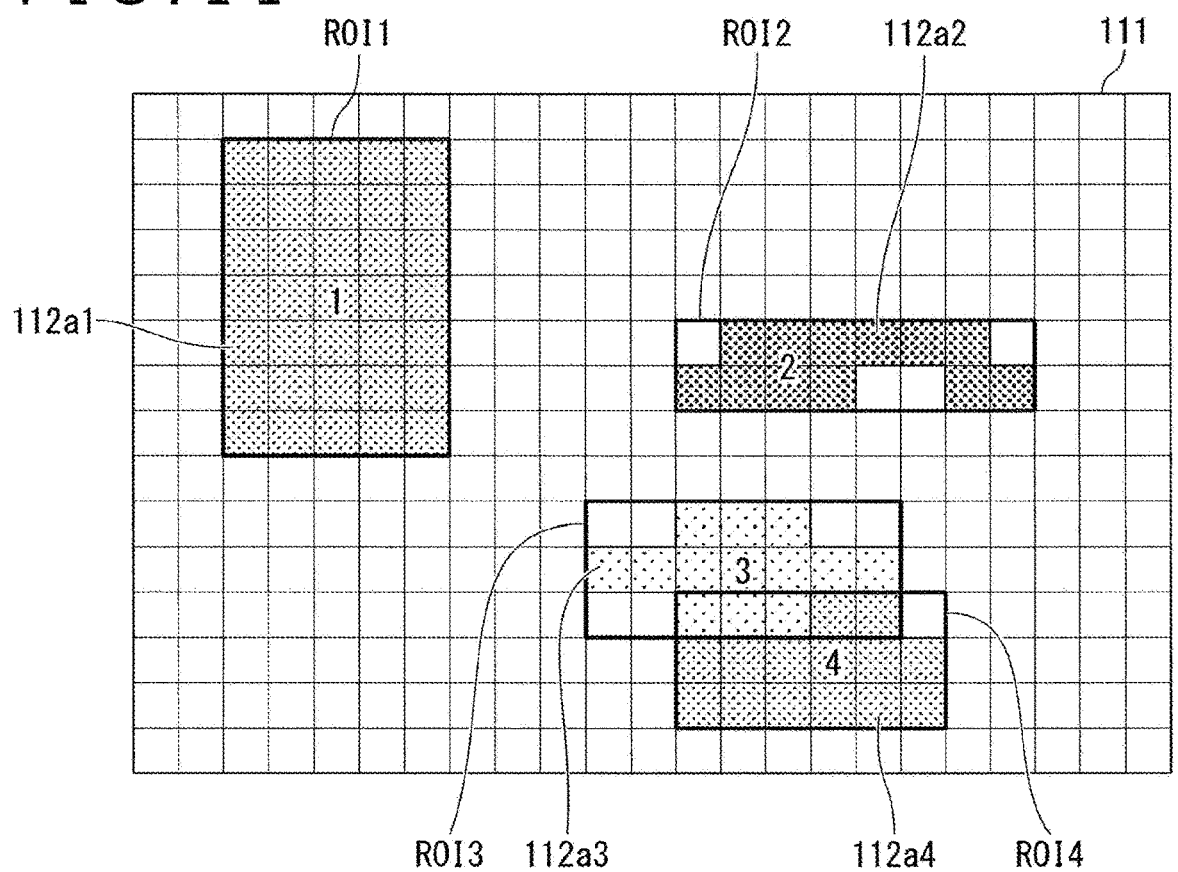
FIG. 11 is a diagram illustrating an example of ROIs established with respect to the specified objects.

2. Technology 2 that is Presupposed for the Present Disclosure:

A technology for transmitting a region of interest (ROI) as a partial region (non-rectangular in shape) segmented from a captured image will be described below using FIGS. 10 through 12 with reference to FIGS. 1 through 9. Specifically, a technology for transmitting and receiving an image of an object as an imaging target that is of a shape other than a square shape (rectangular shape) will be described below. FIG. 10 is a diagram schematically illustrating regions where objects specified in a captured image 111 are placed. For an easier understanding, FIG. 10 depicts the captured image 111 that is captured in an image capturing region including image capturing elements arranged in 15 rows×23 columns. FIG. 11 is a diagram illustrating an example of ROIs established with respect to the specified objects.

According to the presupposed technology 2, as with the presupposed technology 1, there will be described a situation where a predetermined process is performed on the captured image 111 input from the image capturing section 110 in a case where a control signal indicating the segmentation of ROIs is input from the video receiving apparatus 200 via the camera control interface CCI to the video transmitting apparatus 100. However, the presupposed technology 2 is also applicable to a situation where the video transmitting apparatus 100, i.e., the transmission side, indicates coordinates for segmenting ROIs. In such a case, the transmission side is configured to receive information representing "persons" or "objects" to be acquired by ROIs sent out from the reception side, and to make a decision and give an instruction as to segmenting coordinates, for example.

A control signal indicating the segmentation of ROIs is input from the video receiving apparatus 200 via the camera control interface CCI. In response to the control signal, as illustrated in FIG. 10, the ROI segmenting section 121 specifies four objects 1 through 4 included as imaging targets in the captured image 111. The object 1 has a rectangular shape taking up a portion of a left upper region of the captured image 111, for example. The object 2 has a shape taking up a partial region on the right side of the object 1 in the captured image 111 and devoid of both side corners of an upper side of a rectangular shape and a portion of a lower side thereof, for example. The object 3 has a shape taking up a partial region below the object 2 in the captured image 111 and devoid of four corners of a rectangular shape, for example. The object 4 has a shape taking up a partial region below the object 3 in the captured image 111 and devoid of both side corners of an upper side of a rectangular shape, for example. The object 3 and the object 4 partly overlap each other.

As illustrated in FIG. 11, the ROI segmenting section 121 (see FIG. 2) establishes minimum rectangular shapes including the specified objects as regions of interest ROI1 through ROI4, respectively. The ROI segmenting section 121 establishes the region of interest ROI1 for the object 1 and segments a ROI image 112$a$1. Furthermore, the ROI segmenting section 121 establishes the region of interest ROI2 for the object 2 and segments a ROI image 112$a$2. Furthermore, the ROI segmenting section 121 establishes the region of interest ROI3 for the object 3 and segments a ROI image 112$a$3. Furthermore, the ROI segmenting section 121 establishes the region of interest ROI4 for the object 4 and segments a ROI image 112$a$4.

The ROI segmenting section 121 stores the region of interest ROI1 and a region number "1" assigned to the region of interest ROI1 in the storage section in association with each other. The ROI segmenting section 121 stores the region of interest ROI2 and a region number "2" assigned to the region of interest ROI2 in the storage section in association with each other. The ROI segmenting section 121 stores the region of interest ROI3 and a region number "3" assigned to the region of interest ROI3 in the storage section in association with each other. The ROI segmenting section 121 stores the region of interest ROI4 and a region number "4" assigned to the region of interest ROI4 in the storage section in association with each other.

The ROI analyzing section 122 (see FIG. 2) derive positional information of the respective regions of interest ROI1 through ROI4. The ROI analyzing section 122 derives a physical region length XLa1 in the X-axis direction and a physical region length YLa1 in the Y-axis direction, for example, as the positional information of the region of interest ROI1. The ROI analyzing section 122 derives a physical region length XLa2 in the X-axis direction and a physical region length YLa2 in the Y-axis direction, for example, as the positional information of the region of interest ROI2. The ROI analyzing section 122 derives a physical region length XLa3 in the X-axis direction and a physical region length YLa3 in the Y-axis direction, for example, as the positional information of the region of interest ROI3. The ROI analyzing section 122 derives a physical region length XLa4 in the X-axis direction and a physical region length YLa4 in the Y-axis direction, for example, as the positional information of the region of interest ROI4. Furthermore, the ROI analyzing section 122 may derive, as positional information 113 of each region of interest ROI, an output region length XLc in the X-axis direction of the region of interest ROI and an output region length YLc in the Y-axis direction of the region of interest ROI, for example.

The ROI analyzing section 122 derives sizes and total amounts of data of the respective regions of interest ROI1 through ROI4 as information for a subsequent stage by deriving the lengths in the X-axis direction and the Y-axis directions of the respective regions of interest ROIs. The video receiving apparatus 200 that represents the subsequent stage can thus secure a memory space.

The ROI analyzing section 122 is configured to derive positional information of the ROI images 112a1 through 112a4, not the positional information of the regions of interest ROI, in a case where the objects as imaging targets and the regions of interest do not agree with each other in shape. The ROI analyzing section 122 derives left end coordinates (xn, yn) and physical region lengths XLn in the X-axis direction of the respective rows as the positional information of the ROI images 112a1 through 112a4. Furthermore, in a case where a ROI image is separated as in the second row of the ROI image 112a2, the ROI analyzing section 122 derives respective positional information of the separated portions. The ROI analyzing section 122 stores the region numbers of the regions of interest ROI1 through ROI4 and the positional information of the ROI images 112a1 through 112a4 in the storage section in association with each other.

Moreover, the ROI analyzing section 122 may derive sensing information, exposure information, gain information, AD word length, image format, etc., for example, other than the positional information, of the respective regions of interest ROI1 through ROI4, and store them in the storage section in association with the region numbers.

In a case where objects as imaging targets are of a rectangular shape, the overlap detecting section 123 (see FIG. 2) derives a region where ROI images overlap each other, not a region where regions of interest overlap each other, as a region of overlap. As illustrated in FIG. 11, the overlap detecting section 123 derives a region of overlap ROO as a region where the ROI image 112a3 and the ROI image 123a4 overlap each other. The overlap detecting section 123 stores the derived region of overlap ROO in the storage section in association with the respective positional information of the regions of interest ROI3 and ROI4.

The priority setting section 124 (see FIG. 2) assigns the priority "1" to the region of interest ROI1, and stores the priority "1" in the storage section in association with the region of interest ROI1. The priority setting section 124 assigns the priority "2" that is lower than the priority "1" to the region of interest ROI2, and stores the priority "2" in the storage section in association with the region of interest ROI2. The priority setting section 124 assigns the priority "3" that is lower than the priority "2" to the region of interest ROI3, and stores the priority "3" in the storage section in association with the region of interest ROI3. The priority setting section 124 assigns the priority "4" that is lower than the priority "3" to the region of interest ROI4, and stores the priority "4" in the storage section in association with the region of interest ROI4.

The encoding section 125 (see FIG. 2) generates respective transmission images of the ROI images 112a1 through 112a4. Since the priority of the region of interest ROI4 is lower than the priority of the region of interest ROI3, the encoding section 125 generates a transmission image by eliminating the region of overlap ROO from the ROI image 112a4.

The image processing controlling section 126 (see FIG. 2) generates ROI information and frame information and transmits them to the transmitting section 140 (see FIG. 2). The ROI information includes the respective positional information of the ROI images 112a1 through 112a4, for example. The ROI information also includes, other than the positional information, information (for example, the respective data types of the regions of interest ROI1 through ROI4, the number of the regions of interest ROI1 through ROI4 included in the captured image 111, the region numbers and priority of the regions of interest ROI1 through ROI4, etc.) similar to those in a case where objects as imaging targets are of a rectangular shape. The frame information includes, for example, information similar to those in a case where objects as imaging targets are of a rectangular shape, such as data types of the regions of interest ROI1 through ROI4.

The LINK controlling section 141 provided in the transmitting section 140 (see FIG. 2) outputs the frame information and the ROI information input from the image processing controlling section 126 per line to the ECC generating section 142 and the PH generating section 143 (see FIG. 2 for both). The ECC generating section 142 generates an error correcting code for a line in the frame information on the basis of data of the line (for example, the number of the virtual channel, the respective data types of the regions of interest ROI1 through ROI4, the payload length per line, etc.), for example. The ECC generating section 142 outputs the generated error correcting code to the PH generating section 143, for example. The PH generating section 143 generates a packet header PH (see FIG. 4) per line, using the frame information and the error correcting code generated by the ECC generating section 142.

The EBD buffer 144 (see FIG. 2) primarily stores the ROI information and outputs the ROI information at predetermined timing as embedded data to the combining section 147 (see FIG. 2).

The ROI data buffer 145 (see FIG. 2) primarily stores the compressed image data input from the encoding section 125 and outputs the compressed image data 120A as the payload data of a long packet to the combining section 147 in a case where a control signal indicating the segmentation of ROIs is input from the video receiving apparatus 200 via the camera control interface CCI.

In a case where a control signal indicating the segmentation of ROIs is input from the video receiving apparatus 200 via the camera control interface CCI, the combining section 147 generates transmission data 147A based on various input data (the packet header PH, the ROI information, and the compressed image data input from the encoding section 125 via the ROI data buffer 145. The combining section 147 outputs the generated transmission data 147A to the video receiving apparatus 200 via the data lane DL. Specifically, the combining section 147 includes the respective data types of the regions of interest ROI1 through ROI4 in the packet header PH of the payload data of a long packet and sends out the data. Furthermore, the combining section 147 sends out the respective image data (compressed image data) of the regions of interest ROI1 through ROI4 in a common virtual channel.

In a case where objects as imaging targets are not of a rectangular shape, the positional information of the ROI images 112a1 through 112a4 is included in the packet header PH or the payload data of a long packet. The positional information of the ROI images 112a1 through 112a4 is included in the packet header PH by the PH generating section 143. On the other hand, the positional information of the ROI images 112a1 through 112a4 is included in the payload data of a long packet by the combining section 147.

Figure 12:
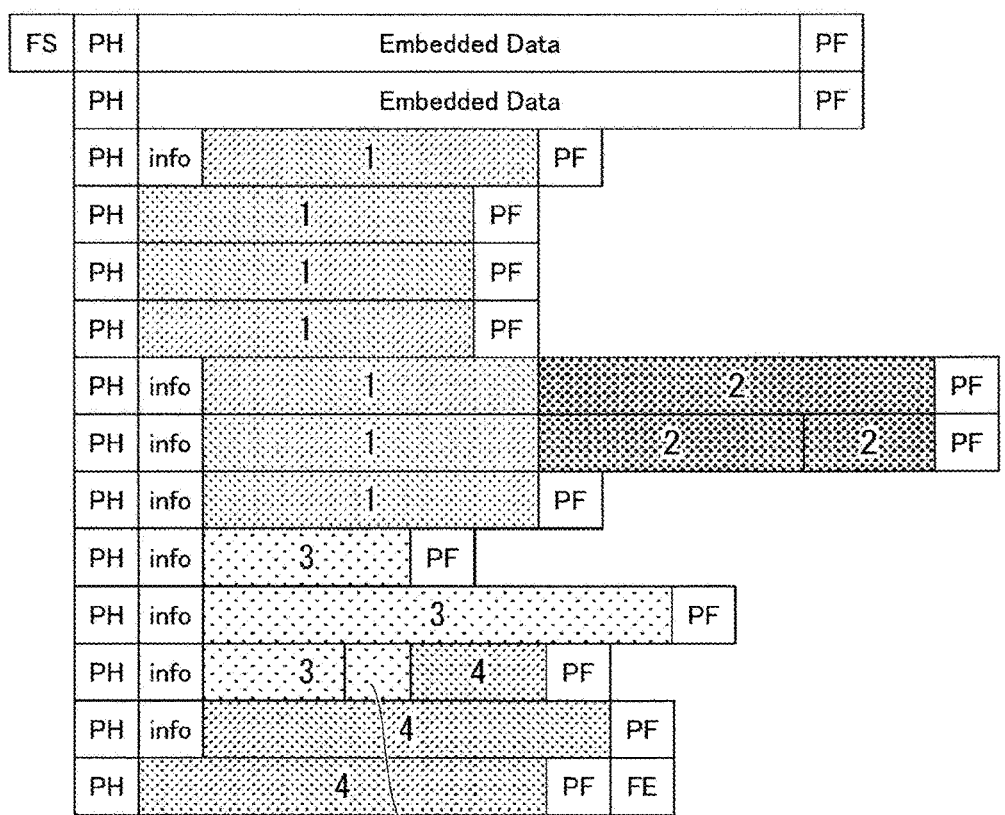
FIG. 12 is a diagram illustrating a configurational example of transmission data where the positional information of ROI images is included in the payload data of a long packet.

FIG. 12 is a diagram illustrating a configurational example of the transmission data 147A where the positional information of the ROI images 112a1 through 112a4 is included in the payload data of a long packet. As illustrated in FIG. 12, the transmission data 147A include a frame header area R1 and a packet area R2, for example. Incidentally, FIG. 12 illustrates details of the contents of the frame header area R1. Furthermore, low power modes LP are omitted from illustration in FIG. 12.

The frame header area R1 includes a frame number F1 as an identifier of the transmission data 147A, for example. The frame header area R1 includes information regarding compressed image data included in the packet area R2. The frame header area R1 includes, for example, the number of compressed image data (the number of ROIs) and information (ROI information) regarding each of the ROI images 112a1 through 112a4 corresponding to each compressed image data. The ROI information includes region numbers, physical region lengths, rectangular output region sizes, priority, exposure information, gain information, AD word lengths, and image formats. A physical region length represents the maximum length of a ROI image, and a rectangular output region size represents the size of a region of interest ROI.

"Info" illustrated in FIG. 12 represents region information stored in the payload of a long packet. The positional information of the ROI images 112a1 through 112a4 is stored in "info," for example. The positional information of the ROI images 112a1 through 112a4 is stored in the leading portions of the payloads of long packets. In a case where the physical region lengths in the X-axis direction of successive pixel rows making up ROI images are the same and each pixel row does not include a ROI image of a different region number, the region information "info" may not be stored in the payloads of long packets including image data of second and following ones of the pixel rows. According to the present example, in the ROI image 112a1, the physical region lengths in the X-axis direction of successive first through fourth ones of all the pixel rows are the same, and the first through fourth pixel rows do not include a ROI image of a different region number. Therefore, the region information "info" is not stored in the payloads of respective long packets including the image data of the second through fourth pixel rows that correspond to second and following ones of the successive first through fourth pixel rows making up the ROI image 112a1. According to the present example, furthermore, in the ROI image 112a4, the physical region lengths in the X-axis direction of successive second and third ones of all the pixel rows are the same, and the second and third pixel rows do not include a ROI image of a different region number. Therefore, the region information "info" is not stored in the payload of a long packet including the image data of the third pixel row that corresponds to second and following ones of the successive second and third pixel rows making up the ROI image 112a4. It is noted that, even in a case where the physical region lengths in the X-axis direction are the same and the respective pixel rows do not include a ROI image of a different region number, the region information "info" may be stored in the payload of each row.

The combining section 147 divides and places compressed image data generated by compressing the respective ROI images 112a1 through 112a4 per pixel row in the packet area R2 of the transmission data 147A, for example. "1" illustrated in FIG. 12 represents the compressed image data of the ROI image 112a1 stored in the payloads of long packets. "2" illustrated in FIG. 12 represents the compressed image data of the ROI image 112a2 stored in the payloads of long packets. "3" illustrated in FIG. 12 represents the compressed image data of the ROI image 112a3 stored in the payloads of long packets. "4" illustrated in FIG. 12 represents the compressed image data of the ROI image 112a4 stored in the payloads of long packets. In FIG. 12, the compressed image data are illustrated as being divided for an easy understanding. However, the data stored in the payloads of long packets are not divided. Compressed image data 112b corresponding to the image of the region of overlap ROO are not overlappingly included in the packet area R2 of the transmission data 147A. Furthermore, the combining section 147 has eliminated pixel rows that do not correspond to respective transmission images of the captured image 111 from the packet area R2 of the transmission data 147A. Consequently, pixel rows that do not correspond to respective transmission images of the captured image 111 are not included in the packet area R2 of the transmission data 147A.

Next, operation of the video receiving apparatus 200 in a case where it has received transmission data 147A will be described below.

The header separating section 211 of the receiving section 210 (see FIG. 8 for both) receives transmission data 147A from the video transmitting apparatus 100 via the data lane DL. Specifically, the header separating section 211 receives transmission data 147A including ROI information regarding the regions of interest ROI1 through ROI4 in the captured image 111 in the embedded data and also including image data (compressed image data) of the regions of interest ROI1 through ROI4 in the payload data of long packets. The header separating section 211 separates the received transmission data 147A into a frame header area R1 and a packet area R2.

The header interpreting section 212 (see FIG. 8) specifies the positions of the payload data of long packets included in the packet area R2 on the basis of data (specifically, embedded data) included in the frame header area R1.

The payload separating section 213 (see FIG. 8) separates the payload data of the long packets included in the packet area R2 from the packet area R2 on the basis of the positions of the payload data of the long packets that have been specified by the header interpreting section 212.

The EBD interpreting section 214 outputs the embedded data as EBD data to the information processing section 220 (see FIG. 8). Furthermore, the EBD interpreting section 214 discriminates whether the image data included in the payload data of the long packets are the compressed image data of the image data 116 of a ROI or the compressed image data of normal image data, from the data type included in the embedded data. The EBD interpreting section 214 outputs the discriminated result to the ROI data separating section 215 (see FIG. 8).

If image data where the image data included in the payload data of long packets represent a ROI are input, then the ROI data separating section 215 outputs the payload data of the long packets as payload data to the information processing section 220 (specifically, the ROI decoding section 222). The payload data of the long packets including ROI information include the ROI information and one line of pixel data of the compressed image data.

The information extracting section 221 (see FIG. 8) provided in the information processing section 220 extracts the number (four in the present example) of the regions of interest ROI1 through ROI4 included in the captured image 111, the region numbers 1 through 4 and the priorities 1 through 4 of the regions of interest ROI1 through ROI4, the data lengths of the respective regions of interest ROI1 through ROI4, and the image formats of the respective regions of interest ROI1 through ROI4 from the embedded data included in the EBD data input from the EBD interpreting section 214. Furthermore, the information extracting section 221 extracts the positional information of the ROI images 112a1 through 112a4 from the embedded data.

The ROI decoding section 222 decodes compressed image data 147B included in the payload data to extract the positional information of the ROI images 112a1 through 112a4 and generate image data (making up transmission images). In a case where payload data corresponding to a sixth pixel row, for example, are input, the ROI decoding section 222 extracts one piece of positional information of the ROI image 112a1 and two pieces of positional information of the ROI image 112a2 from the payload data, and generates respective image data (transmission images) of the ROI images 112a1 and 112b1 corresponding to the sixth pixel row.

In a case where payload data corresponding to a tenth pixel row, for example, are input, the ROI decoding section 222 extracts one piece of positional information of the ROI image 112a3 and one piece of positional information of the ROI image 112a4 from the payload data, and generates respective image data (transmission images) of the ROI images 112a3 and 112b4.

The ROI image generating section 223 (see FIG. 8) generates ROI images 112a1 through 112a4 of the regions of interest ROI1 through ROI4 in the captured image on the basis of the ROI information obtained by the information extracting section 221, the positional information of the ROI images 112a1 through 112a4 extracted by the ROI decoding section 222, and the transmission images generated by the ROI decoding section 222. In a case where the one piece of positional information of the ROI image 112a1 and two pieces of positional information of the ROI image 112a2, extracted from the payload data, corresponding to the sixth pixel row, for example, and their transmission images are input, the ROI image generating section 223 generates a ROI image 112a1 of five pixels extending in the X-axis direction, a ROI image 112a2 of four pixels extending in the X-axis direction at a position spaced five pixels from the ROI image 112al, and a ROI image 112a2 of two pixels extending in the X-axis direction at a position spaced two pixels from the ROI image 112a2 (see FIG. 10).

Furthermore, the ROI image generating section 223 detects a region of overlap ROO where the region of interest ROI3 and the region of interest ROI4 overlap each other on the basis of the ROI information obtained by the information extracting section 221. The ROI image generating section 223 generates a ROI image 112a3 of four pixels extending in the X-axis direction and a ROI image 112a4 of three pixels extending in the X-axis direction with one pixel overlapping the ROI image 112a3 on the basis of the detected region of overlap ROO, the respective positional information of the ROI images 112a3 and 112a4, extracted from the payload, corresponding to the tenth pixel row, and the transmission images (see FIG. 10).

The ROI image generating section 223 outputs the generated images as ROI images to an apparatus at a subsequent stage (not illustrated).

In such a manner, the video transmitting apparatus 100 and the video receiving apparatus 200 can send and receive images of objects as imaging targets as ROI images even if the objects are of a shape other than a rectangular shape.

3. Principles of a Correcting Process for Correcting a Defective Pixel in an Embodiment of the Present Disclosure:

Next, principles of a correcting process for correcting a defective pixel in an embodiment of the present disclosure will be described below with reference to FIGS. 13 and 14.

FIG. 13 is a diagram schematically illustrating a correcting process for correcting a defective pixel according to the present embodiment. It is assumed that an image capturing region provided in an image capturing device includes a red pixel (hereinafter referred to as "R pixel") disposed at a left upper end and includes odd-numbered rows where an R pixel is located at a left end and R pixels and green pixels (hereinafter referred to as "G pixel") are alternately disposed and even-numbered rows where a G pixel is located at a left end and G pixels and blue pixels (hereinafter referred to as "B pixel") are alternately disposed. FIG. 13 schematically illustrates a portion of an image captured by the image capturing device that has such a pixel structure.

The image illustrated in FIG. 13 is an unprocessed image, called Raw image or undeveloped data, output from the pixels to the image capturing region. If a photoelectric transducer or a pixel circuit suffers a failure, resulting in a pixel defect that causes a pixel to malfunction, the pixel acquires an image as a defective image Id where no desired gradation is obtained, as indicated on the left side of the thick arrow in FIG. 13.

The Raw image that includes the defective image Id tends to raise a possibility that an image to be generated finally therefrom may have its image quality degraded. According to the present embodiment, as indicated on the right side of the thick arrow in FIG. 13, the information of the defective image Id is interpolated using the information of peripheral images Iad that are identical in color to the defective image Id and disposed around the defective image Id, generating a corrective image Ic. In such a manner, according to the present embodiment, the defect of the image is rendered less noticeable, preventing an image to be generated finally therefrom from having a degraded image quality.

Defective pixels are produced when image capturing devices are manufactured and assembled and result in fixed defects in the image capturing devices. Consequently, it is possible to detect defective pixels in a delivery inspection or the like of image capturing devices, store coordinate information of the defective pixels in a nonvolatile storage device such as an EEPROM, and correct defective images using the coordinate information.

In a case where an image of an overall image capturing area is generated, it is possible to correct a defective image according to such a process. However, regions of interest ROI that are segmented have indefinite scopes and sizes. Therefore, as the position of a defective pixel in a segmented region of interest cannot be predicted, it is impossible to correct a defective image in the region of interest using the stored coordinate information of defective pixels.

Accordingly, in the transmitting apparatus, the receiving apparatus, and the transmission system according to the present embodiment, the video transmitting apparatus that has the image capturing section is configured to calculate the position of a defective pixel in a region of interest on the basis of coordinate information of the defective pixel that is acquired in a delivery inspection or the like. Furthermore, the video receiving apparatus is configured to perform a correcting process for correcting a defective image using the position of the defective pixel that is sent out from the video transmitting apparatus.

Figure 14:
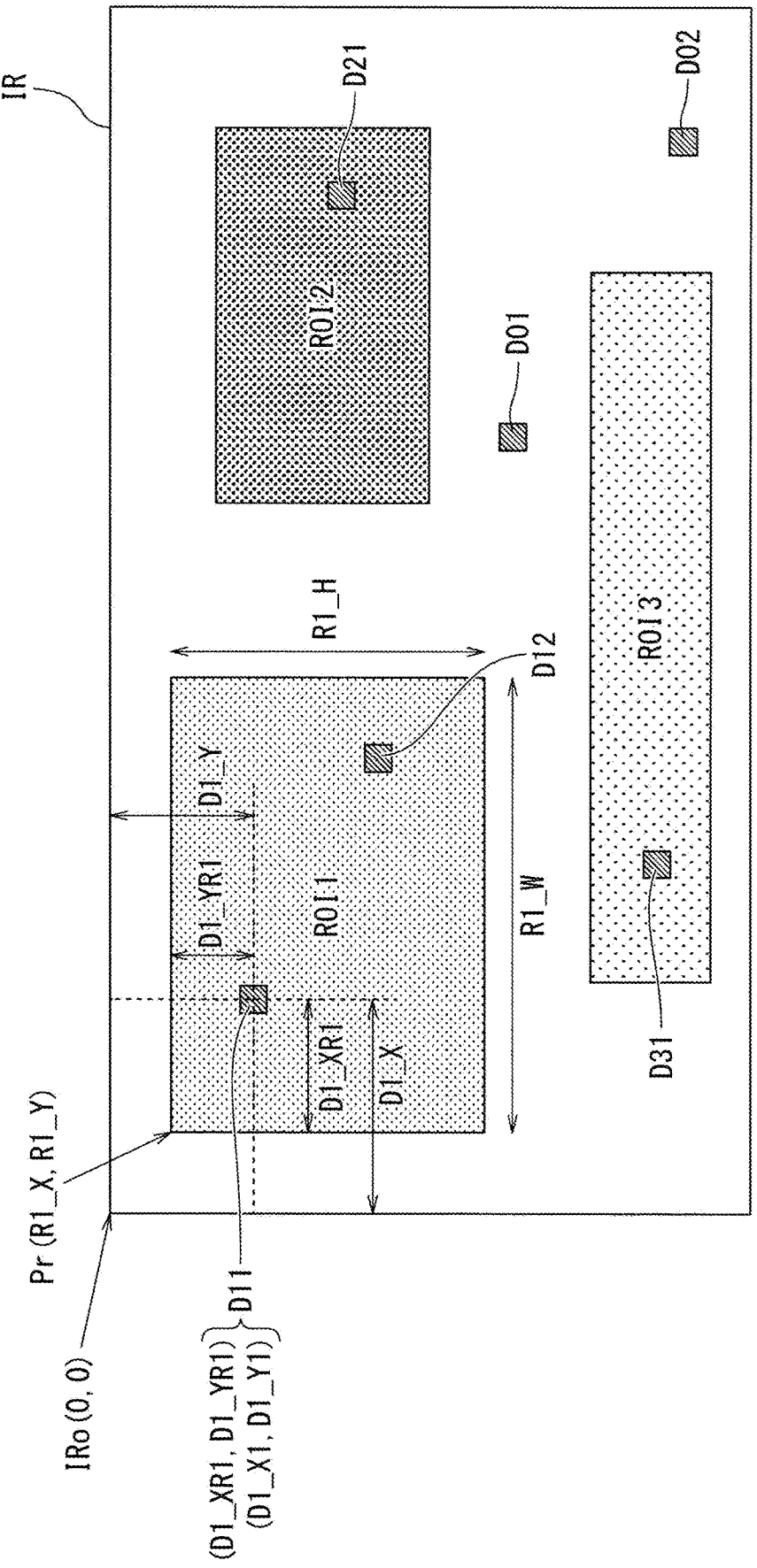
FIG. 14 is a diagram schematically illustrating a method of calculating the position of a defective pixel in a region of interest on the basis of coordinate information of the defective pixel acquired in a delivery inspection or the like according to a first embodiment.

FIG. 14 is a diagram schematically illustrating a method of calculating the position of a defective pixel in a region of interest on the basis of coordinate information of the defective pixel acquired in a delivery inspection or the like according to the present embodiment.

As illustrated in FIG. 14, an image capturing region IR provided by a plurality of image capturing elements has six defective pixels D01, D02, D11, D12, D21, and D31 present therein, for example. In addition, three regions of interest ROI1 through ROI3 to be segmented are established in the image capturing region IR. The defective pixels D11 and D12 are disposed in a region where the region of interest ROI1 is established. The defective pixel D21 is disposed in a region where the region of interest ROI2 is established. The defective pixel D31 is disposed in a region where the region of interest ROI3 is established. The defective pixels D01 and D02 are established in a region where no regions of interest are established. The method of calculating the position of a defective pixel in a region of interest is common regardless of the positions of regions of interest and defective pixels. Therefore, the method of calculating the position of a defective pixel in a region of interest will be described below with respect to the defective pixel D11, for example.

As illustrated in FIG. 14, the image capturing region IR has its origin IRo (0, 0) located on a pixel at a left upper end thereof. In this case, the defective pixel D11 in the image capturing region IR has coordinates (x, y) represented respectively by (D1_X1, D1_Y1). The coordinates (D1_X1, D1_Y1) of the defective pixel D11 are coordinates based on the origin IRo (0, 0) of the image capturing region IR. Furthermore, the coordinates (D1_X1, D1_Y1) of the defective pixel D11 have information as coordinate information acquired upon a delivery inspection, for example, of the video transmitting apparatus that has the image capturing section.

In a case where the regions of interest are established as described above, positional information of the region of interests (for example, the coordinates of a left upper end thereof, the length in the X-axis direction thereof, and the length in the Y-axis direction thereof) is derived. Consequently, as illustrated in FIG. 14, the coordinates (R1_X, R1Y) of a left upper end Pr, the length R1_W in the X-axis direction, and the length R1_H in the Y-axis direction, for example, are derived as positional information of the region of interest ROI1. The coordinates (R1_X, R1Y) of the left upper end Pr of the region of interest ROI1 represent the position of the region of interest ROI1 in the image capturing region IR. Therefore, the coordinates (R1_X, R1Y) of the left upper end Pr are coordinates based on the origin IRo (0, 0) of the image capturing region IR.

Accordingly, the coordinates (R1_X, R1Y) of the left upper end Pr of the region of interest ROI1 and the coordinates (D1_X1, D1_Y1) of the defective pixel D11 are coordinates defined in the same coordinate space as the image capturing region IR. Therefore, the coordinates (D1X_R1, D1_YR1) of the defective pixel D11 in the region of interest ROI1 can be expressed by the following equations (1) and (2):

$$D1\_XR1 = D1\_X - R1\_X \quad (1)$$

$$D1\_YR1 = D1\_Y - R1\_Y \quad (2)$$

Because of the equations (1) and (2), the position of the defective pixel D11 can be expressed by coordinates in the coordinate space of the region of interest ROI1. Therefore, by storing coordinate information acquired upon a delivery inspection or the like, for example, the video receiving apparatus can calculate coordinates of a defective pixel in a region of interest each time the region of interest is established and positional information (the coordinates of a left upper end, the length in the X-axis direction, and the length in the Y-axis direction) of the region of interest is input from the video transmitting apparatus.

As with the video transmitting apparatus 100 described above, the transmitting apparatus according to the present embodiment is configured to send out in normal operation ROI information including positional information (the coordinates of a left upper end, the length in the X-axis direction, and the length in the Y-axis direction) of a region of interest as embedded data to the video receiving apparatus. Furthermore, as described in detail later, the transmitting apparatus according to the present embodiment is configured to send out in an initializing process defect correcting information including information of coordinates of a defective pixel in the coordinate space of an image capturing region (i.e., a full angle of view) as embedded data to the video receiving apparatus.

As with the video receiving apparatus 200 described above, the receiving apparatus according to the present embodiment can extract information included in embedded data. Therefore, the receiving apparatus according to the present embodiment can calculate coordinates of a defective pixel in a region of interest according to the equations (1) and (2) using the coordinates of the defective pixel extracted from embedded data received in an initializing process and coordinates of a left upper end of the region of interest received in normal operation. Furthermore, the receiving apparatus is configured to use the coordinates of the defective pixel acquired by the calculation as the coordinates of a defective image.

By subtracting 2 from the value of the Y coordinate determined according to the equation (2) while keeping the value of the X coordinate determined according to the equation (1) as it is, coordinates of a pixel that is two rows ahead of the defective pixel D11 are determined. Furthermore, by adding 2 to the value of the Y coordinate determined according to the equation (2) while keeping the value of the X coordinate determined according to the equation (1) as it is, coordinates of a pixel that is two rows behind the defective pixel D11 are determined. Moreover, by subtracting 2 from the value of the X coordinate determined according to the equation (1) while keeping the value of the Y coordinate determined according to the equation (2) as it is, coordinates of a pixel that is two columns ahead of the defective pixel D11 are determined. Furthermore, by adding 2 to the value of the X coordinate determined according to the equation (1) while keeping the value of the Y coordinate determined according to the equation (2) as it is, coordinates of a pixel that is two rows behind the defective pixel D11 are determined.

Images corresponding to the pixels thus determined correspond to peripheral images (see the peripheral images Iad illustrated in FIG. 13) around a defective image corresponding to the defective pixel D11. Therefore, the receiving apparatus according to the present embodiment can also calculate coordinates of peripheral images using the coordinates of a defective pixel and the coordinates of a left upper end of a region of interest that are included in the embedded data. The receiving apparatus according to the present embodiment can thus perform a correcting process for correcting a defective image that is present in a region of interest regardless of the position and size of the region of interest. According to the present embodiment, since the Raw image is of a Bayer array, images of pixels having coordinates that are ±2 with respect to the coordinates of the defective pixel are used as peripheral images. However, peripheral images may be selected appropriately depending on the array of color pixels.

Figure 15:
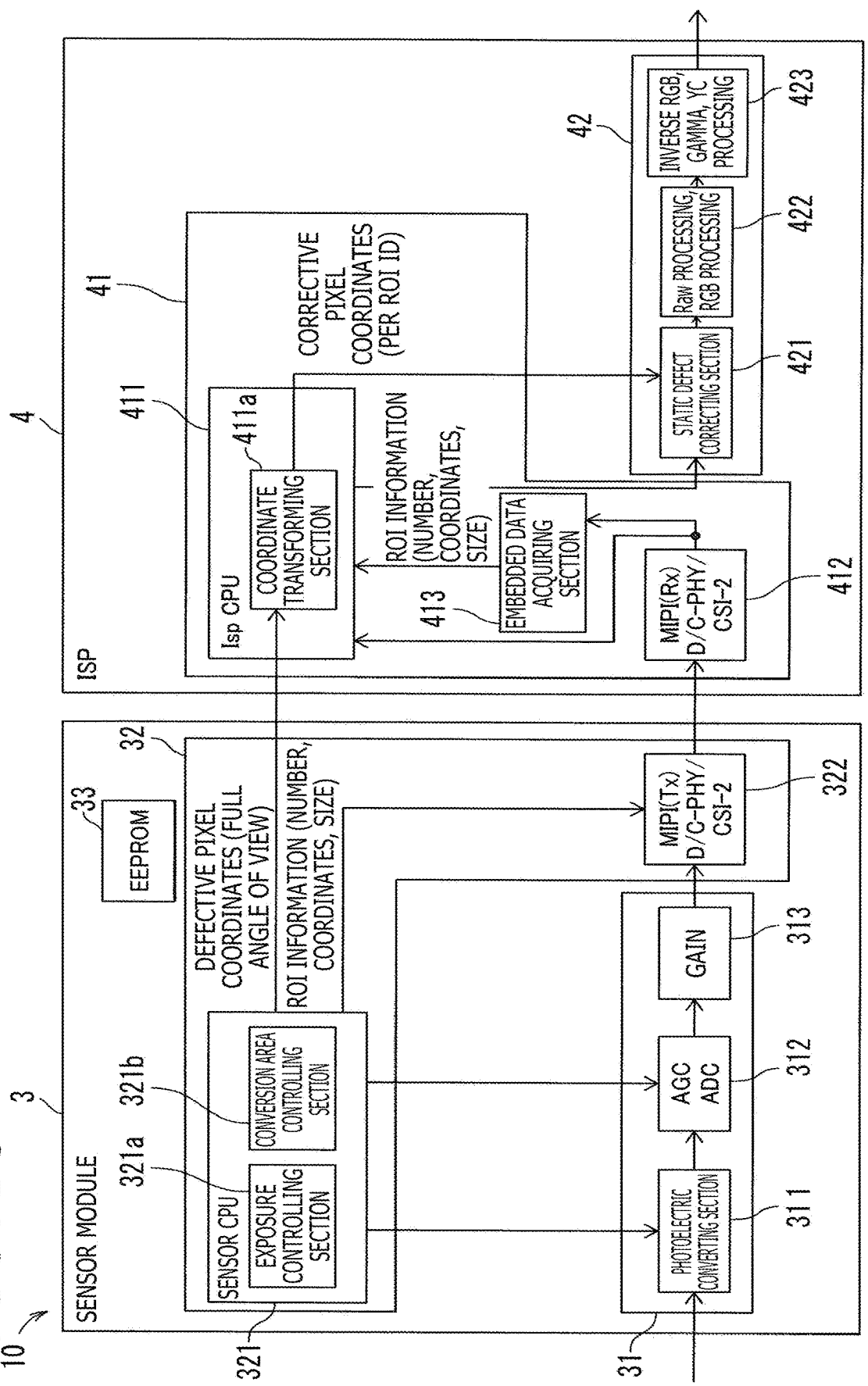
FIG. 15 is a block diagram illustrating a general makeup of a transmitting apparatus, a receiving apparatus, and a transmission system according to the first embodiment.

4. A First Embodiment of the Present Disclosure:

Next, a transmitting apparatus, a receiving apparatus, and a transmission system according to a first embodiment of the present disclosure will be described below with reference to FIGS. 15 through 22. First, a general makeup of the transmitting apparatus, the receiving apparatus, and the transmission system according to the present embodiment will be described below with reference to FIG. 15. FIG. 15 is a block diagram illustrating a general makeup of a video transmitting apparatus 3, a video receiving apparatus 4, and a video transmission system 10 according to the present embodiment.

As illustrated in FIG. 15, the video transmission system 10 according to the present embodiment includes the video transmitting apparatus (an example of the transmitting apparatus) 3 that functions as an image sensor and the video receiving apparatus (an example of the receiving apparatus) 4 that functions as an image signal processor (ISP). In the video transmission system 10, the video transmitting apparatus 3 is configured to have a transmitting section 322 send out signals according to the MIPI (Mobile Industry Processor Interface) D-PHY standards, the MIPI C-PHY standards, or the MIPI CSI (Camera Serial Interface)-2 standards. In the video transmission system (an example of transmission system) 10, furthermore, the video receiving apparatus 4 is configured to have a receiving section 412 receive signals according to the MIPI D-PHY standards, the MIPI C-PHY standards, or the MIPI CSI-2 standards. Moreover, the video transmission system 10 may be configured to send and receive signals according to the MPIP CSI-3 standards or the MIPI DSI standards between the video transmitting apparatus 3 and the video receiving apparatus 4, as with the video transmission system 1 according to the presupposed technologies 1 and 2.

The video transmitting apparatus 3 provided in the video transmission system 10 is configured to perform functions equivalent to those of the video transmitting apparatus 100 according to the presupposed technologies 1 and 2. Specifically, the video transmitting apparatus 3 is configured to perform the same process as the video transmitting apparatus 100 on captured images input from an image capturing section 31 in a case where a control signal indicating the segmentation of ROIs is input from the video receiving apparatus 4. Furthermore, the video transmitting apparatus 3 is configured to perform the same process as the video transmitting apparatus 100 on captured images input from the image capturing section 31 in a case where a control signal indicating the outputting of a normal image is input from the video receiving apparatus 4.

Furthermore, the video transmitting apparatus 3 is configured to transmit in an initializing process all information (an example of defect correcting information) of the coordinates of a defective pixel among all pixels (a fully angle of view) of an image capturing region of the image capturing section 31 (to be described in detail later) in a case where a control signal requesting the acquisition of the coordinates of the defective pixel is input from the video receiving apparatus 4.

The video receiving apparatus 4 is configured to perform functions equivalent to those of the video receiving apparatus 200 according to the presupposed technologies 1 and 2. Specifically, the video receiving apparatus 4 is configured to perform a similar process to the video receiving apparatus 200 according to the presupposed technologies 1 and 2 on transmission data transmitted from the video transmitting apparatus 3. Furthermore, the video receiving apparatus 4 is configured to perform a correcting process for correcting a defective image based on a defective pixel using defect correcting information transmitted from the video transmitting apparatus 3.

Therefore, FIG. 15 illustrates the video transmitting apparatus 3 and the video receiving apparatus 4 mainly with respect to configurational details regarding the correcting process for correcting a defective pixel.

As illustrated in FIG. 15, the video transmitting apparatus 3 includes the image capturing section 31 that captures images of targets. The image capturing section 31 has a photoelectric converting section 311 for converting incident light into electric signals, for example. The photoelectric converting section 311 includes, for example, a CCD image sensor or a CMOS image sensor. The photoelectric converting section 311 has a plurality of pixels each having a photoelectric transducer and arrayed according to predetermined rules. The photoelectric converting section 311 includes an image capturing region where the pixels are arrayed. Furthermore, the image capturing section 31 has a signal converting section 312 for converting an analog electric signal input from the photoelectric converting section 311 into digital image data. The signal converting section 312 is configured to perform a signal amplifying (AGC) process for amplifying the analog electric signal input from the photoelectric converting section 311 and an analog-to-digital converting (ADC) process for converting the amplified signal into a digital signal. The image capturing section 31 has an amplifying section 313 for applying a digital gain to image data input from the signal converting section 312. The amplifying section 313 outputs the image data with the digital gain applied thereto to the transmitting section 322.

The video transmitting apparatus 3 has a nonvolatile storage device 33. The nonvolatile storage device 33 includes an EEPROM (Electrically Erasable Programmable Read-Only Memory), for example. The nonvolatile storage device 33 stores various pieces of information, e.g., the coordinates of all defective pixels among the pixels of the photoelectric converting section 311. The coordinates of the defective pixels are detected upon a delivery inspection, for example, of the video transmitting apparatus 3 and are stored.

The video transmitting apparatus 3 includes a controlling section 32 for controlling the image capturing section 31 and controlling predetermined signal processing processes. The controlling section 32 has a sensor CPU 321 and the transmitting section 322. The sensor CPU 321 is configured to perform similar functions to the image processing sections 120 and 130 (see FIG. 2). The transmitting section 320 is configured to perform similar functions to the transmitting section 140 (see FIG. 2). In the controlling section 32, the sensor CPU 321 may be replaced with image processing sections 120 and 130, and the transmitting section 322 may be replaced with the transmitting section 140.

The sensor CPU 321 has an exposure controlling section 321a for controlling exposure conditions of the photoelectric converting section 311. Furthermore, the sensor CPU 321 has a conversion area controlling section (an example of the controlling section) 321b for controlling the acquisition of defect correcting information as information for correcting a defect of an image included in a region of interest ROI. Each of the sensor CPU 321 having the conversion area controlling section 321b and the controlling section 32 corresponds to an example of a controlling section for controlling the acquisition of defect correcting information as information for correcting a defect of an image included in a region of interest ROI.

The conversion area controlling section 321b is configured to acquire, as defect correcting information, defect coordinates representing coordinates of a pixel where a defect has occurred among the pixels making up the image capturing region of the photoelectric converting section 311.

The conversion area controlling section 321b is configured to acquire information of the defect coordinates at the time the video transmitting apparatus 3 is initialized or manufactured (e.g., upon a delivery inspection) from the nonvolatile storage device 33 and hold the acquired information, for example.

The sensor CPU 321 transmits, in an initializing process, for example, information of defect coordinates in the image capturing region (i.e., a full angle of view) of a defective pixel acquired by the conversion area controlling section 321b to an Isp CPU 411 (to be described in detail later) in the video receiving apparatus 4 via inter-CPU communication.

In a case where a control signal indicating the segmentation of ROIs is input from the video receiving apparatus 200 via the camera control interface CCI in a process of normal operation, the sensor CPU 321 specifies an object as an imaging target included in the captured image. Furthermore, the sensor CPU 321 sets a region of interest ROI for the identified object, assigns a region number to the region of interest ROI, segments an image of the region of interest ROI, and stores the image in a storage section (not illustrated) in association with the region number. Moreover, the sensor CPU 321 (specifically, the conversion area controlling section 321b) calculates positional information (for example, the coordinates of a left upper end (an example of reference coordinates), the length in the X-axis direction, and the length in the Y-axis direction) of the region of interest ROI, and stores the positional information in the storage section in association with the region number of the region of interest ROI. Specifically, the conversion area controlling section 321b is configured to acquire information (i.e., positional information of the region of interest ROI) of the coordinates of the left upper end of the region of interest ROI (an example of basic coordinates) and the length in the X-axis direction and the length in the Y-axis direction (an example of the size of the region of interest) of the region of interest ROI, as defect correcting information, and to hold the acquired information upon normal operation of the video transmitting apparatus 3. In this case, the conversion area controlling section 321b acquires and holds the coordinates of the left upper end as basic coordinates.

The sensor CPU 321 outputs the acquired positional information of the region of interest ROI, image data input from the image capturing section 31, etc. to the transmitting section 322. The transmitting section 322 generates transmission data (see FIGS. 6 and 12) including these pieces of information input from the sensor CPU 321 and sends out the generated transmission data to the video receiving apparatus 4.

As illustrated in FIG. 15, the video transmitting apparatus 3 includes the transmitting section 322 that sends out the image data of an image included in the region of interest ROI as the payload data of a long packet and sends out ROI information as the embedded data. The video transmitting apparatus 3 sends out information (i.e., positional information of the region of interest ROI) of the basic coordinates and size of the region of interest ROI as one piece of ROI information, as defect correcting information from the transmitting section 322 upon normal operation of the video transmission system 10. In this case, the video transmitting apparatus 3 sends out the coordinates of the left upper end of the region of interest ROI as reference coordinates from the transmitting section 322. Furthermore, the video transmitting apparatus 3 is configured to transmit the coordinates of a pixel where a defect has occurred among the pixels making up the image capturing region of the photoelectric converting section 311, as defect correcting information from the transmitting section 322 at the time the video transmission system 10 is initialized or manufactured (e.g., upon a delivery inspection), for example. The video transmitting apparatus 3 sends out the defect correcting information included in the ROI information from the transmitting section 322. The transmitting section 322 is configured to send out transmission data including demosaicing information according to the MIPI D-PHY standards, the MIPI C-PHY standards, or the MIPI CSI-2 standards.

As illustrated in FIG. 15, the video receiving apparatus 4 includes a controlling section 41 for controlling a predetermined signal processing process using transmission data transmitted from the video transmitting apparatus 3. The controlling section 41 has an Isp CPU 411, a receiving section 412, and an embedded data acquiring section 413. The Isp CPU 411 is configured to perform similar functions to the information processing section 220 (see FIG. 8), except for the information extracting section 221 and the ROI image generating section 223 (see FIG. 8). In the video receiving apparatus 4, an image generating section 422 is configured to perform similar functions to the ROI image generating section 223. The receiving section 412 is configured to perform similar functions to the receiving section 210 (see FIG. 8), except for the EBD interpreting section 214 (see FIG. 8). In the video receiving apparatus 4, the embedded data acquiring section 413 is configured to perform similar functions to the EBD interpreting section 214 and the information extracting section 221. In the controlling section 41, the receiving section 412 and the embedded data acquiring section 413 may be replaced with the receiving section 210, and the Isp CPU 411 and the image generating section 422 may be replaced with the information processing section 220. In this case, the functions of the information extracting section 221 that are performed by the embedded data acquiring section 413 are performed by the receiving section 220.

As illustrated in FIG. 15, the video receiving apparatus 4 includes the receiving section 412 that receives a transmission signal where image data of images included in regions of interest ROI are included in the payload data and ROI information is included in the embedded data. The receiving section 412 is configured to receive transmission data input from the video transmitting apparatus 3. The transmission data input from the video transmitting apparatus 3 include ROI information having defect correcting information. The ROI information is included in the embedded data. Therefore, the transmission data input from the video transmitting apparatus 3 includes the embedded data that include the defect correcting information. The ROI information that is received by the video receiving apparatus 4 with the receiving section 412 when the video transmission system 10 is in normal operation includes information of the reference coordinates and sizes of the regions of interest ROI as the defect correcting information. Therefore, the video receiving apparatus 4 receives, with the receiving section 412, the reference coordinates and sizes of the regions of interest ROI as the defect correcting information. The video receiving apparatus 4 receives, with the receiving section 412, the coordinates of the left upper ends of the regions of interest ROI as the reference coordinates. Furthermore, the video receiving apparatus 4 receives, with the receiving section 412, pixels where defects have occurred in a plurality of pixels making up the image capturing region provided in the photoelectric converting section 311 at the time the video transmission system 10 is initialized or manufactured (e.g., upon a delivery inspection), for example. The receiving section 412 receives the transmission data according to the MIPI D-PHY standards, the MIPI C-PHY standards, or the MIPI CSI-2 standards. Therefore, the video receiving apparatus 4 is configured to receive, with the receiving section 412, signals according to the MIPI D-PHY standards, the MIPI C-PHY standards, or the MIPI CSI-2 standards. The receiving section 412 generates various data from the input transmission data and outputs the generated data to the Isp CPU 411 and the embedded data acquiring section 413.

As illustrated in FIG. 15, the video receiving apparatus 4 includes the embedded data acquiring section (an example of the controlling section) 413 that extracts defect correcting information as information used for correcting defects of image data of images included in the regions of interest ROI from the transmission data (an example of a transmission signal) received by the receiving section 412. The controlling section 41 having the embedded data acquiring section 413 corresponds to an example of a controlling section for controlling the extraction of defect correcting information used as information for correcting defects of image data of images included in the regions of interest ROI from a transmission signal (transmission data) received by the receiving section 412. The embedded data acquiring section 413 is configured to extract the defect correcting information from the ROI information included in the transmission data input from the receiving section 412. Since the ROI information is included in the embedded data, the embedded data acquiring section 413 extracts the defect correcting information from the embedded data included in the transmission signal (transmission data) input from the receiving section 412. Consequently, the video receiving apparatus 4 is configured to receive, with the receiving section 412, the transmission data including the embedded data having the defect correcting information, and to extract, with the embedded data acquiring section 413, the defect correcting information from the ROI information included in the embedded data included in the transmission data received by the receiving section 412.

The embedded data acquiring section 413 is configured to acquire the reference coordinates and sizes of the regions of interest ROI as the defect correcting information from the ROI information included in the embedded data when the video receiving apparatus 4 is in normal operation. The embedded data acquiring section 413 acquires the coordinates of the left upper ends of the regions of interest ROI as the reference coordinates of the regions of interest ROI. Furthermore, the embedded data acquiring section 413 acquires the lengths in the X-axis direction and the lengths in the Y-direction of the regions of interest ROI as the sizes of the regions of interest ROI. In such a manner, the embedded data acquiring section 413 acquires the positional information of the regions of interest ROI from the embedded data as the defect correcting information when the video receiving apparatus 4 is in normal operation, and outputs the defect correcting information acquired from the embedded data to the Isp CPU 411.

The embedded data acquiring section 413 acquires, other than the demosaicing information, various pieces of information (for example, the number of regions of interest ROI, the region numbers and priority of the regions of interest ROI, the data lengths of the regions of interest ROI, the image format of the regions of interest ROI, etc.) included in the embedded data. The embedded data acquiring section 413 outputs the acquired various pieces of information to the Isp CPU 411.

As illustrated in FIG. 15, the Isp CPU 411 has a coordinate converting section (an example of the controlling section) 411a. The coordinate converting section 411a is configured to convert defect coordinates in the image capturing region into defect coordinates in a region of interest ROI. When the positional information of a region of interest ROI is input from the embedded data acquiring section 413 at the time the video transmission system 10 is in normal operation, the coordinate converting section 411a converts defect coordinates in the image capturing region acquired when the video transmission system 10 has been initialized into corrective coordinates that are defect coordinates in the region of interest ROI, using the positional information. Specifically, the coordinate converting section 411a extracts the coordinates of a pixel where a defect has occurred as coordinates in the image capturing region (coordinates in an XY orthogonal coordinate system in the image capturing region) from a given storage region, for example, and converts the extracted defect coordinates into defect coordinates in the coordinate system of the region of interest ROI. The coordinate system of the region of interest ROI herein means an XY orthogonal coordinate system having its origin located on a pixel at a left upper end of the image capturing region as illustrated in FIG. 14, for example, and extending in the X-axis direction (horizontal direction) and the Y-axis direction (vertical direction) of the image capturing region. In addition, the coordinate system of the region of interest means an XY orthogonal coordinate system having its origin on a reference pixel (pixel at the left upper end according to the present embodiment) of the region of interest and extending in the X-axis direction (horizontal direction) and the Y-axis direction (vertical direction) of the region of interest.

The coordinate converting section 411a specifies a range that a region of interest ROI input from the embedded data acquiring section 413 takes up in the image capturing region provided in the photoelectric converting section 311. For example, the coordinate converting section 411a specifies which position the region of interest ROI is disposed in in the coordinate system of the image capturing region, on the basis of the positional information (the coordinates of the left upper end, the length in the X-axis direction, and the length in the Y-axis direction) of the region of interest ROI. Next, the coordinate converting section 411a converts defect coordinates present in the region of interest ROI in the image capturing region into coordinates in the coordinate system of the region of interest ROI, thereby acquiring correction target coordinates. The coordinate converting section 411a carries out a coordinate conversion on defect coordinates according to the above equations (1) and (2), thereby acquiring correction target coordinates. In a case where positional information of a plurality of regions of interest ROI is input, the coordinate converting section 411a carries out a coordinate conversion on defect coordinates in each of the regions of interest ROI. In such a manner, the coordinate converting section 411a determines a position in the region of interest ROI that corresponds to the coordinates of a pixel where a defect has occurred (according to the present embodiment, the coordinates in the XY orthogonal coordinate system of the region of interest ROI) on the basis of the reference coordinates of the region of interest ROI (for example, the coordinates of the left upper end and the size (for example, the length in the X-axis direction, and the length in the Y-axis direction) thereof and the coordinates of the pixel where the defect has occurred (according to the present embodiment, the coordinates in the XY orthogonal coordinate system of the image capturing region).

The video receiving apparatus 4 may store the defect correcting information (i.e., defect coordinates) acquired at the time the video transmission system 10 is initialized in a given storage region in the controlling section 41 or the Isp CPU 411, and may store the defect correcting information in a separate storage section that the video receiving apparatus 4 has.

The Isp CPU 411 outputs information of the defect coordinates converted by the coordinate converting section 411a to an image processing section 42 in association with the region number (indicated as "ROI ID" in FIG. 15) of the region of interest ROI.

As illustrated in FIG. 15, the video receiving apparatus 4 includes the image processing section 42. The image processing section 42 has a static defect correcting section (an example of the processing section) 421 for processing a correction on a defect in the image of the region of interest ROI on the basis of the defect correcting information extracted by the embedded data acquiring section 413. The image processing section 42 that has the static defect correcting section 421 corresponds to an example of the processing section for processing a correction on a defect in the image of the region of interest ROI on the basis of the defect correcting information extracted by the embedded data acquiring section 413. Furthermore, the image processing section 42 has an image generating section 422 for performing Raw processing and RGB processing on the image data of the region of interest ROI including an image where the image defect has been corrected. Moreover, the image processing section 42 has an image quality adjusting section 422 for adjusting the image quality of the image data that have been processed by the image generating section 422.

More specifically, the static defect correcting section 421 is arranged to correct a defect in the image of the region of interest ROI using the correction target coordinates acquired by the coordinate converting section 411a. The correction target coordinates are acquired in the form of the defect coordinates included in the embedded data and transmitted from the video transmitting apparatus 3 to the video receiving apparatus 4 as the defect correcting information and the positional information of the region of interest ROI. Therefore, the static defect correcting section 421 corrects a defect in the image of the region of interest ROI using the correction target coordinates acquired from the defect correcting information, though not directly using the defect correcting information. Consequently, the static defect correcting section 421 corrects a defect in the image of the region of interest ROI on the basis of the defect correcting information extracted by the embedded data acquiring section 413.

The static defect correcting section 421 determines coordinates of peripheral images to be used for correcting a defective image on the basis of the correction target coordinates. The static defect correcting section 421 has a line memory for several rows (e.g., five rows) of the image capturing region provided in the photoelectric converting section 311. The static defect correcting section 421 stores the image data of the region of interest ROI input from the Isp CPU 411 in the line memory. Furthermore, in a case where a defective image and peripheral images to be used for correcting the defective image are input, the static defect correcting section 421 stores the input images in storage areas having predetermined addresses of the line memory. In a case where a defective image and four peripheral images are stored in the storage areas, the static defect correcting section 421 performs a correcting process for correcting defective pixels. In such a manner, the static defect correcting section 421 is configured to correct all defective pixels.

The static defect correcting section 421 is configured, for example, to store image data of one line of the region of interest ROI where a defective image is present as a correction target in the line memory and output the image data to the image generating section 422. When the static defect correcting section 421 outputs the image data to the image generating section 422, the static defect correcting section 421 outputs the image data of a corrective image rather than a defective image to the image generating section 422.

When the image data are input from the static defect correcting section 421, the image generating section 422 acquires information (ROI information) regarding the region of interest ROI including the image data from the Isp CPU 411 and generates an image of the region of interest ROI. For generating an image of the region of interest ROI, the image generating section 422 first performs a Raw process to generate a region of interest ROI constructed as a Raw image. Next, the image generating section 422 performs an RGB process to generate an image of the region of interest ROI including image data of RGB signals. The image generating section 422 outputs the image data of RGB signals making up the region of interest ROI to the image quality adjusting section 423.

The image quality adjusting section 423 is configured to perform an inverse RGB process for converting the image data of RGB signals input from the image generating section 422 into a luminance signal and two color difference signals. Furthermore, the image quality adjusting section 423 is configured to perform a gamma correcting process on the image data processed by the inverse RGB process. Moreover, the image quality adjusting section 423 is configured to perform a YC process such as color difference correction, noise reduction, etc. on image data of the luminance signal and the two color difference signals. The image quality adjusting section 422 is configured to output an image adjusted in image quality to a display device (not illustrated), for example. In this fashion, a desired image where defective images have been corrected and image quality has been adjusted is displayed on the display image.

(Correcting Process for Correcting a Defective Pixel)

Figure 16:
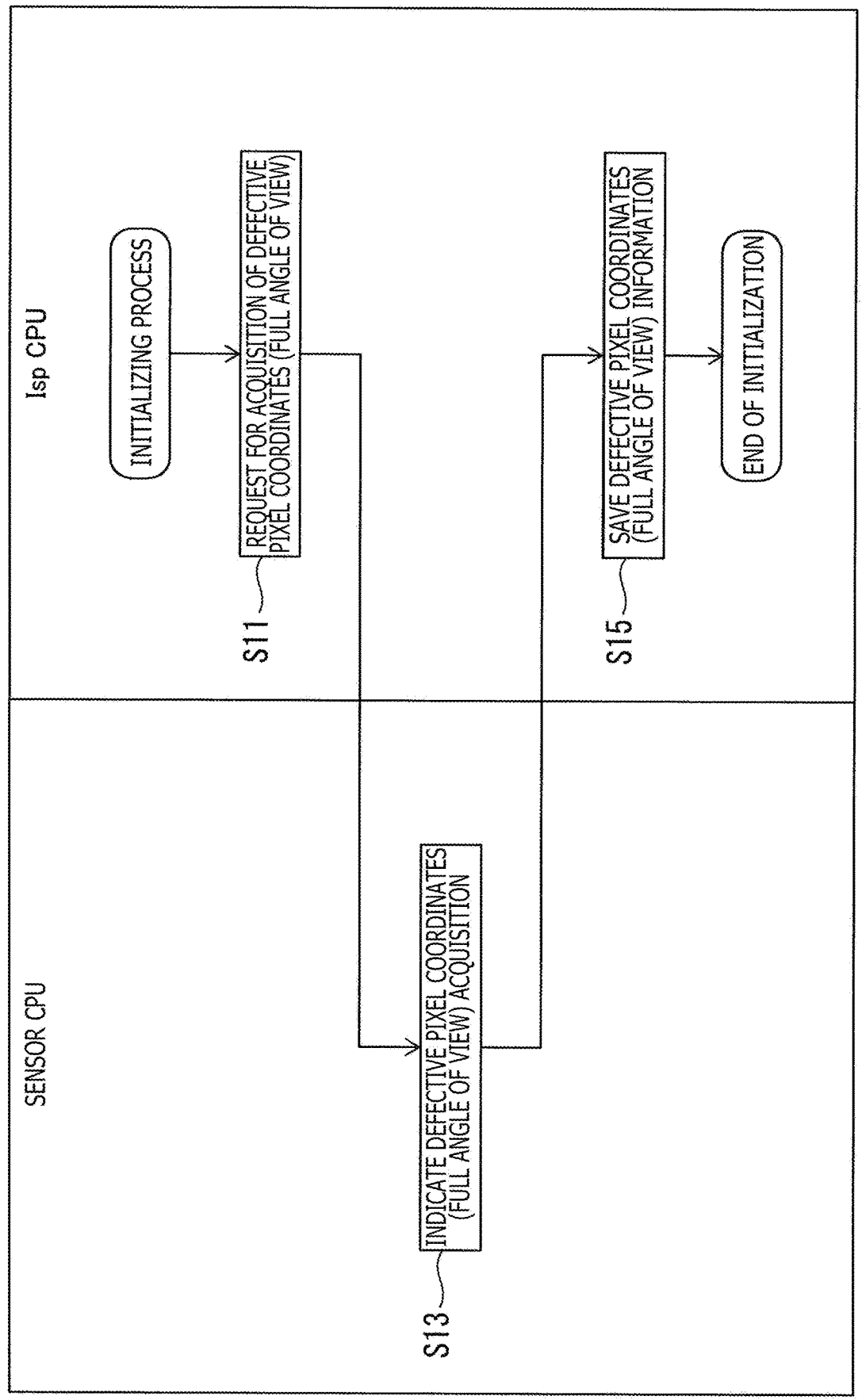
FIG. 16 is a flowchart illustrating an example of sequence of a process for acquiring coordinates of a defective pixel in an initializing process of the transmitting apparatus, the receiving apparatus, and the transmission system according to the first embodiment.
Figure 17:
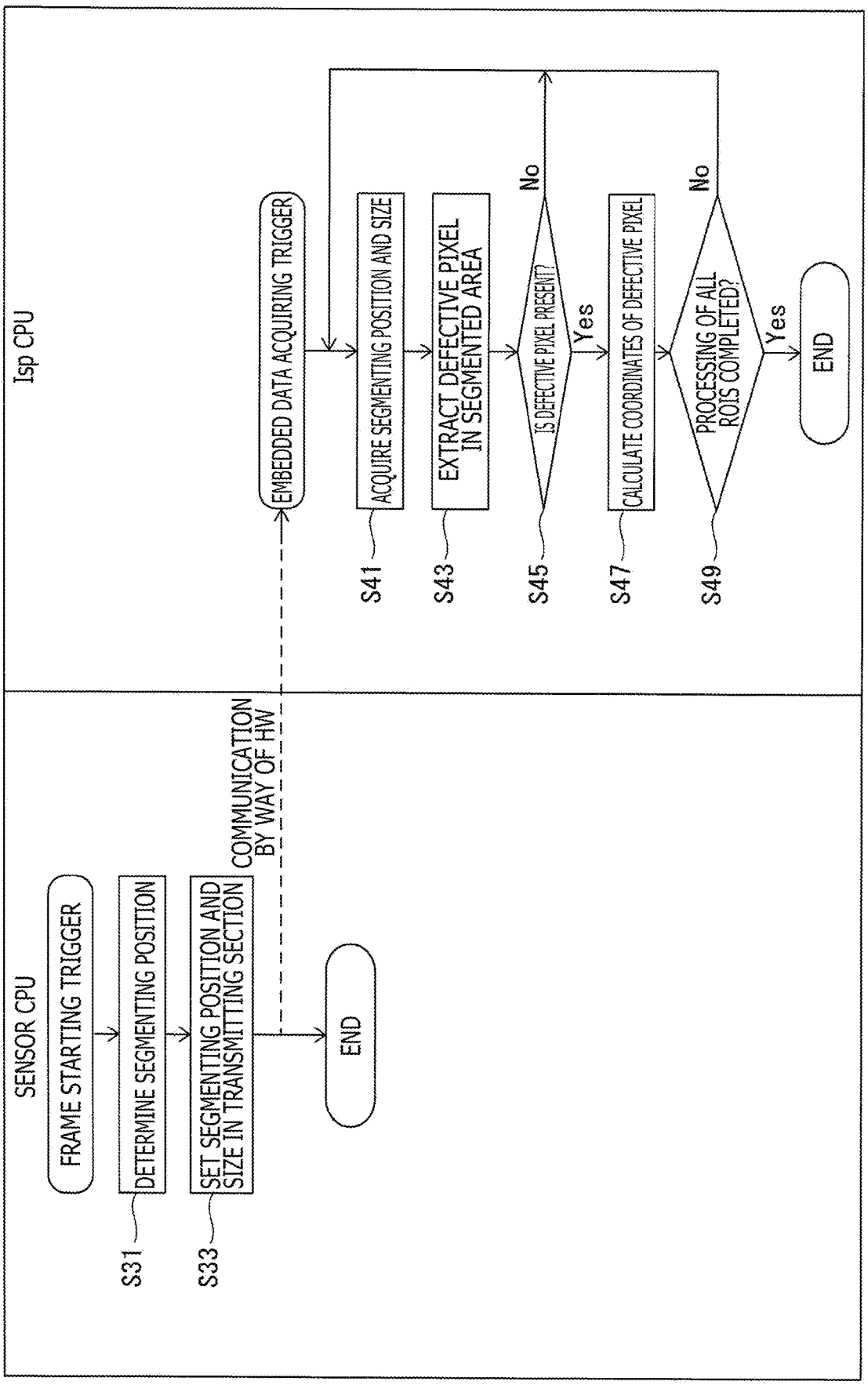
FIG. 17 is a flowchart illustrating an example of a sequence of a calculating process for the coordinate conversion of a defective pixel upon normal operation of the transmitting apparatus, the receiving apparatus, and the transmission system according to the first embodiment.
Figure 18:
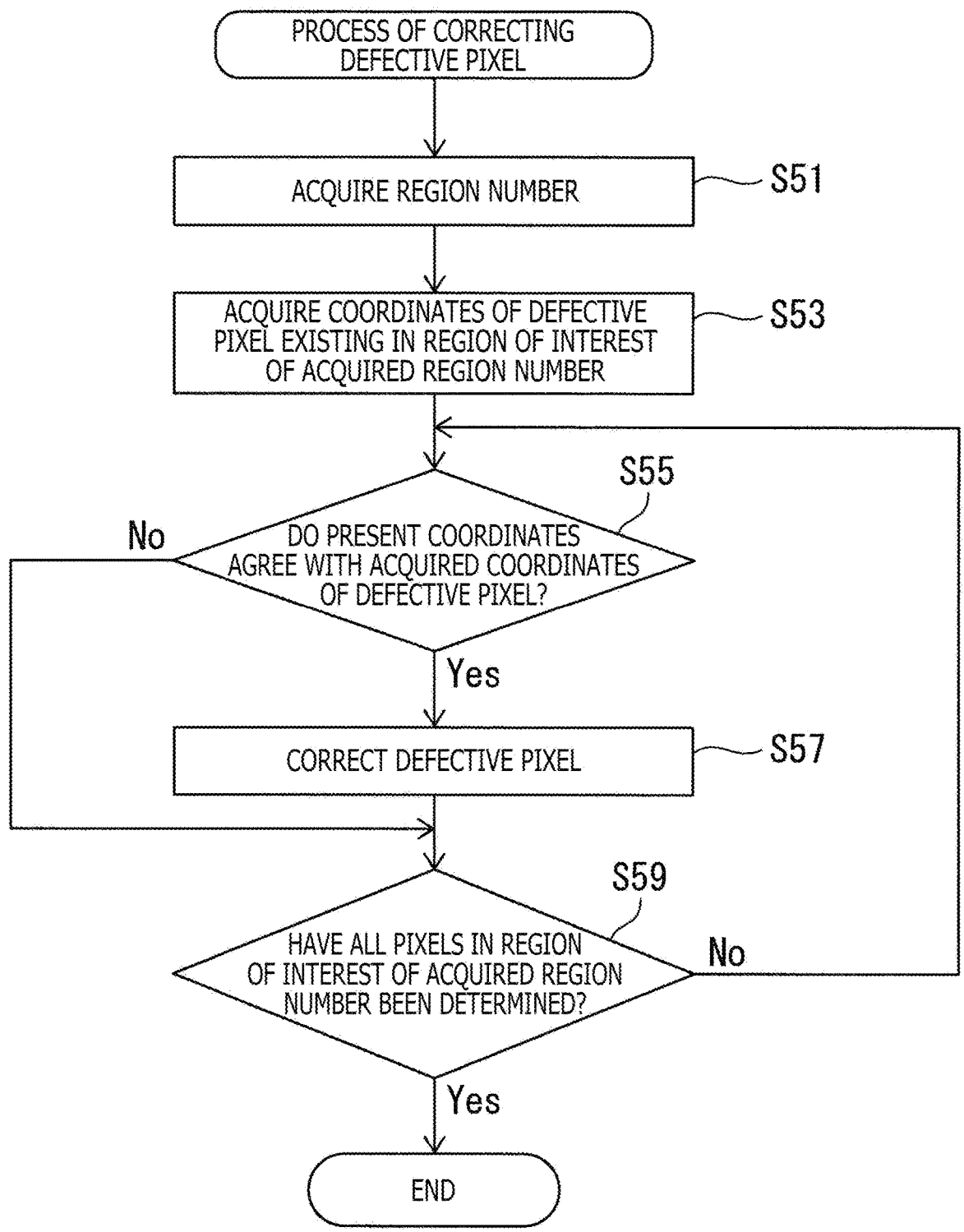
FIG. 18 is a flowchart illustrating an example of a sequence of a correcting process for correcting a defective image upon normal operation of the transmitting apparatus, the receiving apparatus, and the transmission system according to the first embodiment.

Next, a correcting process for correcting a defective pixel in the transmitting apparatus, the receiving apparatus, and the transmission system according to the present embodiment will be described below using FIGS. 16 through 19 with reference to FIG. 15. First, a sequence of the correction of a defective pixel in the transmitting apparatus, the receiving apparatus, and the transmission system according to the present embodiment will be described below with reference to FIGS. 16 through 18. FIGS. 16 through 18 are flowcharts illustrating an example of the sequence of the correction of a defective pixel in the transmitting apparatus, the receiving apparatus, and the transmission system according to the present embodiment. First, an example of a sequence of a process for acquiring coordinates of a defective pixel in an initializing process of the transmitting apparatus, the receiving apparatus, and the transmission system will be described below with reference to FIG. 16.

An initializing process of the video transmitting apparatus 3, the video receiving apparatus 4, and the video transmission system 10 according to the present embodiment is carried out when the video transmitting apparatus 3, the video receiving apparatus 4, and the video transmission system 10 are activated, i.e., when the video transmission system 10 is activated.

(Step S11)

When the video transmission system 10 is activated, the Isp CPU 411 of the video receiving apparatus 4 sends out a control signal requesting the video transmitting apparatus 3 to acquire the coordinates of defective pixels. Specifically, in step S11, the Isp CPU 411 requests the video transmitting apparatus 3 to acquire information of the coordinates of all defective pixels in the image capturing region (i.e., the full angle of view) provided in the photoelectric converting section 311 of the image capturing section 31. After having the video receiving apparatus 4 request the acquisition of information of the coordinates of the defective pixels, the video transmission system 10 goes to the processing of step S13.

(Step S13)

In response to the control signal requesting the acquisition of the coordinates of the defective pixels from the video receiving apparatus 4, the video transmitting apparatus 3 reads the coordinates of the defective pixels from the nonvolatile storage device 33. Specifically, the video transmitting apparatus 3 reads defect coordinates (i.e., defect coordinates in the coordinate system of the image capturing region) in the image capturing region (i.e., the full angle of view) provided in the photoelectric converting section 311 from the nonvolatile storage device 33. The video transmission system 10 sends out the information of the read defect coordinates from the video transmitting apparatus 3 to the video receiving apparatus 4 via inter-CPU communication between the sensor CPU 321 and the Isp CPU 411, and then goes to the processing of step S15.

(Step S15)

Having received the information of the defect coordinates output from the video transmitting apparatus 3, the video receiving apparatus 4 stores the received information in a predetermined storage region provided in the controlling section 41 or the Isp CPU 411, for example. In a case where the video receiving apparatus 4 has acquired and saved the information of the coordinates of the defective pixels, the video transmission system 10 brings the initializing process to an end.

Next, a calculating process for the coordinate conversion of a defective pixel upon normal operation of the video transmitting apparatus 3, the video receiving apparatus 4, and the video transmission system 10 according to the present embodiment will be described below with reference to FIG. 17. FIG. 17 is a flowchart illustrating an example of a sequence of a calculating process for the coordinate conversion of a defective pixel upon normal operation of the transmitting apparatus, the receiving apparatus, and the transmission system.

(Step S31)

As illustrated in FIG. 17, when a frame starting trigger is input, the sensor CPU 321 provided in the video transmitting apparatus 3 determines a segmenting position for segmenting an image from the image capturing region of the image capturing section 31, and then goes to the processing of step S33. In step S31, the sensor CPU 321 determines the segmenting position, i.e., coordinates of a left upper end of a region of interest ROI, and an image size (lengths in the X-axis direction and the Y-axis direction) thereof, and sets information of the determined coordinates and image size as defect correcting information in embedded data.

(Step S33)

The sensor CPU 321 sets transmission data including the embedded data in which the coordinates of the left upper end and the image size of the region of interest ROI, the region number of the region of interest ROI, the image data included in the region of interest ROI, etc. in the transmitting section 322, and brings the calculating process for the coordinate conversion of a defective pixel to an end.

The transmission data set in step S33 is transmitted from the video transmitting apparatus 3 to the video receiving apparatus 4 by way of communication through hardware (HW) using MIPI.

The receiving section 412 included in the video receiving apparatus 4 extracts the embedded data from the received transmission data and outputs the embedded data to the embedded data acquiring section 413. The embedded data acquiring section 413 decodes the embedded data input from the receiving section 412, acquires various pieces of information (for example, the number of regions of interest ROI, the region numbers and priority of the regions of interest ROI, the data lengths of the regions of interest ROI, the image format of the regions of interest ROI, etc.), and outputs the acquired various pieces of information to the Isp CPU 411.

(Step S41)

The Isp CPU 411, triggered by the timing at which the embedded data are decoded by the embedded data acquiring section 413, acquires the segmenting position and the size on the basis of the various pieces of information acquired and input by the embedded data acquiring section 413 from the transmission data received by the receiving section 412. Specifically, the Isp CPU 411 acquires positional information (the coordinates of the reference pixel, the length in the X-axis direction, and the length in the Y-axis direction) of a region of interest ROI whose priority is highest on the basis of the various pieces of information acquired and input by the embedded data acquiring section 413, and then goes to the processing of step S43. According to the present embodiment, the coordinates of the left upper end of the region of interest ROI are acquired as the coordinates of the reference pixel.

(Step S43)

The Isp CPU 411 extracts a defective pixel that is present in the range of a segmented region, i.e., the region of interest ROI acquired in step S41, and goes to the processing of step S45. Specifically, the Isp CPU 411 reads the defect coordinates stored in the given storage region and extracts coordinates that agree with the coordinates in the range of the region of interest ROI from the read defect coordinates.

(Step S45)

The Isp CPU 411 determines whether a defective pixel is present in the range of the region of interest ROI or not in step S43. If the Isp CPU 411 determines that a defective pixel is present in the range of the region of interest ROI (Yes), then the Isp CPU 411 goes to the processing of step S47. On the other hand, if the Isp CPU 411 determines that a defective pixel is not present in the range of the region of interest ROI (No), then the Isp CPU 411 goes to the processing of step S49.

(Step S47)

The Isp CPU 411 (specifically, the coordinate converting section 411a) carries out a coordinate calculation on the defective coordinates extracted in step S43, and goes to the processing of step S49. In step S47, the coordinate converting section 411a converts the defect coordinates extracted in step S43 (i.e., the defect coordinates in the coordinate system of the image capturing region provided in the photoelectric converting section 311) into coordinates (corrective coordinates) in the coordinate system of the region of interest ROI acquired in step S41.

(Step S49)

The Isp CPU 411 determines whether the processing from step S41 to step S47 has been performed on all the regions of interest ROI input from the embedded data acquiring section 413 or not. If the Isp CPU 411 determines that the processing has been performed on all the regions of interest ROI (Yes), then the Isp CPU 411 ends the calculating process for the coordinate conversion upon normal operation of the video transmitting apparatus 3, the video receiving apparatus 4, and the video transmission system 10. On the other hand, if the Isp CPU 411 determines that the processing has not been performed on all the regions of interest ROI (No), then the Isp CPU 411 goes back to the processing of step S41. The Isp CPU 411 repeats the processing from step S41 to step S49 until the calculating process for the coordinate conversion on all the regions of interest ROI upon the normal operation is completed.

Next, a correcting process for correcting a defective image upon normal operation of the video transmitting apparatus 3, the video receiving apparatus 4, and the video transmission system 10 according to the present embodiment will be described below with reference to FIG. 18. FIG. 18 is a flowchart illustrating an example of a sequence of a correcting process for correcting a defective image upon normal operation of the transmitting apparatus, the receiving apparatus, and the transmission system. The flowchart illustrated in FIG. 18 represents an example of a sequence of a correcting process for correcting a defective image in one region of interest. In a case where defective pixels are present in a plurality of regions of interest, the video transmitting apparatus 3, the video receiving apparatus 4, and the video transmission system 10 perform the correcting process for correcting a defective image as illustrated in FIG. 18 with respect to each of the regions of interest.

(Step S51)

As illustrated in FIG. 18, in the correcting process for correcting a defective image, first, the static defect correcting section 421 acquires the region number (indicated as "ROI ID" in FIG. 18) of the region of interest ROI input from the Isp CPU 411, and then goes to the processing of step S53.

(Step S53)

The static defect correcting section 421 acquires information of defect coordinates (i.e., information of corrective coordinates) input from the Isp CPU 411 in association with the region number of the region of interest ROI, and goes to the processing of step S55.

(Step S55)

The static defect correcting section 421 determines whether the coordinates of a present image agree with the coordinates of the defective pixel (i.e., corrective coordinates) acquired in step S53 or not. Here, the coordinates of the present image represent the coordinates of an image that the static defect correcting section 421 has acquired from the Isp CPU 411. Furthermore, in a case where a plurality of sets of corrective coordinates has been acquired in step S53, the static defect correcting section 421 determines whether the coordinates of the present image agree with each of the sets of corrective coordinates or not. If the static defect correcting section 421 determines that the coordinates of the present image agree with the corrective coordinates (Yes), then the static defect correcting section 421 goes to the processing of step S57. On the other hand, if the static defect correcting section 421 determines that the coordinates of the present image do not agree with the corrective coordinates (No), then the static defect correcting section 421 goes to the processing of step S59.

(Step S57)

The static defect correcting section 421 corrects the defective image and then goes to the processing of step S59. In step S57, the static defect correcting section 421 corrects the image data where a defect has occurred on the basis of the image data of images corresponding to pixels at upper, lower, left, and right coordinates adjacent to the defect coordinates. Specifically, the static defect correcting section 421 calculates coordinates of peripheral images around the image at the coordinates corresponding to the corrective coordinates (an example of the defect coordinates) determined as agreeing with the coordinates of the present image in step S55. The static defect correcting section 421 calculates, as the coordinates of peripheral images, coordinates of a pixel that is two rows, for example, ahead of the corrective coordinates (upper coordinates adjacent to the defect coordinates) and coordinates of a pixel that is two rows, for example, behind of the corrective coordinates (lower coordinates adjacent to the defect coordinates). Furthermore, the static defect correcting section 421 calculates, as the coordinates of peripheral images, coordinates of a pixel that is two columns, for example, ahead of the corrective coordinates (left coordinates adjacent to the defect coordinates) and coordinates of a pixel that is two columns, for example, behind of the corrective coordinates (right coordinates adjacent to the defect coordinates). When the static defect correcting section 421 acquires the image data of the images at the calculated four sets of coordinates, the static defect correcting section 421 corrects the image data of the defective image using the acquired image data.

(Step S59)

The static defect correcting section 421 determines whether all the pixels in the region of interest ROI having the region number input in step S51 have been determined as agreeing or disagreeing with the coordinates of the defective pixel or not. If the static defect correcting section 421 determines that all the pixels in the region of interest ROI having the region number input in step S51 have been determined as agreeing or disagreeing with the coordinates of the defective pixel (Yes), then the static defect correcting section 421 ends the correcting process for correcting a defective image. On the other hand, if the static defect correcting section 421 determines that all the pixels in the region of interest ROI having the region number input in step S51 have not been determined as agreeing or disagreeing with the coordinates of the defective pixel (No), then the static defect correcting section 421 goes to the processing of step S55.

Figure 19:
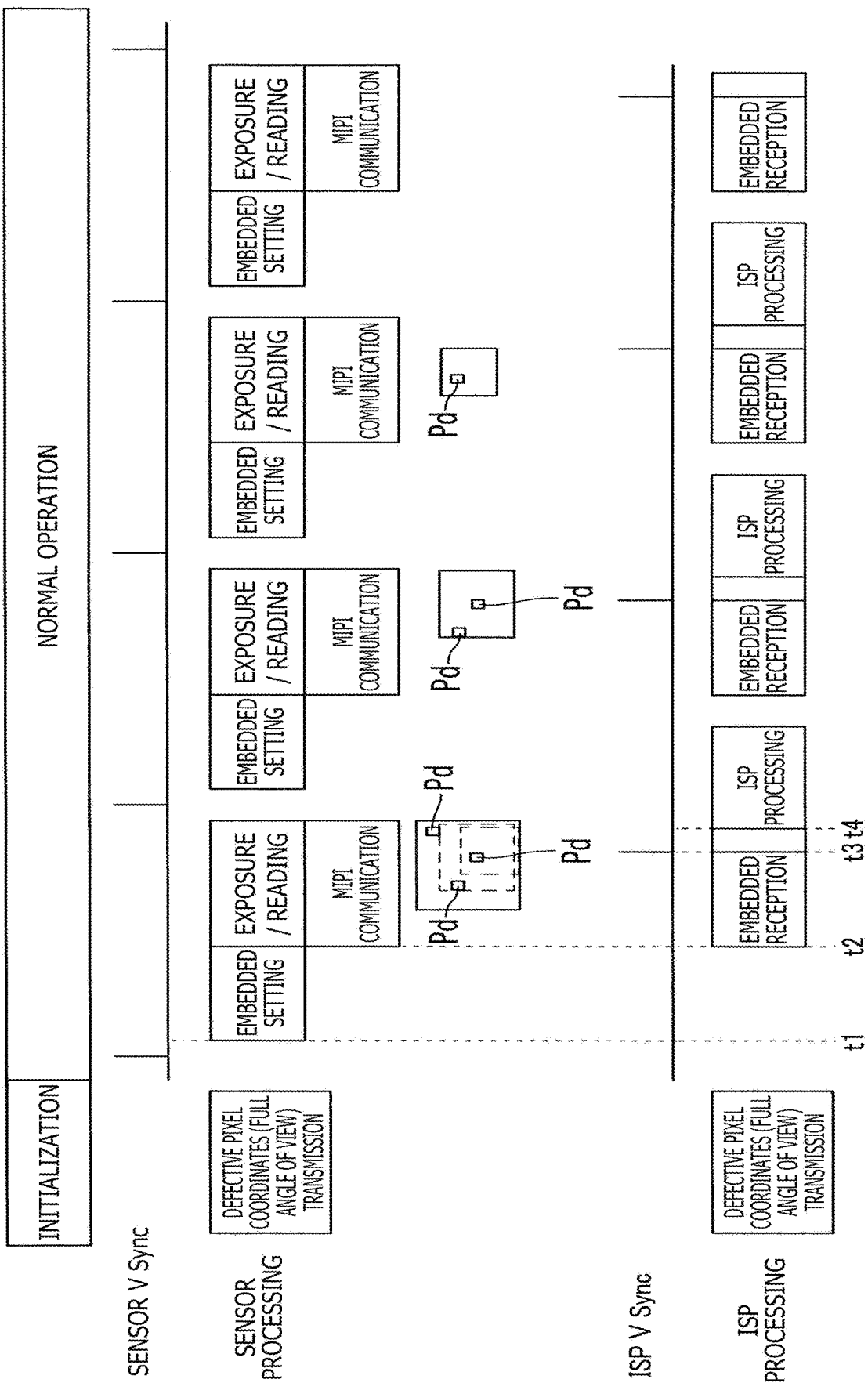
FIG. 19 is a diagram illustrating an example of a timing chart of the correcting process for correcting a defective image in the transmitting apparatus, the receiving apparatus, and the transmission system according to the first embodiment.

Next, the timing of the correcting process for correcting a defective image in the transmitting apparatus, the receiving apparatus, and the transmission system according to the present embodiment will be described below with reference to FIG. 19. FIG. 19 is a diagram illustrating an example of a timing chart of the correcting process for correcting a defective image in the transmitting apparatus, the receiving apparatus, and the transmission system according to the present embodiment. "SENSOR V Sync" indicated in FIG. 19 represents a vertical synchronizing signal input to the sensor CPU 321. "SENSOR PROCESSING" indicated in FIG. 19 represents a process performed by the sensor CPU 321. "ISP Sync" indicated in FIG. 19 represents a vertical synchronizing signal input to the Isp CPU 411. "ISP PROCESSING" indicated in FIG. 19 represents a process performed by the video receiving apparatus 4. Regions of interest ROI-$\varepsilon 1$ through ROI-$\varepsilon 3$ indicated in FIG. 19 schematically illustrate regions of interest processed in one frame period. In FIG. 19, for an easier understanding, the region of interest ROI-$\varepsilon 1$ is processed in the first frame period. For comparison of the sizes of regions of interest, the regions of interest ROI-$\varepsilon 2$ and ROI-$\varepsilon 3$ processed in the second and third frame periods are also illustrated. Furthermore, FIG. 19 illustrates time as it elapses from the left toward the right.

As illustrated in FIG. 19, the video transmission system 10 has the video receiving apparatus 4 request the acquisition of information of the coordinates of all defective pixels in the image capturing region (i.e., the full angle of view) provided in the photoelectric converting section 311 of the image capturing section 31 in an initializing process (see step S11 illustrated in FIG. 16). Furthermore, the video transmission system 10 has the video transmitting apparatus 3 acquire defect coordinates in the image capturing region provided in the photoelectric converting section 311 (i.e., defect coordinates in the coordinate system of the image capturing region) in an initializing process. Moreover, the video transmission system 10 transmits transmission data including the information of the defect coordinates acquired by the video transmitting apparatus 3 to the video receiving apparatus 4, and stores the information of the defect coordinates in the video receiving apparatus 4.

As illustrated in FIG. 19, when the sensor CPU 321 detects a frame starting trigger at time t1, the sensor CPU 321 carries out the processing of step S31 and step S33 described above as an embedded setting process. Specifically, in the embedded setting process, the sensor CPU 321 sets a segmenting position for segmenting an image from the image capturing region of the image capturing section 31 and acquires positional information (the coordinates of a left upper end, the length in the X-axis direction, and the length in the Y-axis direction) in the region of interest ROI-ε1.

The sensor CPU 321 transmits transmission data including embedded data having the information set in the embedded setting process to the video receiving apparatus 4 by way of communication through hardware (HW) using MIPI at time t2 when the embedded setting process is finished.

When the sensor CPU 321 has started transmitting the transmission data, the sensor CPU 321 starts exposure and reading in the frame, i.e., the image capturing section 31 starts capturing an image.

At time t3 when the embedded data acquiring section 413 has finished decoding the embedded data included in the transmission data that the Isp CPU 411 has started receiving at time t2, the Isp CPU 411 starts acquiring the coordinates of a reference pixel (coordinates of a left upper end) of the region of interest ROI-ε1 and the size of the region of interest ROI-ε1 on the basis of the various pieces of information acquired and input by the embedded data acquiring section 413, and finishes calculating the coordinates of a corrective pixel present in the region of interest ROI-ε1 at time t4. In other words, the processing from step S41 to step S47 illustrated in FIG. 17 is carried out on one frame during the period from time t3 to time t4.

The video receiving apparatus 4 carries out the correcting process for correcting a defective image and the image quality adjustment according to the ISP process from time t4.

Though not described in detail, the correcting process for correcting a defective image is performed on the regions of interest ROI-ε2 and ROI-ε3 that are different in position and size at the same timing as the region of interest ROI-ε1.

As described with reference to FIGS. 16 through 19, the video transmission system 10 can transmit the transmission data having the embedded data including the defect correcting information regarding the regions of interest ROI from the video transmitting apparatus 3 to the video receiving apparatus 4 by way of communication using MIPI. In such a manner, the video transmission system 10 can perform a demosaicing process per region of interest ROI.

5. A Modification of the First Embodiment of the Present Disclosure:

Next, transmitting apparatus, receiving apparatus, and transmission systems according to modifications of the present embodiment will be described below with reference to FIGS. 20 through 22.

(Modification 1)

A transmitting apparatus, a receiving apparatus, and a transmission system according to Modification 1 of the present embodiment will be described below with reference to FIG. 20. FIG. 20 is a block diagram illustrating a general makeup of a video transmitting apparatus 3, a video receiving apparatus 4x, and a transmission system 10x according to the present modification. Incidentally, those components that are identical in operation and function to those of the video transmitting apparatus 3, the video receiving apparatus 4, and the video transmission system 10 according to the present embodiment are denoted by identical reference characters, and will be omitted from description.

Figure 20:
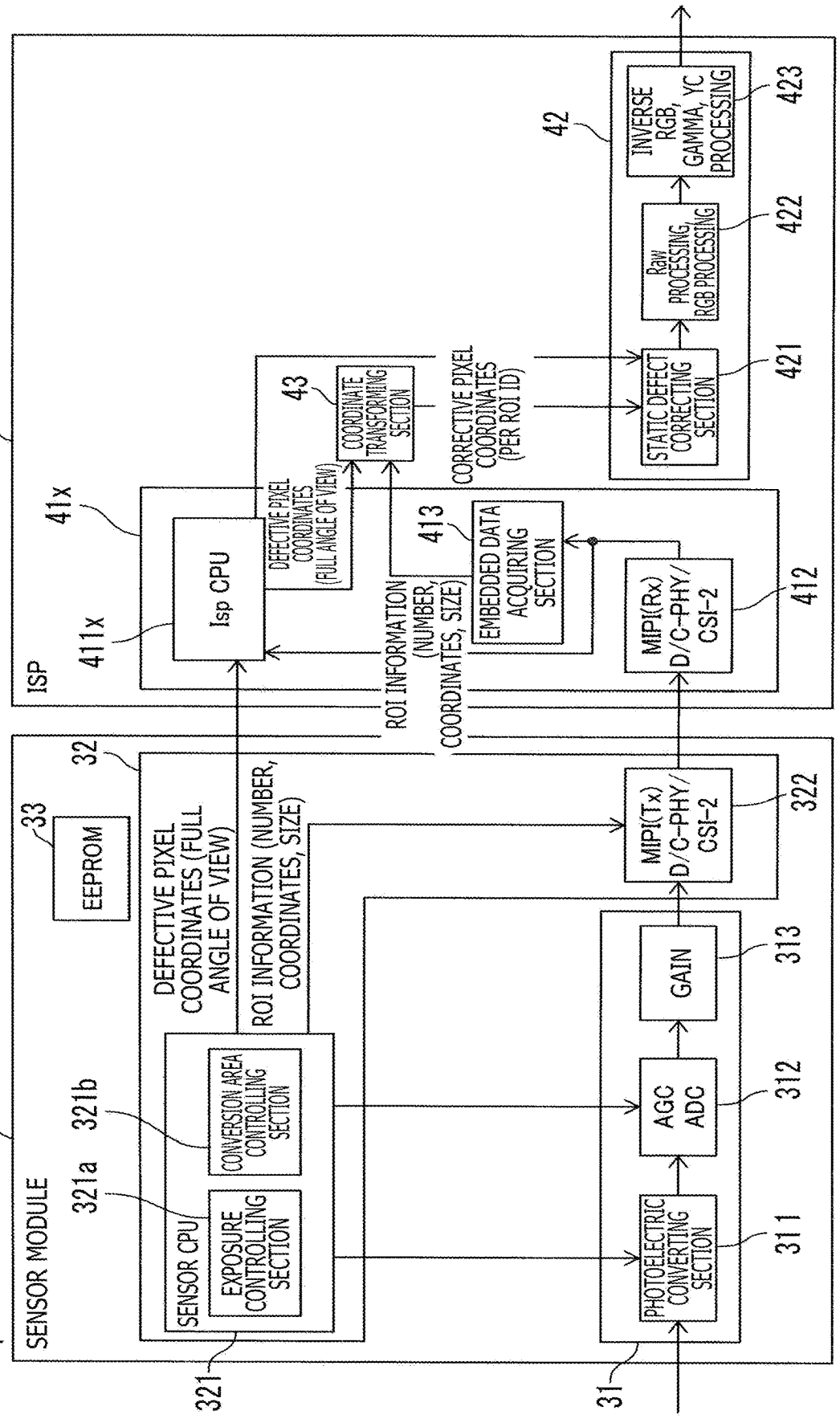
FIG. 20 is a block diagram illustrating a general makeup of a transmitting apparatus, a receiving apparatus, and a transmission system according to Modification 1 of the first embodiment.

As illustrated in FIG. 20, the video transmission system 10x according to the present modification includes the video transmitting apparatus 3 that is identical in configuration to the video transmitting apparatus 3 according to the present embodiment, and the video receiving apparatus 4x that is partly different in configuration from the video receiving apparatus 4 according to the present embodiment. The video receiving apparatus 4x according to the present modification is characterized in that it includes a coordinate converting section 43 for converting defect coordinates in the image capturing region provided in the photoelectric converting section 311 into corrective coordinates that are defect coordinates in the region of interest ROI.

In the video receiving apparatus 4 according to the present embodiment, the coordinate converting section 411a is provided as a functional block of the Isp CPU 411. In contrast, the coordinate converting section 43 provided in the video receiving apparatus 4x is hardware-implemented.

The coordinate converting section 43 is connected to the Isp CPU 411x and the static defect correcting section 421. Therefore, the coordinate converting section 43 can acquire the coordinates of a defective pixel in the image capturing region provided in the photoelectric converting section 311 and the positional information of the region of interest ROI from the Isp CPU 411. In such a manner, the coordinate converting section 43 can convert the defect coordinates in the coordinate system of the image capturing region into defect coordinates (corrective coordinates) in the coordinate system of the region of interest ROI. Furthermore, the coordinate converting section 43 can output the converted corrective coordinates to the static defect correcting section 421. The coordinate converting section 43 can thus perform the same function as the coordinate converting section 411a according to the present embodiment except that the coordinate converting section 43 is hardware-implemented.

Accordingly, the video transmitting apparatus 3x, the video receiving apparatus 4x, and the transmission system 10x according to the present modification can correct a defective image present in the region of interest ROI in a similar manner to the video transmitting apparatus 3, the video receiving apparatus 4, and the transmission system 10 according to the present embodiment though the coordinate converting section 43 is hardware-implemented.

(Modification 2)

A transmitting apparatus, a receiving apparatus, and a transmission system according to Modification 2 of the present embodiment will be described below with reference to FIG. 21. FIG. 21 is a block diagram illustrating a general makeup of a video transmitting apparatus 3y, a video receiving apparatus 4y, and a transmission system 10y according to the present modification. Incidentally, those components that are identical in operation and function to those of the transmitting apparatus, the video receiving apparatus, and the video transmission systems according to the present embodiment and Modification 1 are denoted by identical reference characters, and will be omitted from description.

Figure 21:
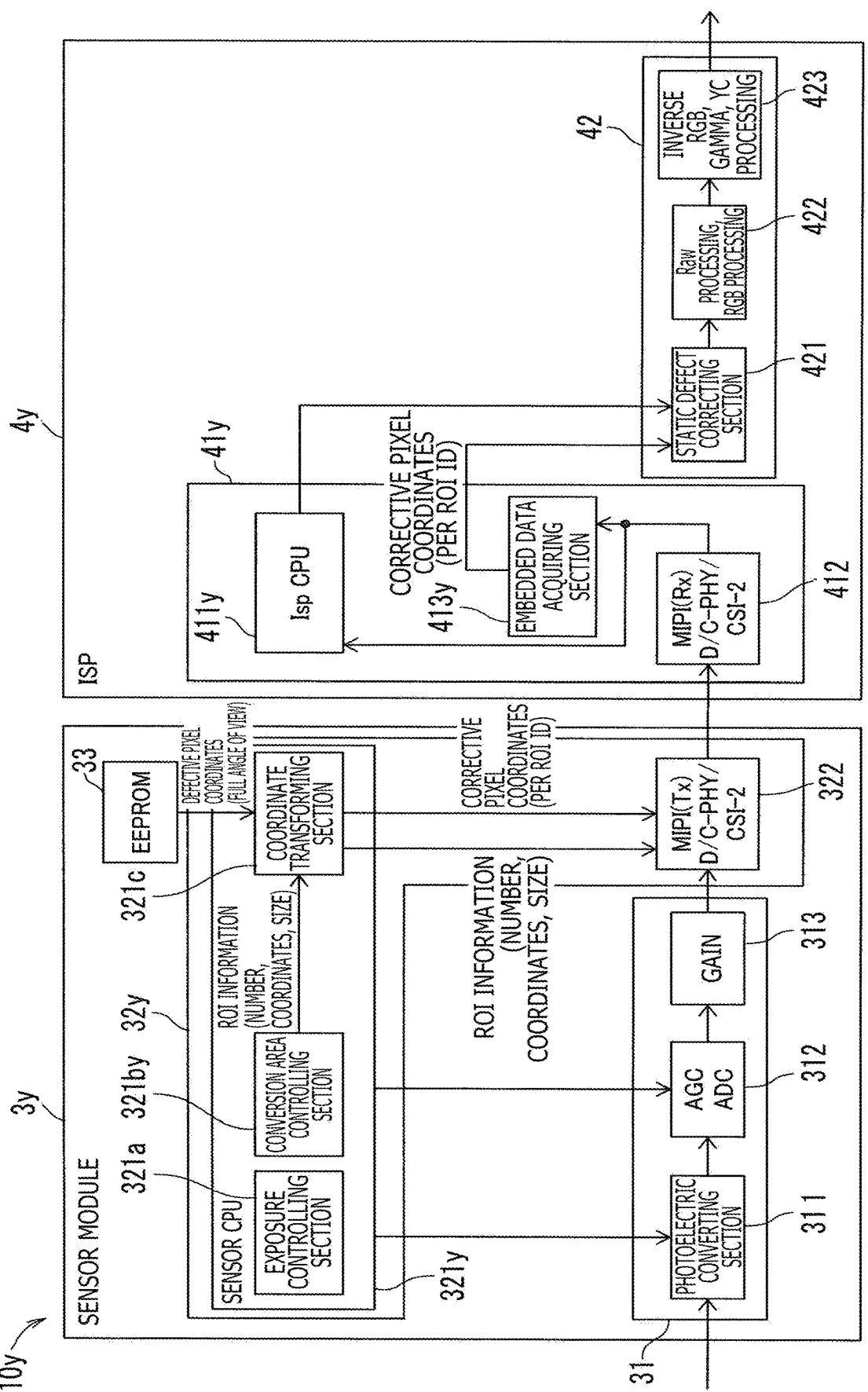
FIG. 21 is a block diagram illustrating a general makeup of a transmitting apparatus, a receiving apparatus, and a transmission system according to Modification 2 of the first embodiment.
Figure 22:
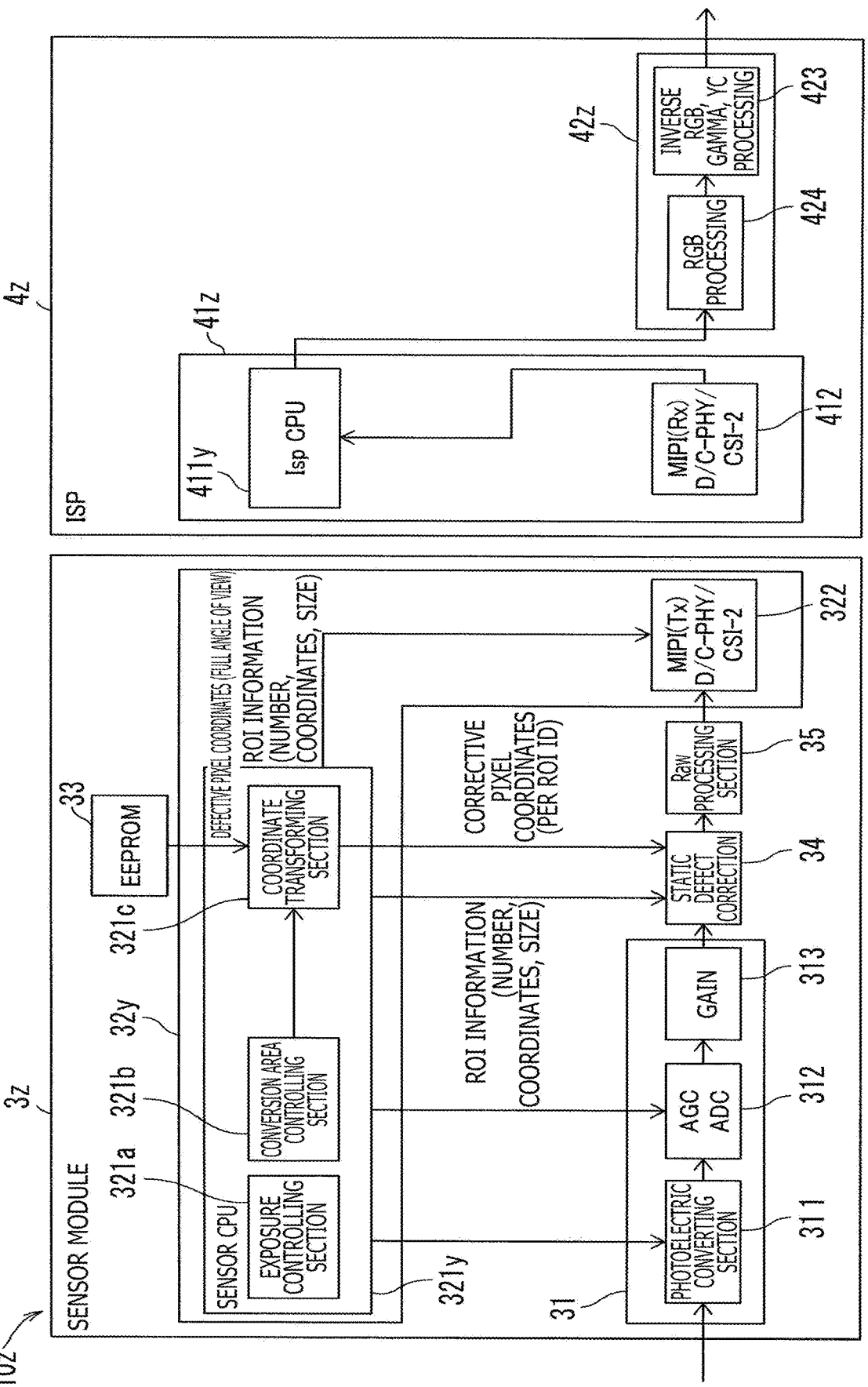
FIG. 22 is a block diagram illustrating a general makeup of a transmitting apparatus, a receiving apparatus, and a transmission system according to Modification 3 of the first embodiment.

As illustrated in FIG. 21, the video transmission system 10y according to the present modification is different from the video transmission system 10 according to the present embodiment in that a coordinate converting section is provided in the video transmitting apparatus 3y.

The video transmitting apparatus 3y has a coordinate converting section 321c provided in a sensor CPU 321y of a controlling section 32y. The coordinate converting section 321c is connected to a conversion area controlling section 321by. The sensor CPU 321y according to the present modification is configured to output the positional information of a region of interest ROI as defect correcting information from the conversion area controlling section 321by to the coordinate converting section 321c upon normal operation of the video transmitting apparatus 3y.

The conversion area controlling section 321by is configured to acquire and hold, as the defect correcting information, defect coordinates representing the coordinates of a pixel where a defect has occurred among a plurality of pixels that make up the image capturing region provided in the photoelectric converting section 311. The coordinate converting section 321c converts the coordinates of the defective pixel (defect coordinates) in the image capturing region provided in the photoelectric converting section 311 into coordinates of the defective pixel (corrective coordinates) in the region of interest ROI, using the positional information of the region of interest ROI input from the conversion area controlling section 321by and the coordinates of the defective pixels read from the nonvolatile storage device 33. The conversion area controlling section 321by and the coordinate converting section 321c that have such functions correspond to an example of the controlling section. Furthermore, the sensor CPU 321 that has the conversion area controlling section 321by and the coordinate converting section 321c and the controlling section 32y that has the sensor CPU 321 correspond to an example of the controlling section.

The coordinate converting section 321c determines a position in the region of interest ROI that corresponds to the coordinates of a pixel where a defect has occurred (according to the present embodiment, the coordinates in the XY orthogonal coordinate system of the region of interest ROI) on the basis of the reference coordinates of the region of interest ROI (for example, the coordinates of the left upper end and the size (for example, the length in the X-axis direction, and the length in the Y-axis direction) thereof and the coordinates of the pixel where the defect has occurred (according to the present embodiment, the coordinates in the XY orthogonal coordinate system of the image capturing region). Since the coordinate converting section 321c converts the defect coordinates into the corrective coordinates in a similar manner to the coordinate converting section 411a according to the present embodiment, the description thereof will be omitted. The coordinate converting section 321c outputs the corrective coordinates obtained by the coordinate conversion to the transmitting section 322.

The transmitting section 322 includes ROI information that includes the corrective coordinates at the coordinates in the region of interest ROI and the positional information of the region of interest ROI, input from the coordinate converting section 321c, in the embedded data in association with the region number of the region of interest ROI, and send out transmission data having the embedded data to the video receiving apparatus 4y. In other words, the transmitting section 322 includes information of the position of the pixel where the defect has occurred in the region of interest ROI determined by the coordinate converting section 321c (i.e., the corrective coordinates at the coordinates in the region of interest ROI) in the ROI information, and sends out the ROI information.

The sensor CPU 321 outputs the defect correcting information including the information of the defect coordinates (e.g., the corrective coordinates) to the transmitting section 322. Furthermore, the sensor CPU 321 outputs the information of the basic coordinates and size of the region of interest ROI (i.e., the positional information of the region of interest ROI) as the defect correcting information to the transmitting section 322. The transmitting section 322 generates transmission information (see FIGS. 6 and 12) including the defect correcting information and the information of the region of interest ROI input from the sensor CPU 321, and sends out the generated transmission information to the video receiving apparatus 4. The defect correcting information is included in the ROI information and sent out from the transmitting section 322. Since the ROI information is included in the embedded data, the defect correcting information is included in the embedded data and sent out from the transmitting section 322. In this fashion, the video transmitting apparatus 3 sends out the defect correcting information included in the ROI information to from the transmitting section 322.

An embedded data acquiring section (an example of a controlling section) 413y provided in the video receiving apparatus 4y is configured to acquire the coordinates of a pixel where a defect has occurred among a plurality of pixels that make up the image capturing region provided in the photoelectric converting section 311 as defect correcting information. Specifically, the embedded data acquiring section 413y acquires the coordinates (corrective coordinates) of a pixel (corrective pixel) corresponding to an image as a correction target from the ROI information included in the embedded data that the transmission data input via the receiving section 412 has, as defect correcting information, and outputs the acquired defect correcting information to the static defect correcting section 421. The coordinates of the pixel included in the ROI information are coordinates in the XY orthogonal coordinate system of the region of interest ROI. Therefore, the embedded data acquiring section 413y extracts and acquires the coordinates of the pixel where the defect has occurred as coordinates in the region of interest ROI. The embedded data acquiring section 413y outputs corrective coordinates corresponding to the region number (indicated as "ROI ID" in FIG. 21) of the region of interest ROI per region number to the static defect correcting section 421. Inasmuch as the image processing section 42 according to the present modification is of a similar configuration and is configured to perform a similar function to the image processing section 42 including the static defect correcting section 421 according to the present embodiment, the description thereof will be omitted.

In such a manner, with the video transmitting apparatus 3y, the video receiving apparatus 4y, and the transmission system 10y, the coordinate converting section 321c is provided in the video transmitting apparatus 3y. The video transmitting apparatus 3y, the video receiving apparatus 4y, and the transmission system 10y can correct a defective image present in the region of interest ROI in a similar manner to the video transmitting apparatus 3, the video receiving apparatus 4, and the video transmission system 10 according to the present embodiment.

(Modification 3)

A transmitting apparatus, a receiving apparatus, and a transmission system according to Modification 3 of the present embodiment will be described below with reference to FIG. 22. FIG. 22 is a block diagram illustrating a general makeup of a video transmitting apparatus 3z, a video receiving apparatus 4z, and a video transmission system 10z according to the present modification. Incidentally, those components that are identical in operation and function to those of the transmitting apparatus, the video receiving apparatus, and the video transmission systems according to the present embodiment, Modification 1, or Modification 2 are denoted by identical reference characters, and will be omitted from description.

The video transmitting apparatus 3z according to the present modification is characterized in that it has a static defect correcting section (an example of a controlling section) 34 that performs a similar function to the static defect correcting section 421 according to the present embodiment and a Raw processing section 35 that performs part of the function of the image generating section 422 according to the present embodiment. The video receiving apparatus 4z according to the present modification is characterized in that it does not have an embedded data acquiring section and a static defect correcting section and has an RGB processing section 424 that performs part of the function of the image generating section 422 according to the present embodiment.

The static defect correcting section 34 included in the video transmitting apparatus 3z is connected to the amplifying section 313 provided in the image capturing section 31, the conversion area controlling section 321b and the coordinate converting section 321c provided in the sensor CPU 321y, and the Raw processing section 35. The Raw processing section 35 is connected to the transmitting section 322 provided in the controlling section 32y.

The static defect correcting section 34 performs a correcting process for correcting a defective image corresponding to a defective pixel, using the positional information of the region of interest ROI input from the conversion area controlling section 321b, the coordinates of the defective pixel (corrective coordinates) in the region of interest ROI input from the coordinate converting section 321c, and the image data input from the amplifying section 313. The static defect correcting section 34 is configured to perform a correction of the image data of an image where a defect has occurred on the basis of the image data of images corresponding to pixels at upper, lower, left, and right coordinates adjacent to the position of the pixel where the defect has occurred in the region of interest ROI determined by the coordinate converting section 321c (an example of the controlling section). In other words, the static defect correcting section 34 corrects a defective image in a similar manner to the static defect correcting section 421 according to the present embodiment. Therefore, the static defect correcting section 34 will be omitted from description. The transmitting section 322 includes the image data of the image corrected by the static defect correcting section 34 in the ROI information, and sends out the ROI information.

When the image data of the region of interest ROI including the image data where the defect has been corrected are input, the Raw processing section 35 performs a Raw process to generate a region of interest ROI represented by a Raw image. The Raw processing section 35 outputs the image data of the generated Raw image to the transmitting section 322.

The transmitting section 322 is configured to generate transmission data having embedded data including the positional information of the region of interest ROI input from the sensor CPU 321y and associated with the region number of the region of interest ROI and payload data including the image data of the Raw image input from the Raw processing section 35 and associated with the region number, and send out the generated transmission data to the video receiving apparatus 4y.

The receiving section 412 provided in the video receiving apparatus 4z extracts the embedded data and the payload data from the transmission data input from the transmitting section 322 and outputs the embedded data and the payload data to an Isp CPU 411z. The Isp CPU 411z extracts the positional information of the region of interest ROI from the input embedded data, and extracts the image data of the Raw image from the input payload data. The Isp CPU 411z outputs the extracted region number and positional information of the region of interest ROI and the extracted image data of the Raw image to the RGB processing section 424 provided in an image processing section 42z.

The RGB processing section 424 performs an RGB process using the information and image data input from the Isp CPU 411z to generate an image of the region of interest ROI including image data of RGB signals. The RGB processing section 424 outputs the generated image data to the image quality adjusting section 423. The image quality adjusting section 423 is of a similar configuration and is configured to perform a similar function to the image quality adjusting section 423 according to the present embodiment, and hence the description thereof will be omitted.

With the video transmitting apparatus 3z, the video receiving apparatus 4z, and the video transmission system 10z, the static defect correcting section 34 and the Raw processing section 35 are provided in the video transmitting apparatus 3z. However, the video transmitting apparatus 3z, the video receiving apparatus 4z, and the video transmission system 10z can correct a defective image present in the region of interest ROI in a similar manner to the video transmitting apparatus 3, the video receiving apparatus 4, and the video transmission system 10 according to the present embodiment.

As described above, the transmitting apparatus, receiving apparatus, and transmission systems according to the present embodiment and the modifications can realize a correcting process for correcting a defective image in a region of interest that is a partial region segmented from a captured image.

6. Second Embodiment of the Present Disclosure:

Next, a transmitting apparatus, a receiving apparatus, and a transmission system according to a second embodiment of the present disclosure will be described below with reference to FIG. 23. With the transmitting apparatus, the receiving apparatus, and the transmission system according to the first embodiment, an object as a target to be segmented from an image capturing region is of a rectangular shape. In contrast, the transmitting apparatus, the receiving apparatus, and the transmission system according to the present embodiment are characterized in that they perform a correcting process for correcting a defective image in a case where an object as a target to be segmented from an image capturing region is not of a rectangular shape.

Figure 23:
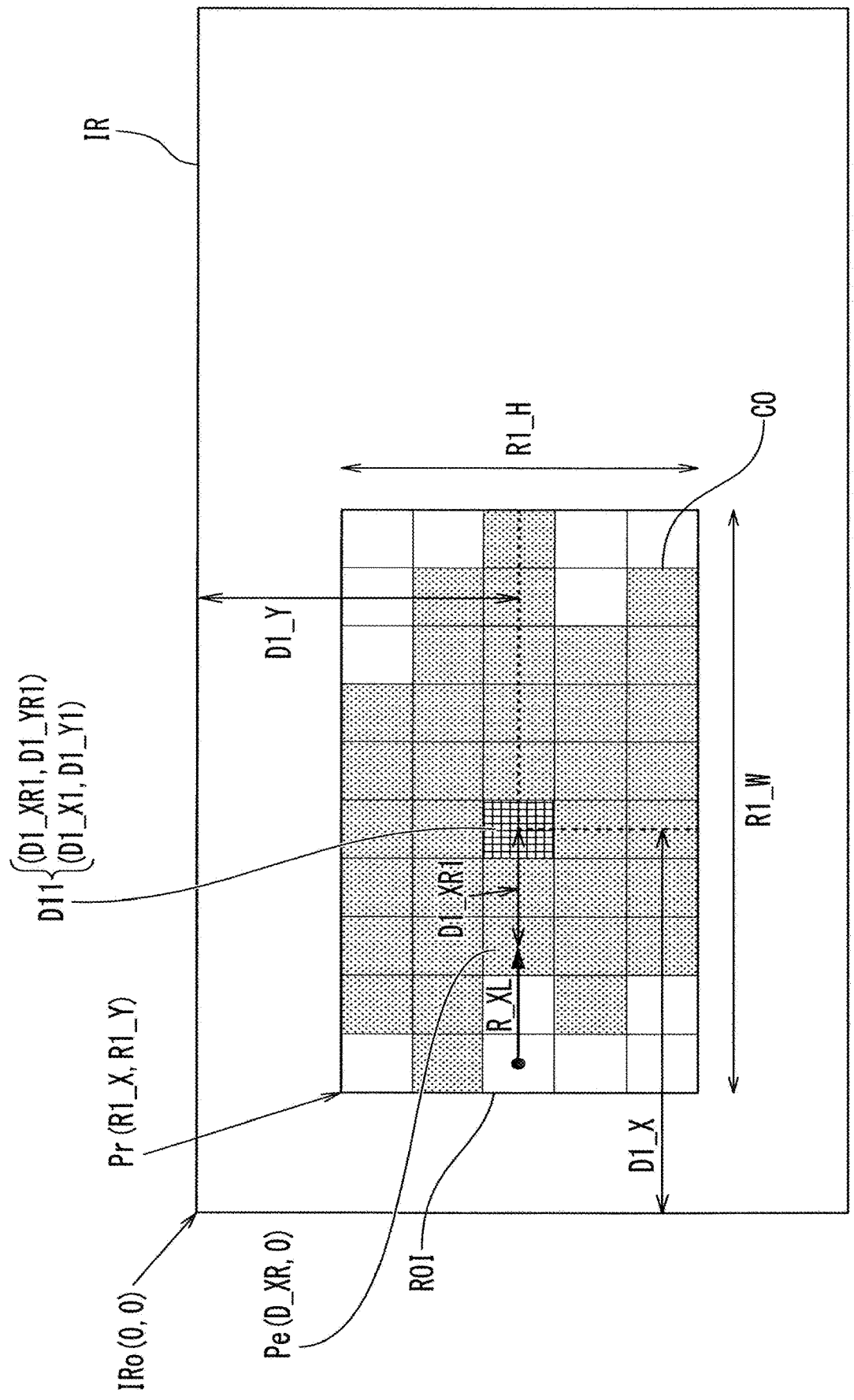
FIG. 23 is a diagram schematically illustrating a method of calculating the position of a defective pixel in a region of interest on the basis of coordinate information of the defective pixel acquired in a delivery inspection or the like according to a second embodiment.

FIG. 23 is a diagram schematically illustrating a method of calculating the position of a defective pixel in a region of interest on the basis of coordinate information of the defective pixel acquired in a delivery inspection or the like according to the present embodiment. In FIG. 23, for an easier understanding, only pixels established in a region of interest ROI among pixels arrayed in a matrix in an image capturing region IR in its entirety are illustrated. Furthermore, in FIG. 23, for an easier understanding, a defective pixel D11 is illustrated in a cross-hatched manner, and a segmentation target CO as an object to be segmented from the image capturing region IR is illustrated in a stippled manner.

As illustrated in FIG. 23, the segmentation target CO as an object to be segmented from the image capturing region IR is not of a rectangular shape. One of the pixels included in the segmentation target CO is the defective pixel D11. According to the present embodiment, in a case where the segmentation target CO is not of a rectangular shape, the region of interest ROI is established as being of a minimum rectangular shape including the segmentation target CO, as described above in the presupposed technology 2. As described above in the first embodiment, in a case where the shape of a region of interest and the shape of a segmentation target are in agreement with each other, defect coordinates in the image capturing region are converted into defect coordinates in the region of interest frame by frame. In contrast, in a case where the shape of a region of interest and the shape of a segmentation target are not in agreement with each other, defect coordinates in the image capturing region are converted into defect coordinates in the region of interest row by row.

As illustrated in FIG. 23, the image capturing region IR has its origin IRo (0, 0) located on a pixel at a left upper end thereof. In this case, the defective pixel D11 in the image capturing region IR has coordinates (x, y) represented respectively by (D1_X1, D1_Y1). The coordinates (D1_X1, D1_Y1) of the defective pixel D11 are coordinates based on the origin IRo (0, 0) of the image capturing region IR. Furthermore, the coordinates (D1_X1, D1_Y1) of the defective pixel D11 have information as coordinate information acquired upon a delivery inspection, for example, of the video transmitting apparatus that has the image capturing section.

In a case where a region of interest is established as described above, positional information of the region of interest (for example, the coordinates of a left upper end thereof, the length in the X-axis direction thereof, and the length in the Y-axis direction thereof) is derived. Consequently, as illustrated in FIG. 23, the coordinates (R1_X, R1Y) of a left upper end Pr, the length R1_W in the X-axis direction, and the length R1_H in the Y-axis direction, for example, are derived as positional information of the region of interest ROI1. The coordinates (R1_X, R1Y) of the left upper end Pr of the region of interest ROI1 represent the position of the region of interest ROI1 in the image capturing region IR. Therefore, the coordinates (R1_X, R1Y) of the left upper end Pr are coordinates based on the origin IRo (0, 0) of the image capturing region IR.

According to the present embodiment, in addition to establishing coordinates of the defective pixel and the region of interest in the image capturing region, coordinates of a pixel at an end (which may hereinafter be referred to as "end pixel") of the segmentation target in the region of interest are also established. According to the present embodiment, an end pixel is established with respect to a left end of the region of interest, for example. As illustrated in FIG. 23, the coordinates of an end pixel Pe are established as coordinates (D_XR, 0). The X coordinate of the end pixel Pe corresponds to the number of pixels from the left end of the region of interest ROI to the end pixel. Therefore, depending on the shape of the segmentation target CO, the coordinates of the end pixel Pe may be different from row to row.

The coordinates (D1X_R1, D1_YR1) of the defective pixel D11 in the region of interest ROI can be expressed using the coordinates (R1_X, R1Y) of the left upper end Pr of the region of interest ROI1, the coordinates (D1_X1, D1_Y1) of the defective pixel D11, and the coordinates (D_XR, 0) of the end pixel Pe by the following equations (3) and (4):

$$D1\_XR1 = D1\_X - R1\_X - D\_XR \quad (3)$$

$$D1\_YR1 = D1\_Y - R1\_Y - 0 \quad (4)$$

Because of the equations (3) and (4), the position of the defective pixel D11 can be expressed by coordinates in the coordinate space of the region of interest ROI1. Therefore, by storing coordinate information acquired upon a delivery inspection or the like, for example, the video receiving apparatus can calculate coordinates of a defective pixel in a region of interest each time positional information (the coordinates of a left upper end, the length in the X-axis direction, and the length in the Y-axis direction) of the established region of interest and the positions of the pixels at ends of the rows included in the region of interest are input from the video transmitting apparatus.

The transmitting apparatus according to the present embodiment may include positional information (e.g., the coordinates of the end pixel Pe) of a target object as in the presupposed technology 2, for example, in the payload per pixel row and send out the payload data to the video receiving apparatus. Furthermore, since an object as a segmentation target is not of a rectangular shape, there may be an instance where upper, lower, left, and right images may not be present around an image corresponding to a pixel (corrective pixel) that corresponds to an image as a correction target. In this case, the correcting process for correcting a defective image may be carried out by interpolating image data according to a boundary process, for example. For example, a nonexistent one of upper and lower images adjacent to a corrective image is interpolated with the existent image, whereas a nonexistent one of left and right images adjacent to the corrective image is interpolated with the existent image.

The configurations of either one of the transmitting apparatus, the receiving apparatus, and the transmission systems according to the first embodiment and Modifications 1 through 3 may be applied to the transmitting apparatus, the receiving apparatus, and the transmission system according to the present embodiment. Therefore, the configurations of the transmitting apparatus, the receiving apparatus, and the transmission system according to the present embodiment will be omitted from description.

As described above, the transmitting apparatus, the receiving apparatus, and the transmission system according to the present embodiment can realize a correcting process for correcting a defective image in a region of interest that is a partial region segmented from a captured image even if an object as a segmentation target is not of a rectangular shape.

The present disclosure has been described above with respect to the presupposed technologies, the embodiments, and the modification. However, the present disclosure is not limited to the above embodiments etc., but various changes and modifications may be made therein. It is noted that the advantages set forth in the present description are given by way of illustrative example only. The advantages of the present disclosure are not limited to those set forth in the present description. The present disclosure may have other advantages than the advantages set forth in the present description.

Furthermore, the present disclosure may have the following arrangements, for example:

(1)
A transmitting apparatus including:
a controlling section that controls holding of defect correcting information for use in correcting a defect in an image included in a ROI (Region Of Interest); and
a transmitting section that sends out image data of the image included in the ROI as payload data and sends out ROI information as embedded data.

(2)
The transmitting apparatus according to (1), in which the defect correcting information is included in the ROI information and sent out from the transmitting section.

(3)
The transmitting apparatus according to (1) or (2), in which the controlling section holds coordinates of a pixel where a defect has occurred among a plurality of pixels making up an image capturing region as the defect correcting information.

(4)
The transmitting apparatus according to (3), in which the controlling section holds the coordinates of the pixel where the defect has occurred when the transmitting apparatus is initialized or manufactured.

(5)
The transmitting apparatus according to (3) or (4), in which the controlling section holds reference coordinates and size of the ROI as the defect correcting information.

(6)
The transmitting apparatus according to (5), in which the controlling section holds left upper end coordinates of the ROI as the reference coordinates.

(7)
The transmitting apparatus according to (5) or (6), in which the controlling section determines a position in the ROI that corresponds to the coordinates of the pixel where the defect has occurred on the basis of the reference coordinates and the size of the ROI and the coordinates of the pixel where the defect has occurred.

(8)
The transmitting apparatus according to (7), in which the transmitting section includes information of the position of the pixel where the defect has occurred in the ROI determined by the controlling section and the image data of the image included in the ROI in the ROI information, and sends out the ROI information.

(9)
The transmitting apparatus according to (7), further including:
a processing section that processes a correction of the image data of the image where the defect has occurred on the basis of image data of images corresponding to pixels at upper, lower, left, and right coordinates adjacent to the coordinates corresponding to the position of the pixel where the defect has occurred in the ROI determined by the controlling section,
in which the transmitting section includes the image data of the image corrected by the processing section in the ROI information, and sends out the ROI information.

(10)
The transmitting apparatus according to any one of (1) through (9), in which the transmitting section sends out a signal according to MIPI (Mobile Industry Processor Interface) D-PHY standards, MIPI C-PHY standards, or MIPI CSI (Camera Serial Interface)-2 standards.

(11)
A receiving apparatus including:
a receiving section that receives a transmission signal including image data of an image included in a ROI (Region Of Interest) in payload data and including ROI information in embedded data;
a controlling section that controls extraction of defect correcting information for use in correcting a defect in the image data of the image included in the ROI from the transmission signal received by the receiving section; and
a processing section that processes a correction of the defect in the image of the ROI on the basis of the defect correcting information extracted by the controlling section.

(12)
The receiving apparatus according to (11), in which the controlling section extracts the defect correcting information from the ROI information included in the transmission signal.

(13)
The receiving apparatus according to (11), in which the controlling section extracts, as the defect correcting information, coordinates of a pixel where a defect has occurred among a plurality of pixels making up an image capturing region.

(14)
The receiving apparatus according to (13), in which the controlling section extracts the coordinates of the pixel where the defect has occurred as coordinates in either the image capturing region or the ROI.

(15)
The receiving apparatus according to any one of (11) through (14), in which the controlling section extracts reference coordinates and size of the ROI as the defect correcting information.

(16)
The receiving apparatus according to (15), in which the controlling section extracts left upper end coordinates of the ROI as the reference coordinates.

(17)
The receiving apparatus according to (15) or (16), in which the controlling section determines a position in the ROI that corresponds to the coordinates of the pixel where the defect has occurred on the basis of the reference coordinates and the size of the ROI and the coordinates of the pixel where the defect has occurred.

(18)
The receiving apparatus according to any one of (13) through (17), in which the processing section corrects the image data of the image where the defect has occurred on the basis of the image data of images corresponding to pixels at upper, lower, left, and right coordinates adjacent to the coordinates of the pixel where the defect has occurred.

(19)
The receiving apparatus according to any one of (11) through (18), in which the receiving section receives a signal according to MIPI (Mobile Industry Processor Interface) D-PHY standards, MIPI C-PHY standards, or MIPI CSI (Camera Serial Interface)-2 standards.

(20)
A transmission system including:
a transmitting apparatus having a controlling section that controls holding of defect correcting information for use in correcting a defect in an image included in a ROI (Region Of Interest), and a transmitting section that sends out image data of the image included in the ROI as payload data and sends out ROI information as embedded data; and
a receiving apparatus having a receiving section that receives transmission signal including the image data of the image included in the ROI in the payload data and including the ROI information in the embedded data, a controlling section that controls extraction of defect correcting information for use in correcting the defect in the image data of the image included in the ROI from the transmission signal received by the receiving section, and a processing section that processes a correction of the defect in the image of the ROI on the basis of the defect correcting information extracted by the controlling section.

It will be understood that those skilled in the art can anticipate various corrections, combinations, sub-combinations, and changes depending on design requirements and other factors as falling within the scope of attached claims and the scope of their equivalents.

REFERENCE SIGNS LIST 1, 10, 10x, 10y, 10z: Video transmission system
3, 3y, 3z, 100: Video transmitting apparatus
4, 4x, 4y, 4z, 3z, 200: Video receiving apparatus
31, 110: Image capturing section
32, 32y, 41, 41z: Controlling section
34, 421: Static defect correcting section
35: Raw processing section
42, 42z: Image processing section
43, 321c, 411a: Coordinate converting section
100A: CSI transmitter
100B: CCI slave
111: Captured image
112, 112a1, 112a2, 112a3, 112a4, 112b1, 112b4, 123a4, 223A: ROI image
112b: Compressed image data
113, 114: Positional information
115: Priority
116, 116a1, 116a2: Transmission image
118: Image
120, 130: Image processing section
120A, 120A1, 120A2, 130A, 147B: Compressed image data
120B: ROI information
120C: Frame information
121: ROI segmenting section
122: ROI analyzing section
123: Detecting section
124: Priority setting section
125, 131: Encoding section
126: Image processing controlling section
140: Transmitting section
141: LINK controlling section
142: ECC generating section
143: PH generating section
144, 145: ROI data buffer
144: EBD buffer
146: Normal image data buffer
147: Combining section
147A: Transmission data
200A: CSI receiver
200B: CCI master
210: Receiving section
211: Header separating section
212: Header interpreting section
213: Payload separating section
214: EBD interpreting section
214A: EBD data
215: ROI data separating section
215A, 215B: Payload data
220: Information processing section
221: Information extracting section
221A: Extracted information
222: ROI decoding section
222A: Image data
223: ROI image generating section
224: Normal image decoding section
224A: Normal image
311: Photoelectric converting section
312: Signal converting section
313: Amplifying section
321, 321y: Sensor CPU
321a: Exposure controlling section
321b, 321by: Conversion area controlling section
322: Transmitting section
411, 411x, 411y: Isp CPU
412: Receiving section
413, 413y: Embedded data acquiring section
422: Image generating section
423: Image quality adjusting section
423a: Coordinate determining section
424: RGB processing section
ADC: Analog-to-digital conversion
AGC: Signal amplification
CCI: Camera control interface
CL: Clock lane

The invention claimed is:
1. A transmitting apparatus comprising:
transmission circuitry configured to send image data of an image included in a Region Of Interest (ROI) as payload data, and to send defect correction information for use in correcting a defect in the image included in the ROI, the defect correction information being sent as embedded data.
2. The transmitting apparatus according to claim 1, further comprising:
a control circuit configured to hold the defect correction information.
3. The transmitting apparatus according to claim 1, wherein the defect correcting information is included as the embedded data in ROI information of the ROI.
4. The transmitting apparatus according to claim 1, wherein the defect correction information includes coordinates of a pixel in the image data of the image included in the ROI.
5. The transmitting apparatus according to claim 4, wherein the defect correction information including the coordinates of the pixel is stored at a time of initialization of the transmitting apparatus.
6. The transmitting apparatus according to claim 4, wherein the defect correction information further includes a size of the ROI.
7. The transmitting apparatus according to claim 1, wherein the transmission circuitry sends the image data in a signal according to MIPI (Mobile Industry Processor Inter- face) D-PHY standards, MIPI C-PHY standards, or MIPI CSI (Camera Serial Interface)-2 standards.

8. A receiving apparatus comprising:
reception circuitry configured to receive a transmission signal including image data of an image included in a Region Of Interest (ROI) as payload data, and to receive defect correction information for use in correcting a defect in the image included in the ROI, the defect correction information being received as embedded data.

9. The receiving apparatus according to claim 8, wherein the defect correcting information is included as the embedded data in ROI information of the ROI.

10. The receiving apparatus according to claim 8, wherein the defect correction information includes coordinates of a pixel in the image data of the image included in the ROI.

11. The receiving apparatus according to claim 10, wherein the defect correction information including the coordinates of the pixel is stored at a time of initialization of a counterpart transmitting apparatus.

12. The receiving apparatus according to claim 10, wherein the defect correction information further includes a size of the ROI.

13. The receiving apparatus according to claim 8, wherein the transmission signal is according to MIPI (Mobile Industry Processor Interface) D-PHY standards, MIPI C-PHY standards, or MIPI CSI (Camera Serial Interface)-2 standards.

14. A non-transitory computer readable medium storing a program for controlling transmission, the program being executable to perform operations comprising:

sending image data of an image included in a Region Of Interest (ROI) as payload data; and
sending defect correction information for use in correcting a defect in the image included in the ROI, the defect correction information being sent as embedded data.

15. The non-transitory computer readable medium according to claim 14, wherein the operations further comprise:
storing the defect correction information.

16. The non-transitory computer readable medium according to claim 14, wherein the defect correcting information is included as the embedded data in ROI information of the ROI.

17. The non-transitory computer readable medium according to claim 14, wherein the defect correction information includes coordinates of a pixel in the image data of the image included in the ROI.

18. The non-transitory computer readable medium according to claim 17, wherein the defect correction information including the coordinates of the pixel is stored at a time of initialization of the transmitting apparatus.

19. The non-transitory computer readable medium according to claim 17, wherein the defect correction information further includes a size of the ROI.

20. The non-transitory computer medium according to claim 14, wherein the operations further comprise:
sending out a signal with the image data according to MIPI (Mobile Industry Processor Interface) D-PHY standards, MIPI C-PHY standards, or MIPI CSI (Camera Serial Interface)-2 standards.

* * * * *